(12) United States Patent
Tadokoro et al.

(10) Patent No.: US 6,433,947 B1
(45) Date of Patent: Aug. 13, 2002

(54) CASSETTE AUTO CHANGER SYSTEM

(75) Inventors: Keiji Tadokoro; Noriyuki Yamazaki; Junichi Saiki; Hideaki Noguchi; Nobuhiro Tsurumaki, all of Kanagawa; Takao Mokutani, Shizuoka; Toru Yumine; Koichi Aikawa, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/692,757

(22) Filed: Oct. 19, 2000

Related U.S. Application Data

(62) Division of application No. 08/770,178, filed on Dec. 19, 1996, now Pat. No. 6,166,877.

(30) Foreign Application Priority Data

Dec. 19, 1995 (JP) .............................................. 7-330829

(51) Int. Cl.⁷ .............................................. G11B 17/00
(52) U.S. Cl. ........................................... 360/69; 360/92
(58) Field of Search .............................. 360/92, 71, 69; 369/34; 318/568.11; 414/273, 275, 277, 280

(56) References Cited

U.S. PATENT DOCUMENTS

| | | |
|---|---|---|
| 2,075,559 A | 3/1937 | Tollison |
| 3,691,988 A | 9/1972 | Clarke |
| 3,790,006 A | 2/1974 | Hartman, III |

(List continued on next page.)

FOREIGN PATENT DOCUMENTS

| | | |
|---|---|---|
| JP | 1-243265 | 9/1989 |
| JP | 05-2804 | 1/1993 |
| JP | 07-37308 | 2/1995 |

*Primary Examiner*—Andrew L. Sniezek
(74) *Attorney, Agent, or Firm*—Frommer Lawrence & Haug LLP; William S. Frommer; Matthew K. Ryan

(57) ABSTRACT

A cassette auto changer system includes a cassette console mounting a rack for holding a plurality of tape cassettes, a drive console for mounting a tape playing or playing and recording device or a plurality of such devices. A base console mounts the cassette and drive consoles and the entire cassette auto changer system is housed in a housing console. According to a compact design a cassette shuttle portion of the transport mechanism is rotatable both vertically and horizontally and includes structure, such as a cassette hand portion, for effecting insertion and extraction of a cassette from one of a plurality of cassette compartments provided in the cassette rack. The cassette hand may also include a release lever engaging a lock lever at each cassette compartment. Further, grasping members include a centering device for achieving a predetermined support position for a cassette. In addition, paired position detection portions and corresponding sensors are provided. For compactness, driven components receive driving power from a power source via other, intervening driven compartments. The cassette transport is also operable to and from a cassette port whereby cassettes may be inserted into and removed from the housing console. Control portion is provided to allow a single cassette port to function as both an IN or an OUT port. Thus a compact, full featured cassette auto changer may be provided which is robust, reliable and compact.

2 Claims, 81 Drawing Sheets

U.S. PATENT DOCUMENTS

| | | | |
|---|---|---|---|
| 4,540,326 A | 9/1985 | | Southworth et al. |
| 4,682,927 A | 7/1987 | | Southworth et al. |
| 4,802,035 A | 1/1989 | | Ohtsuka |
| 4,815,055 A | 3/1989 | | Fago, Jr. |
| 4,878,137 A | 10/1989 | | Yamashita et al. |
| 4,937,690 A | 6/1990 | | Yamashita et al. |
| 4,984,897 A | 1/1991 | | Baranski |
| 5,005,090 A | 4/1991 | | Kikuchi et al. |
| 5,031,057 A | 7/1991 | | Kikuchi et al. |
| 5,043,962 A | 8/1991 | | Wagner et al. |
| 5,096,354 A | 3/1992 | | Wu |
| 5,128,912 A | 7/1992 | | Hug et al. |
| 5,144,506 A | 9/1992 | | Sahota |
| 5,277,534 A | 1/1994 | | Anderson et al. |
| 5,285,335 A | 2/1994 | | Sato |
| 5,303,034 A | 4/1994 | * | Carmichael et al. ...... 360/71 X |
| 5,303,214 A | 4/1994 | | Kulakowski et al. |
| 5,434,832 A | 7/1995 | | Beal et al. |
| 5,546,366 A | 8/1996 | | Dang |
| 5,570,337 A | 10/1996 | | Dang |
| 5,646,917 A | 7/1997 | | Miyoshi et al. |
| 5,659,444 A | 8/1997 | | Dang et al. |
| 5,663,938 A | 9/1997 | | Dang et al. |
| 5,790,338 A | 8/1998 | * | Kanai et al. .................. 360/71 |
| 6,008,964 A | 12/1999 | * | Goodknight et al. ..... 360/69 X |
| 6,153,999 A | 11/2000 | * | Borrego .................... 360/92 X |

* cited by examiner

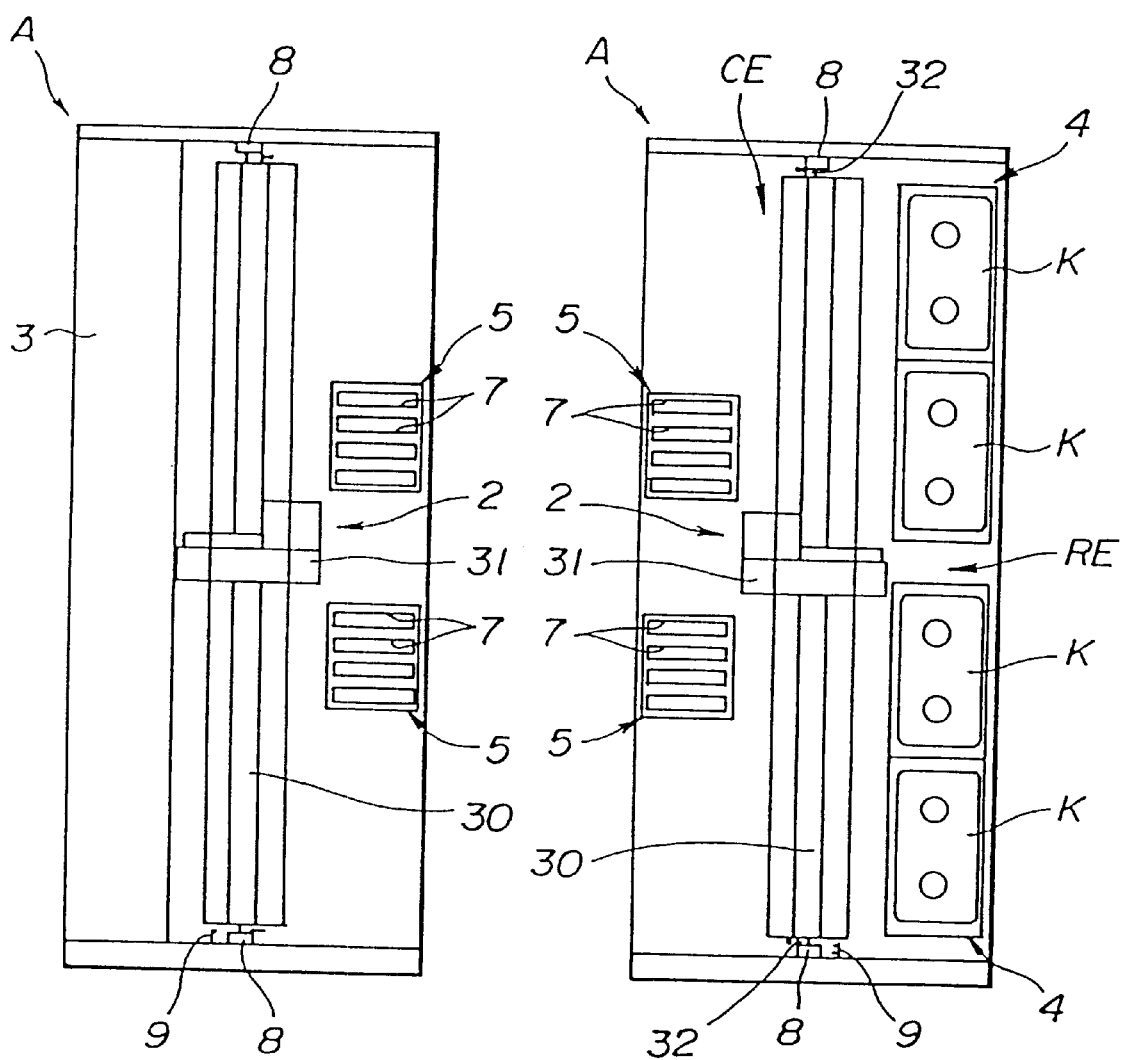

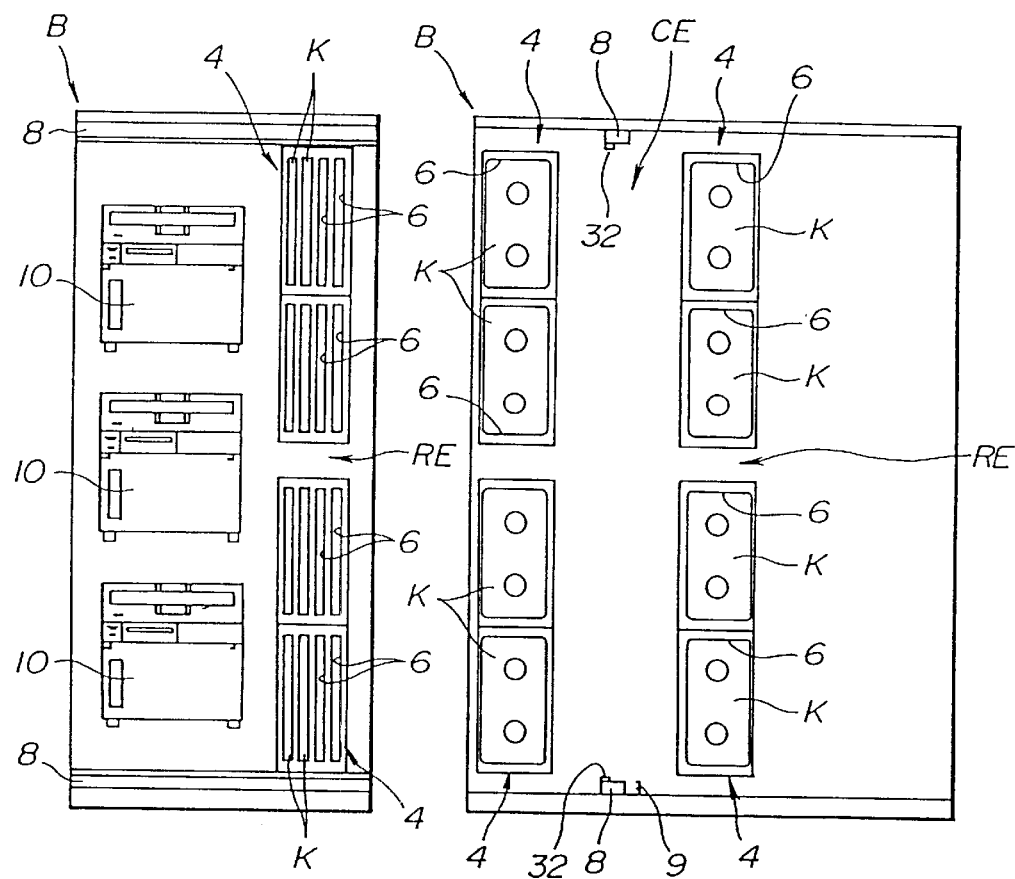

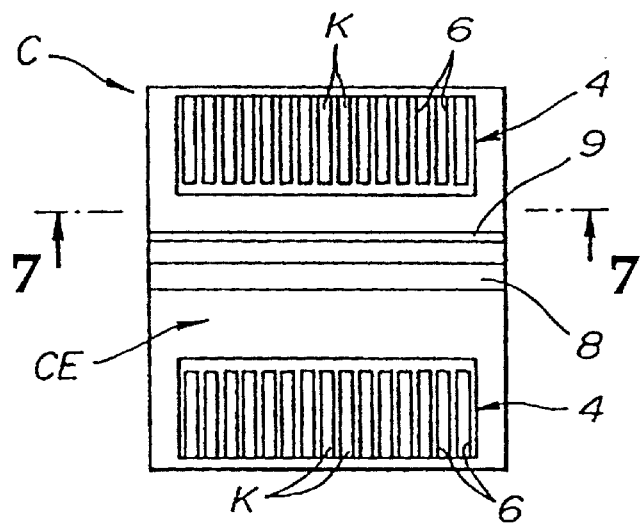
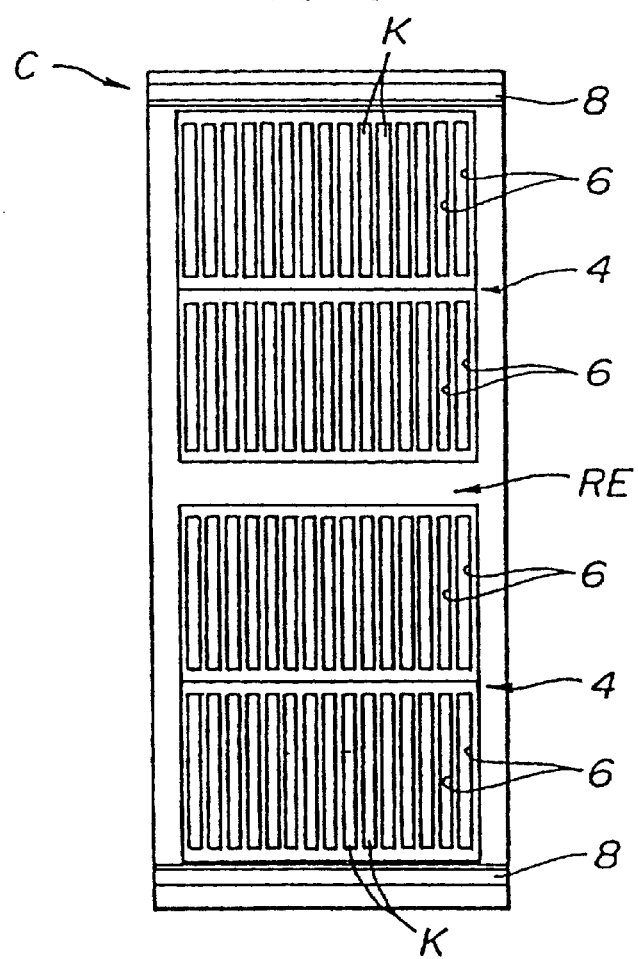

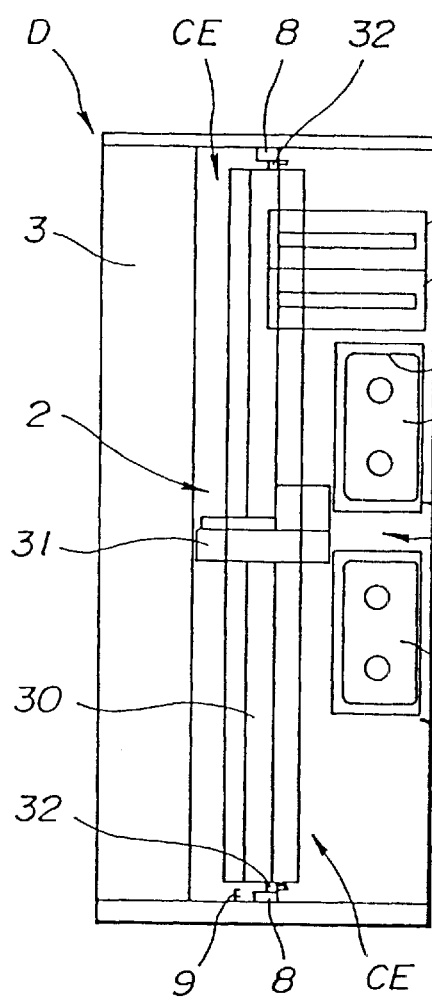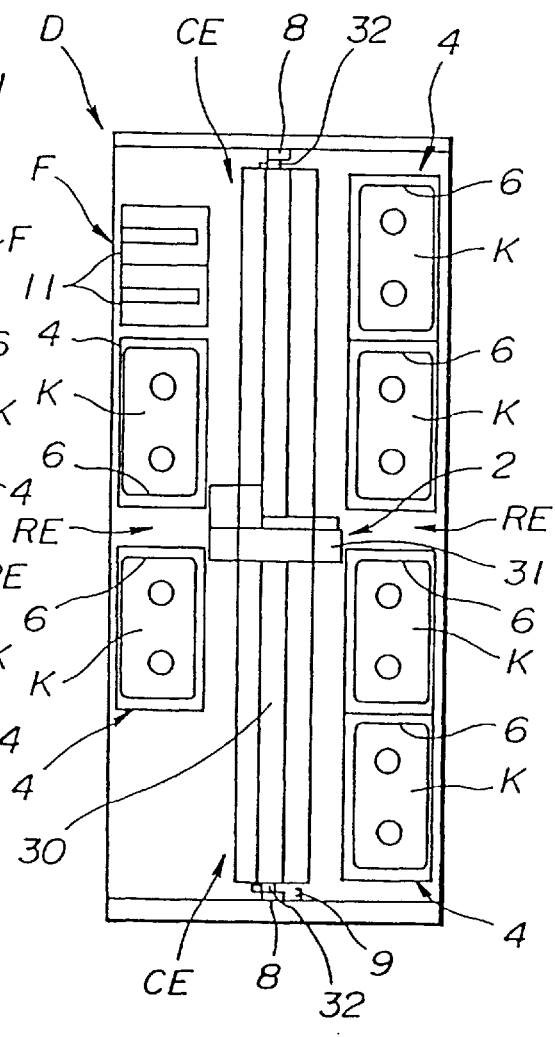

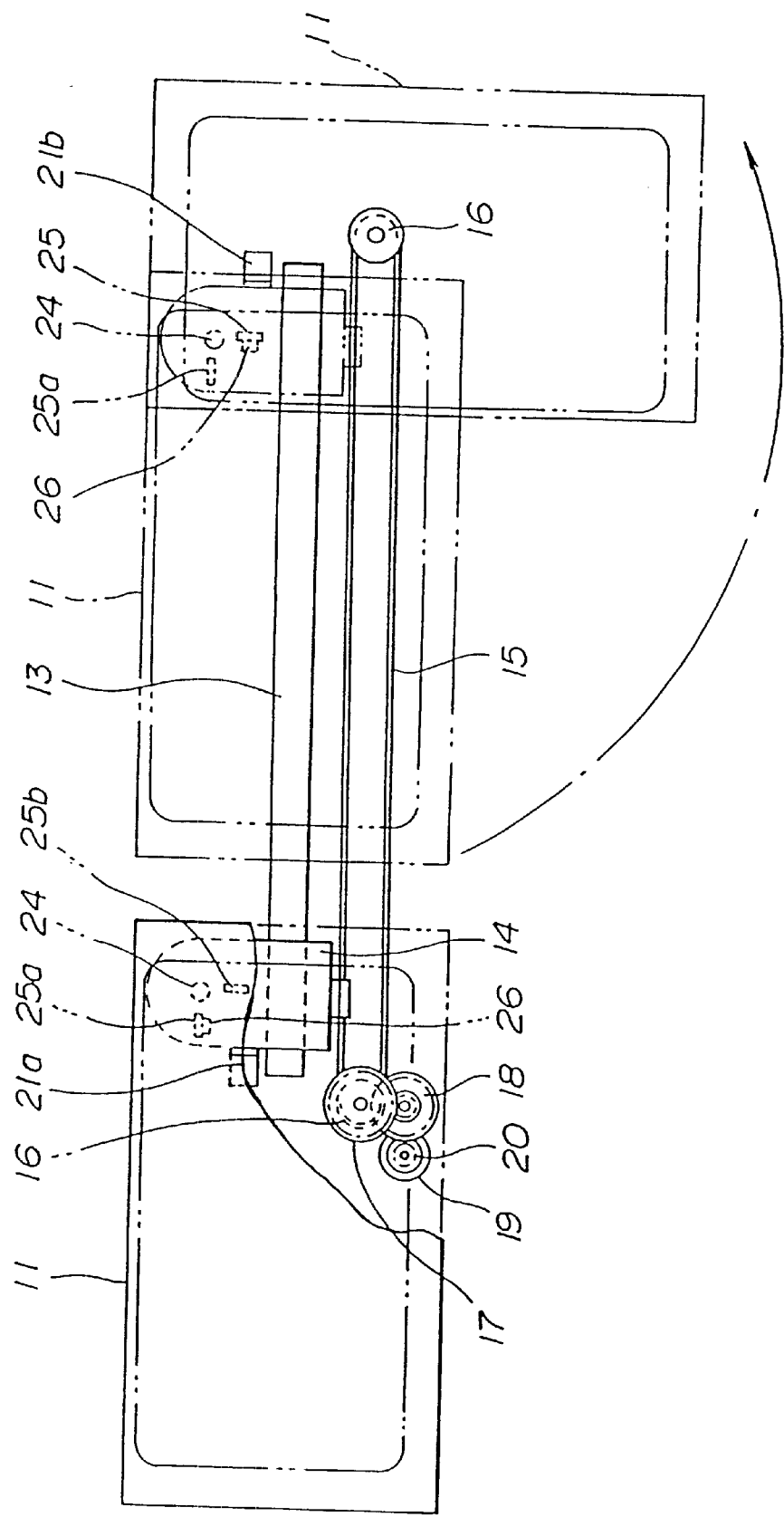

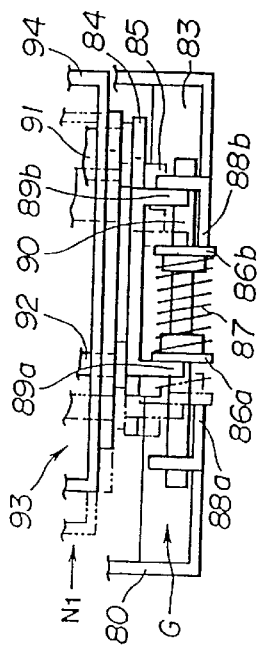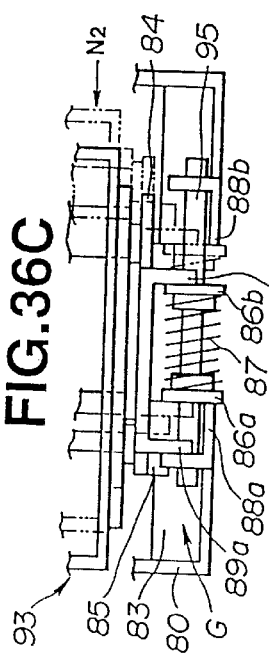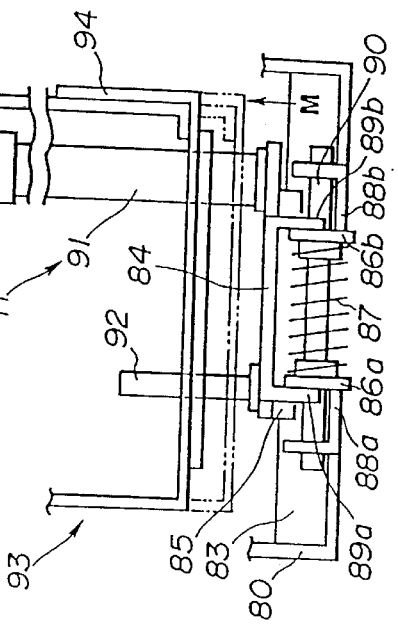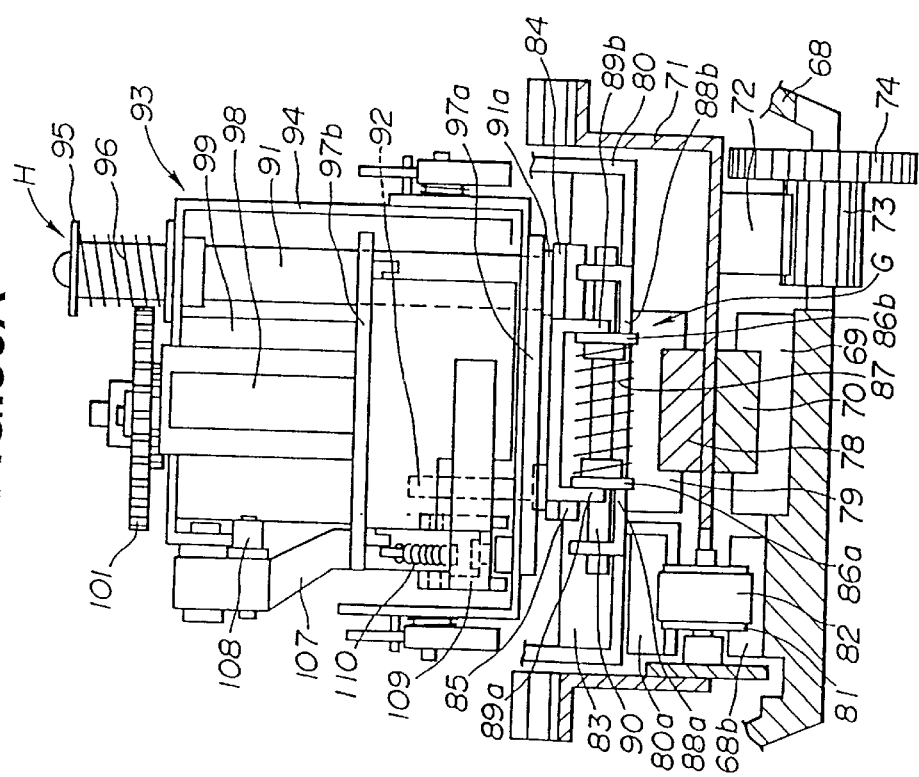

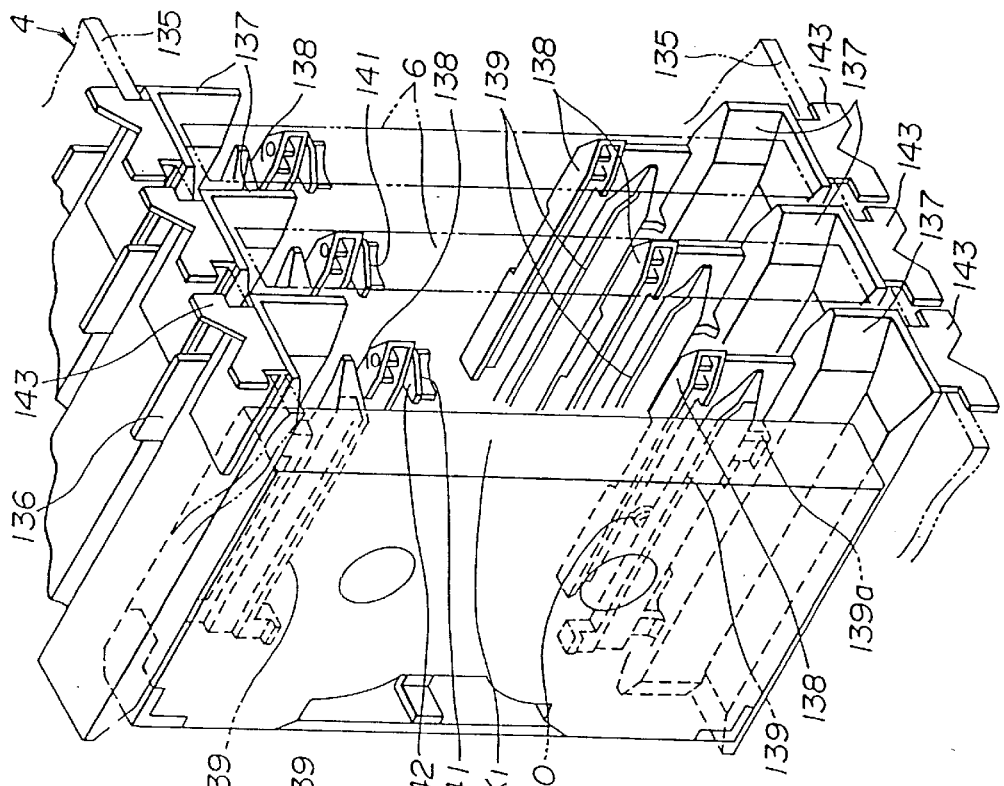
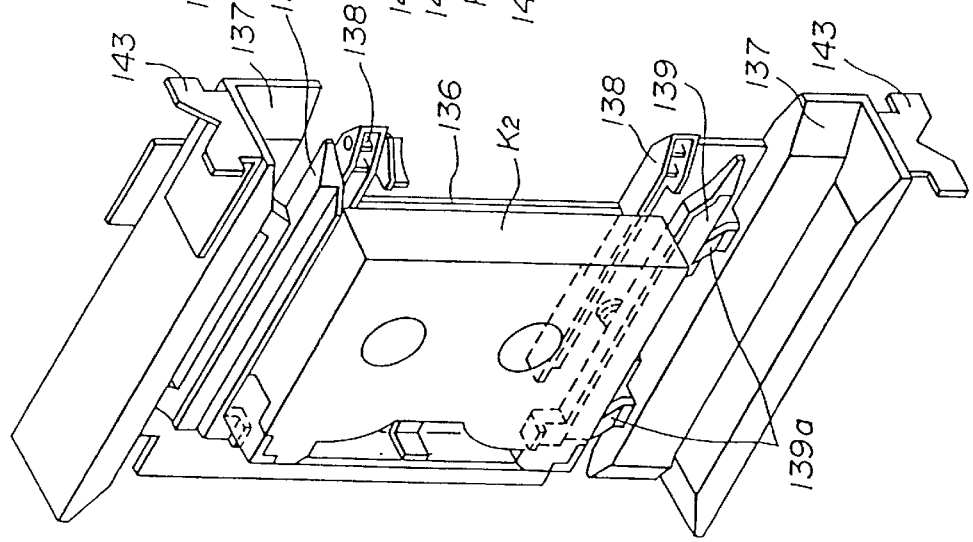
FIG.37A
FIG.37B

FIG.40
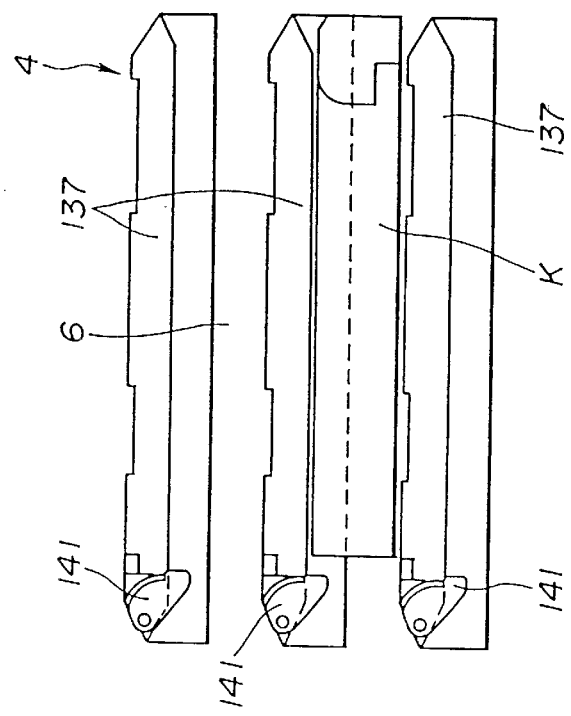
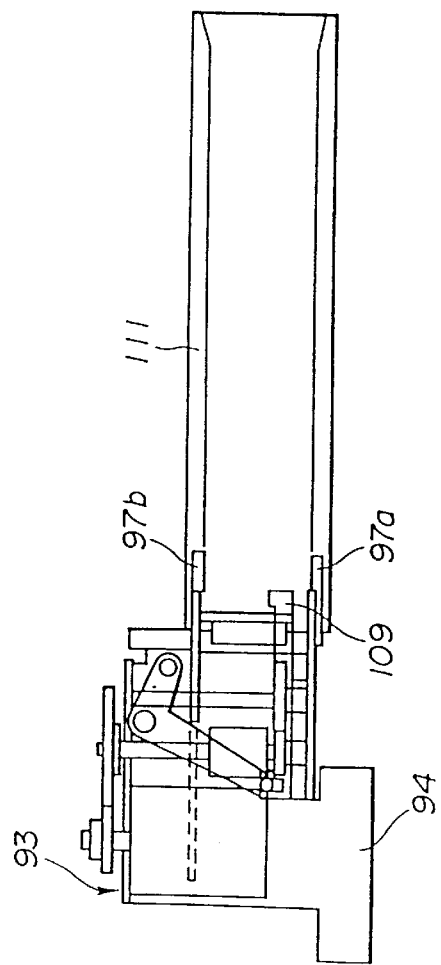

FIG.43
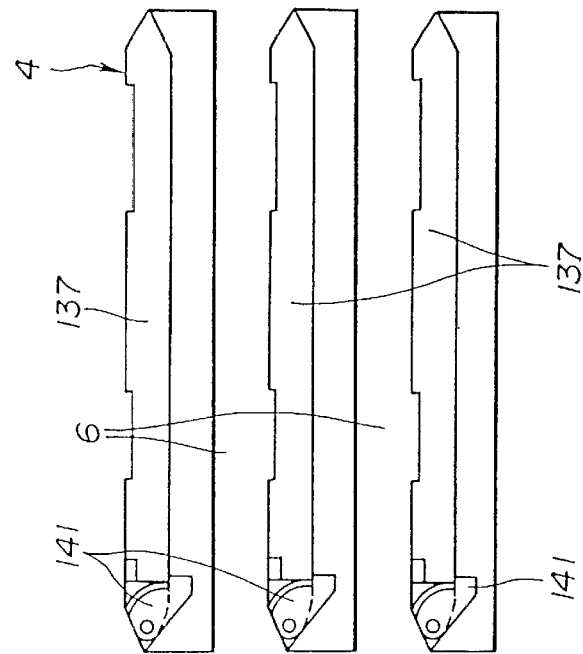
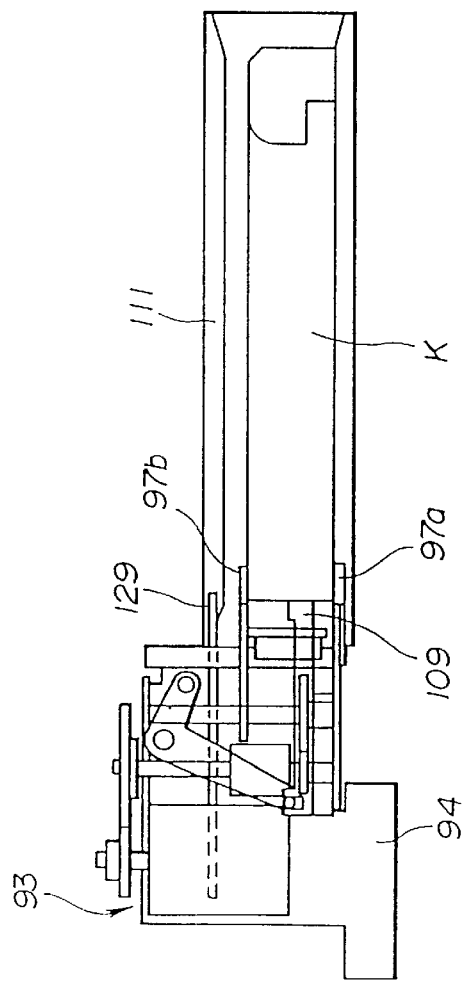

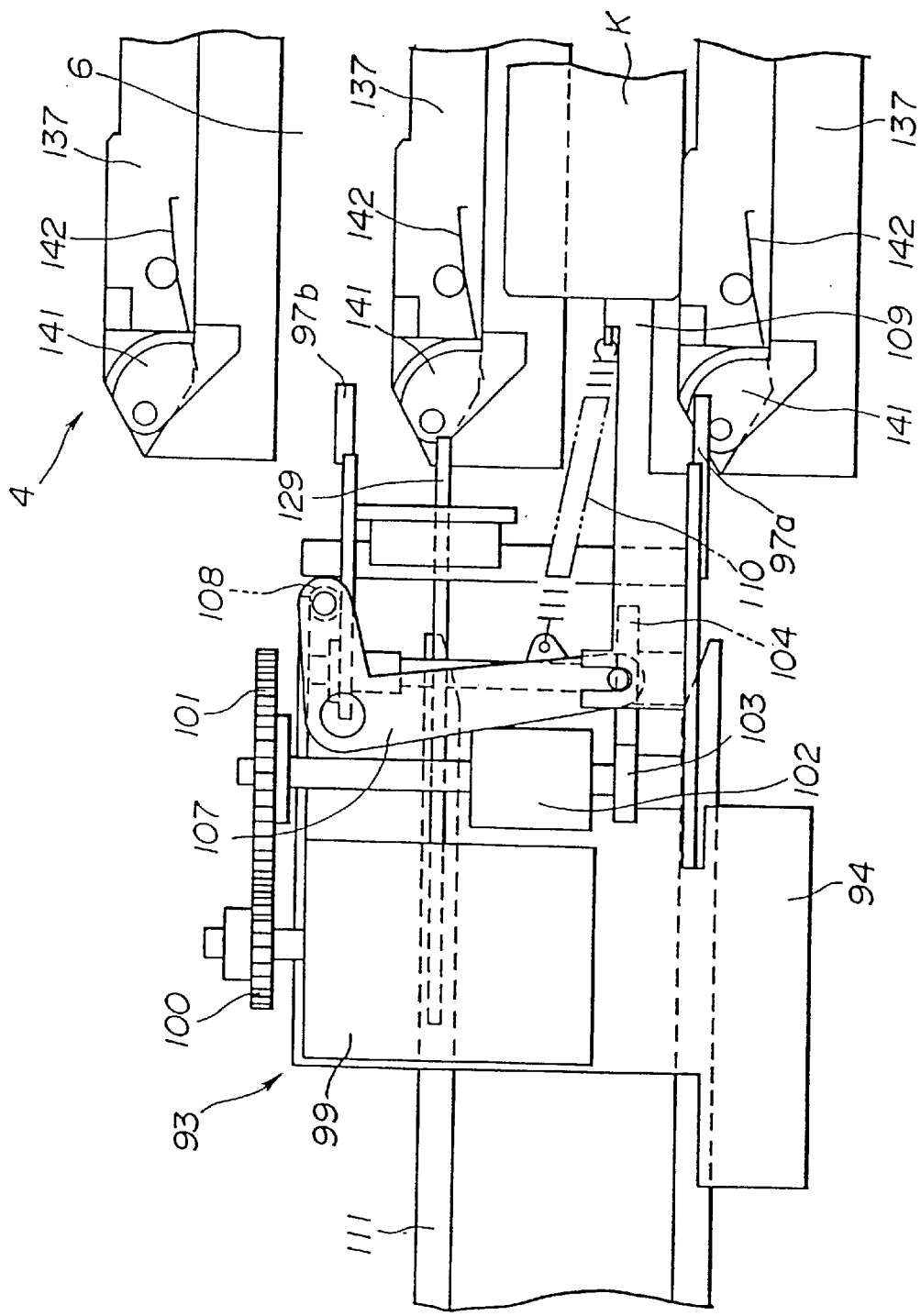

CASSETTE AUTO CHANGER SYSTEM

This application is a division of Ser. No. 08/770,178 filed Dec. 19, 1996 now U.S. Pat. No. 6,166,877.

BACKGROUND OF THE INVENTION

The present invention relates to an auto changer device. Specifically, the present invention relates to an auto changer which may be utilized for automatically changing cassettes in a tape deck or the like.

DESCRIPTION OF THE RELATED ART

Generally, auto changer devices for tape cassettes are known which are used for automatically changing a tape such as an audio cassette, when a currently playing tape has been fully played and another or a plurality of other tapes is installed provided in the changer device.

One such conventional auto changer device is know for example from Japanese Laid Open Patent Application No. 1-243265. Operation of such a conventional auto changer device will be described below with reference to FIGS. 82–85.

First, referring to FIG. 82, a plan view of an arrangement of cassette consoles according to the conventional arrangement is shown. As may be seen the consoles are circular In shape holding a plurality of cassettes in slots accessible from a peripheral surface thereof. Cassette selection is effected via a rotation arm 821 and a cassette transfer mechanism 822 associated therewith. According to this structure however, it is difficult to assure exact positional alignment between a cassette transport portion and the circular cassette consoles during tape selection operations and the like. Further, when a plurality of consoles is implemented, it is necessary to provide a separate tape transport mechanism including a cassette receiving transfer component between each. Thus, the cost and complexity of the auto changer unit becomes high. In addition, the above described arrangement requires a relatively large amount of space for mounting such circular rotating consoles.

Also, in such an arrangement, in addition to the above mentioned components, a console for mounting a cassette playing device and/or cassette compartments including driving means therefor must be provided. Further, a position detection apparatus must be utilized to assure correct alignment of components during tape transfer operations. For example, such a position detection means may be a photoelectric cell mounted proximate a tape shuttle compartment for monitoring a position of the tape transport mechanism.

Referring to FIG. 83, a diagram of such a positional detection means as implemented in the conventional cassette auto changer as described above is shown. As may be seen the detection portion, is positioned proximate a cassette insertion rack 300 having a plurality of cassette insertion chambers 301. The detection portion is configured as a plurality of photoelectric cells provided on the cassette insertion rack. While a movable cassette transport portion 303 within the casing of the auto changer device includes a photoelectric sensor, or the like, 304 thereon. The photoelectric sensor 304 is provided for detecting optimum alignment with a particular photoelectric cell 302 for facilitating calculation of an optimal positional relation between the cassette transport portion 303 and a given one of the cassette insertion chambers 301.

However, according to such arrangement, it is difficult to calculate the exact positional relation between the cassette transport portion and a selected cassette provided in one of the cassette insertion chambers 301 of the cassette rack 300 owing to the contours of the cassette rack. For example, in FIGS. 84 and 85, since the cassette rack 300 in the first case is rounded at an outer surface portion while the latter is tapered, or V-shaped, It becomes difficult to calculate positioning between a cassette and a cassette transport component with high accuracy. Further, according to such arrangement as seen in FIG. 85, rotation of the cassette rack 300 according to cassette selection operation makes accurate determination of a stop position difficult according to the conventional positional detection means.

Thus, while such conventional arrangements require a large space for installation, an operational reliability thereof is degraded.

Further, other conventional auto changer systems have been disclosed, such as in Japanese Patent Application 05-2804 and 07-37308. According to such arrangements, a cassette out port and a cassette in port are provided. That is, ports are provided for removing cassettes from the casing of the auto changer system and inserting cassettes thereinto. However, according to such arrangements, it is not possible to use the cassette input port only. Thus, operations such as when a plurality of cassettes are to be installed into the system become cumbersome. Also, according to the above arrangement, the output port alone may not be utilized for easily removing a plurality of cassettes from the auto changer system.

Japanese Patent Application 05-2804 includes a vertically and horizontally movable cassette support portion which is freely movable according to rotational movement. According to this, timing belts must be provided in the vertical and horizontal directions as well as motors for driving a tape transfer mechanism including the cassette support portion and a larger space is required for installation and electrical usage is increased. Also, electrical cable and wiring for providing such a cassette auto changer system becomes complex.

In addition, according to an auto changer system disclosed in U.S. Pat. No. 2,075,559, a retaining lock provided in each cassette insertion chamber of a cassette rack, is designed to be released by a lock releasing mechanism provided on the cassette transfer mechanism. However, according to this, a separate driving means is required for activating a lock release lever of the cassette transfer mechanism to engage a lock lever of a cassette insertion chamber. Thus, the complexity and number of component parts is increased in addition to a basic cost for the auto changer system.

Thus it has been required to provide a compact, reliable cassette auto changing apparatus having a relatively uncomplicated structure such that manufacturing expense and complexity are minimized while assuring a highly functional unit which may be installed in a comparatively small area space.

Also, it is desirable to provide a cassette auto changer system in which is simplified and has a reduced number of components.

Reliable determination of positioning between components is further required in such a compact cassette auto changer system.

In addition, reduced electrical requirements and simplified wiring, as well as smaller capacity cable is desirable in such an auto changer system.

Provision of cassette locking and release mechanisms which are simplified is desired.

A cassette auto changer system which may execute cassette transfer operations in a reduced space is necessary for providing a compact apparatus.

And, flexible use of port openings according to an operation desired by the user is a feature to be desired in such a cassette auto changer system.

SUMMARY OF THE INVENTION

Thus, it is an object of the present invention to overcome the drawbacks of the related art.

It is a another object of the invention to provide a compact, reliable cassette auto changer apparatus having a relatively uncomplicated structure.

It is a further object of the invention to provide a cassette auto changer system wherein manufacturing expense and complexity are minimized while assuring a highly functional unit which may be installed in a comparatively small area space.

It is a further object of the invention to provide a cassette auto changer system which is simplified and has a reduced number of components.

It is a further object of the invention to provide a cassette auto changer system wherein reliable determination of positioning between components is assured.

In addition, a further object of the invention is to provide a cassette auto changer system wherein reduced electrical requirements and simplified wiring, are provided as well as smaller capacity cable and cassette locking and release mechanisms which are simplified.

Another object is to provide a cassette auto changer system which may execute cassette transfer operations in a reduced space is necessary for providing a compact apparatus.

And, a further object is to provide a cassette auto changer system having flexible use of port openings according to an operation desired by the user.

According to one aspect of the invention, there is provided a cassette auto changer system including tape signal reading means and selection means for selecting between a plurality of cassettes, comprising: a base console including a port for tape insertion or extraction operations and having a tape insert compartment; a drive console mounting the tape signal reading means; a cassette console mounting a cassette rack including a plurality of cassette receiving compartments; and tape transfer means for transporting tape cassettes between the cassette console and the drive console.

According to another aspect of the invention, there is provided a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; a pair of position detection portions provided in a longitudinal direction of an opening of each of the cassette receiving compartments at either side of the opening; a pair of position detection sensors provided on the tape transfer mechanism at a position substantially corresponding to a location of the position detection portions when the tape transfer mechanism is in a loading position relative to one of the cassette receiving compartments.

According to a still further aspect of the invention, there is provided a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; wherein a pair of position detection portions provided in a longitudinal direction of an opening of each of the cassette receiving compartments at either side of the opening; a pair of position detection sensors provided on the tape transfer mechanism at a position substantially corresponding to a location of the position detection portions when the tape transfer mechanism is in a loading position relative one of the cassette receiving compartments; a pair of opposed slanted reference lines provided above each of the position detection portions and a reference position indicator therebetween; wherein in a direction perpendicular to a scanning direction of the tape transport means a positional reference line is provided, wherein, between the opposed slanted reference lines, a positional detection area and a non-detection area defined therein and a non-detection and a positional detection area are defined outside of the slanted reference lines.

Also, according to the invention, there is provided a cassette auto changer system including means for selectably providing a plurality of cassettes to be loaded into one or more tape signal reading means, comprising: a cassette rack including a plurality of cassette receiving compartments; a cassette port accessible from an outer side of the auto changer apparatus whereby cassettes may be inserted or removed from the auto changer apparatus; a tape transfer mechanism operable to selectably transport cassettes between the cassette rack and the tape signal reading means and the cassette port; a YES/NO sensor at the cassette port for determining whether a cassette is present in the cassette port; and control means active such that, when a YES indication determined by the YES/NO sensor changes to a NO determination, the control means sets the cassette port at an IN port empty condition and, when in such IN port empty condition the YES/NO sensor changes to a YES condition wherein a cassette is present in the cassette port, operation of the tape transfer mechanism to the cassette port is disabled and an IN port loaded condition is determined, and when, in an IN port empty condition of the cassette port, operation of the tape transfer means is detected by the YES/NO sensor, the control means determines an OUT port loaded condition of the cassette port, and when in the OUT port loaded condition a change from YES to NO is determined by the YES/NO sensor, an IN port empty condition of the cassette port is determined by the control means.

In addition, according to a still further aspect, of the invention, there is provided a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; wherein at least horizontal rotation of a movable cassette shuttle body of the tape transfer mechanism is possible; and a transfer area whereat up/down movement of the tape transfer mechanism is possible; a rotation area is defined for allowing rotation of the cassette shuttle body of the tape transfer mechanism.

Another aspect of the invention provides a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means;

a console portion of the cassette includes horizontally disposed guide rails at upper and lower sides of the cassette rack; and an electrically conductive rail disposed proximate the horizontally disposed guide rails; wherein a cassette shuttle body of the tape transfer mechanism is movable along the guide rails via the electrically conductive rail.

And, a still further aspect of the invention, there is provided a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; a cassette supporting shuttle body, operably associated with the tape transfer mechanism; wherein the cassette supporting shuttle body is rotatably moveable in both horizontal and vertical directions.

According to a yet another aspect of the invention, there is provided a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; a cassette supporting shuttle body, operably associated with the tape transfer mechanism; and a cassette hand portion connected with the cassette supporting shuttle body operable to effect extraction operation from a selected one of the cassette receiving compartments of the cassette rack; wherein the cassette hand portion further includes an unlock lever, engageable with a corresponding lock lever of the cassette receiving compartments for effecting an unlocked state of the cassette receiving compartment during engagement with the cassette hand portion for facilitating extraction operation.

Additionally, one aspect of the invention provides a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; upper and lower guide rails disposed at an upper side of the auto changer system; a horizontally movable slider portion of the tape transfer mechanism disposed above the guide rails; a cassette shuttle body movable along a vertical path intersecting a horizontal path of the slider portion; and driving means for the cassette shuttle body also acting as driving means for the horizontally movable slider portion.

And also, according to the invention, there is provided a cassette auto changer system including means for selectably providing a plurality of cassettes to be loaded into one or more tape signal reading means, comprising: a cassette rack including a plurality of cassette receiving compartments; a tape transfer mechanism operable to selectably transport cassettes between the cassette rack and the tape signal reading means; the tape transfer mechanism including a cassette supporting shuttle body Including an opposed pair of cassette guide portions engageable with opposed side portions of a cassette disposed in a selected cassette receiving compartment of the cassette rack; centering means for driving the cassette guide portions in left and right directions in relation to an axis thereof for effecting centering operation of the cassette guide portions.

BRIEF DESCRIPTION OF THE DRAWINGS

FIG. 2(a) shows a plan view of a main portion of a base console of the device while

FIG. 3(a) is a left side view of the device of the embodiments and FIG. 3(b) is a right side view thereof;

FIG. 5(a) is a cross-sectional view of the auto changer device taken along line a—a of FIG. 4(a), FIG. 5(b) shows a right hand side view of the drive of the auto changer according to the embodiment.

FIG. 6(a) is a plan view of a cassette console of the preferred embodiment while FIG. 6(b) shows a front view thereof;

FIG. 9(a) is a left side view of the base console of FIG. 8 and FIG. 9(b) shows the right side thereof;

FIG. 11 is a plan view showing operational motion of the cassette shuttle mechanism;

FIG. 36(a) is a cross sectional view for explaining operation of a main portion of the head mounting structure while FIGS. 36(b), (c) and (d) illustrate operation of the main portion of the head mounting structure during left, right and upward positional variation thereof;

FIGS. 37(a) and 37(b) show a perspective views of the configuration of a cassette rack portion of the auto changer system including a single cassette retaining portion (FIG. 37(b));

FIG. 40 shows a main portion of the cassette transfer mechanism during one phase of a cassette selection operation thereof;

FIG. 43 is a cross-sectional plan view of a cassette conveyance operation of the cassette transfer mechanism at a first operational phase;

FIG. 51 is a front view of a main portion of the invention at the time of insertion of a cassette from the cassette shuttle compartment by the cassette transfer mechanism;

FIG. 54(a) shows a front view of a relation between the cassette shuttle compartment and a cassette guide portion while

DESCRIPTION OF THE PREFERRED EMBODIMENT

Figure 1:
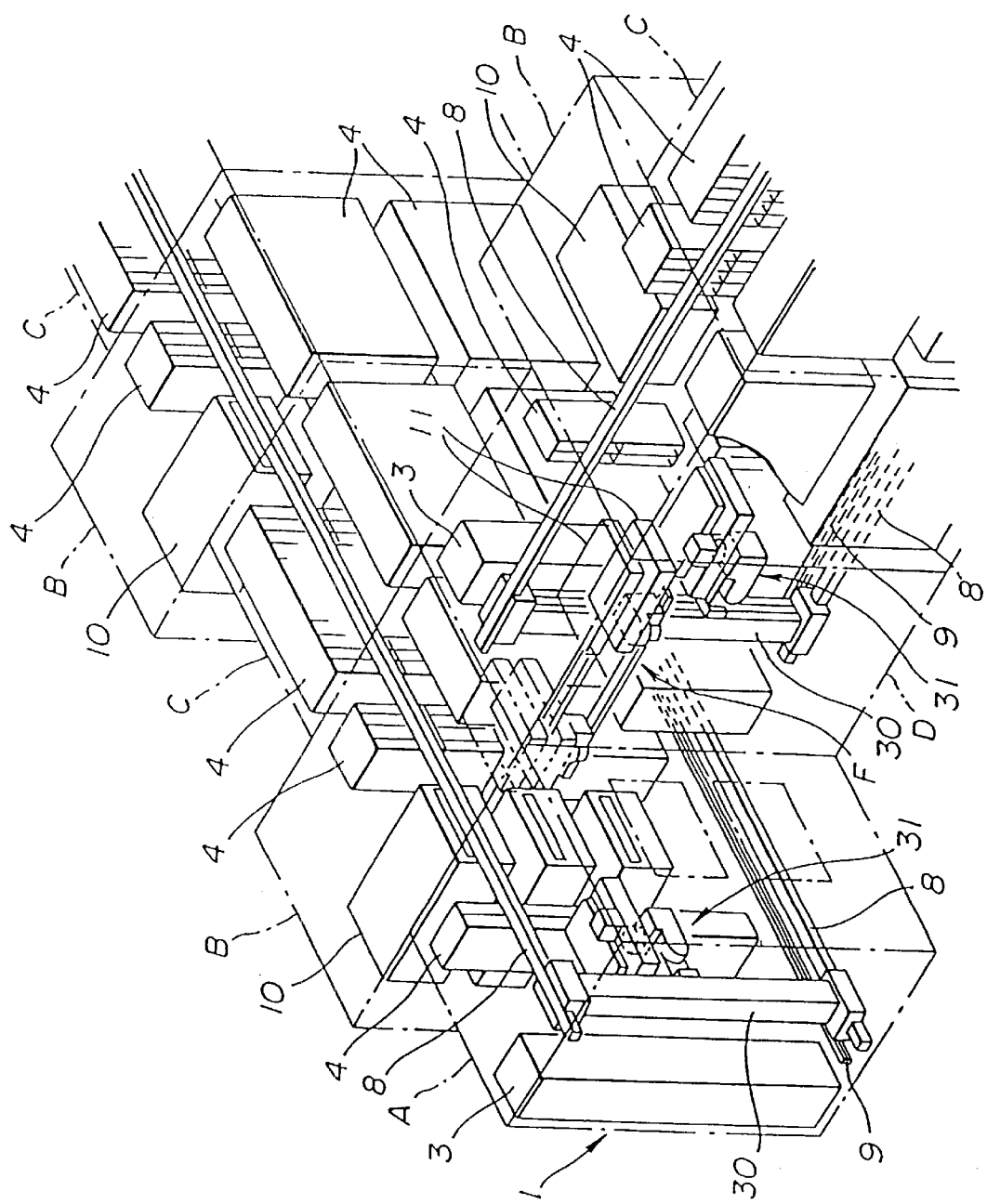
FIG. 1 is an perspective view of a preferred embodiment of an auto changer device according to the invention.

Hereinbelow, a preferred embodiment of the invention will be explained in detail with reference to the drawings. FIG. 1 is an perspective view of a preferred embodiment of an auto changer device according to the invention.

Referring to FIGS. 1–3, the auto changer system 1 according to the invention includes a base console A, a drive console B, a cassette console C, an elongate console D, a cassette rack portion 7 and a tape playing or tape playing/recording device 10. Further included are a tape transfer mechanism 2, a power supply 3 for a horizontally movable shuttle body of the tape transfer mechanism. There is another tape transfer mechanism F for transporting cassettes K to and from a playing device from the cassette console C.

Figure 2A:
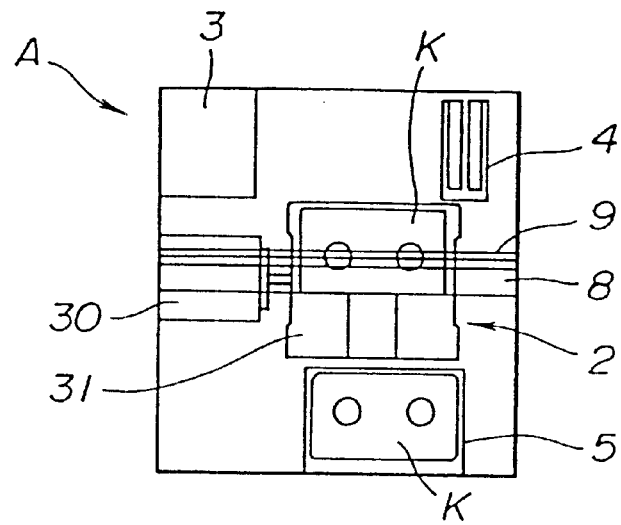
Figure 2B:
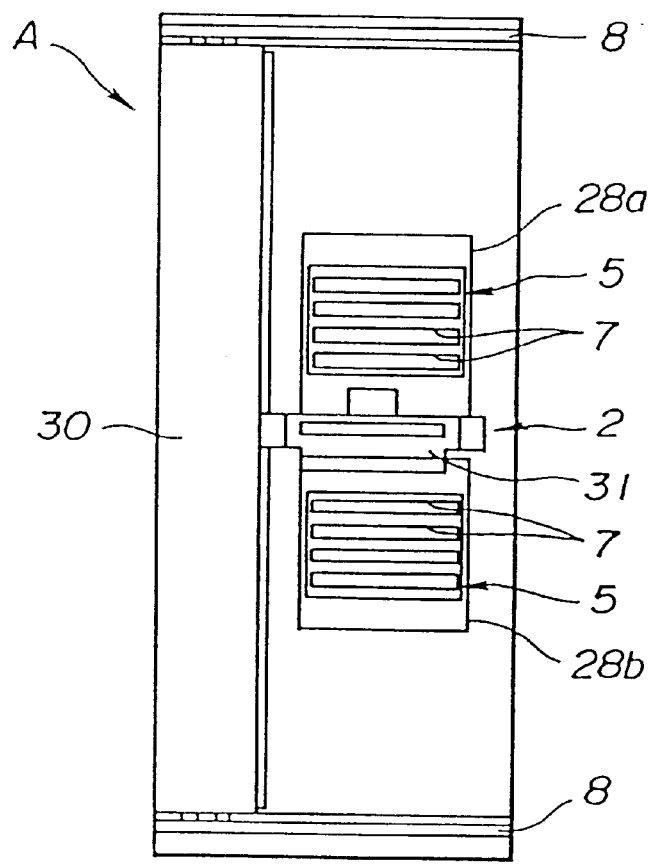
FIG. 2(b) shows a front view thereof.

FIG. 2(a) shows a plan view of a main portion of the base console A of the device while FIG. 2(b) shows a front view thereof. There may be seen in FIGS. 2(a) and (b) that the tape transfer mechanism extends laterally across the base console and includes a cassette shuttle body 21. FIG. 3 shows a cassette transport area CE which is a clearance defined to allow the tape transfer mechanism 2 to selectably transport cassettes K to one or more playing devices 10.

FIG. 3(a) shows a left side view of the base console A and FIG. 3(b) is a right side view thereof. Mounted on the base console at an end of a cassette transfer area CE is a control box 3 having a small cassette bay 4 provided at upper and lower sides thereof. Each cassette bay 4 includes a plurality of cassette receiving compartments 6. A controller including electrical circuitry or the like is included therein. Also, at a front side of the cassette transfer area CE upper and lower input/output cassette bays 5 are provided at lower and upper sides of the base console to allow cassettes bo be inserted into or removed from the auto changer system 1. Each cassette bay 4 includes a plurality of cassette receiving compartments 6 while each input/output cassette cassette bay 5 includes a plurality of cassette insert compartments 7. According to the present embodiment, four cassette insert compartments 7 are provided which are accessible from an outer side of the base console A for allowing cassette to be inserted into or removed from the auto changer system 1. Each of the cassette insert compartments 7 is respectively openable and closable by upper and lower hatches 28a, 28b.

Also, the cassette transfer area CE of the base console A at upper and lower sides thereof, has horizontally disposed guide rails 8 mounted therein in base console A horizontal transport direction of the cassette transport mechanism 2. Further, according to the preferred embodiment, an electrically conductive drive rail 9 is provided substantially proximate and along the course of, the lower guide rail 8.

Also, the base console A is selectably connectable with one or more drive consoles B, cassette consoles C and/or elongate consoles D or with another base console A. When the base console A is connected with the elongate console D outer access via the input/output cassette bay 5 is enabled.

Although according to the preferred embodiment, the present invention is drawn to an auto changer system 1 for the playing of tape cassettes, the present invention is not limited thereto. Alternatively, the invention is applicable to cassette playing and recording arrangements as well as to an auto changer for cassette casings mounting disks therein, such as data disks or other types of disk media.

Hereinbelow, an arrangement of the drive console B will be explained with reference to FIGS. 1, 4 and 5.

Figure 4A:
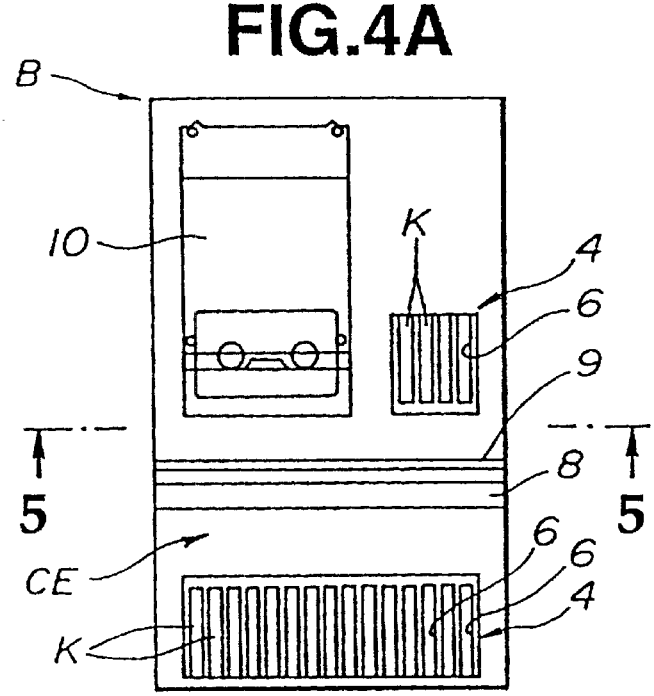
FIG. 4(a) is an enlarged plan view of a drive console portion of an auto changer device according to the embodiment.
Figure 4B:
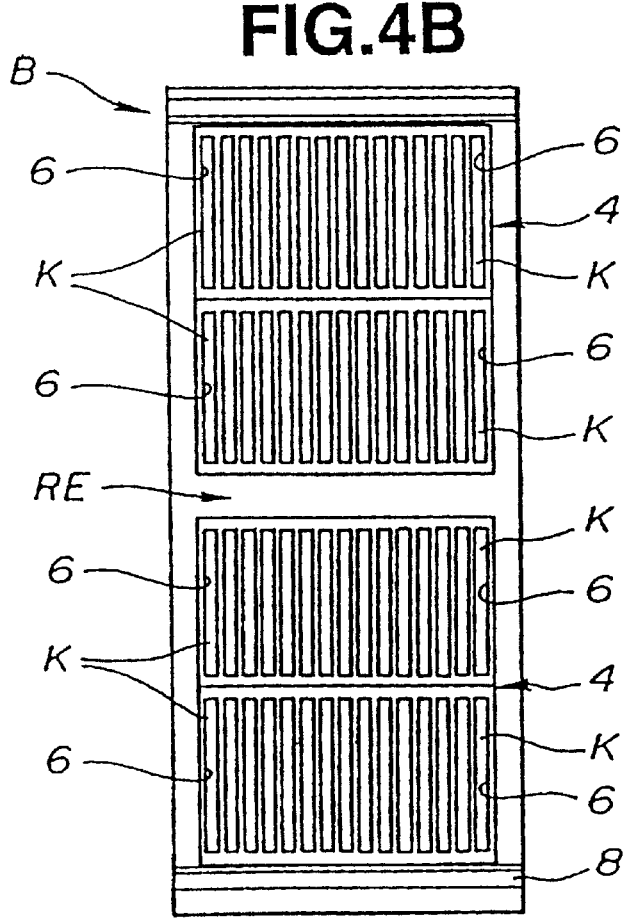
FIG. 4(b) shows a front view thereof.

FIG. 4(a) is an enlarged plan view of a drive console portion of an auto changer device according to the embodiment, FIG. 4(b) shows a front view thereof.

FIG. 5 is a cross-sectional view of the auto changer device taken along line a—a of FIG. 4(a), FIG. 5(b) shows a right hand side view of the drive console drive console B of the auto changer according to the embodiment.

When the base console A and the drive console B are connected a rear portion of the base console may protrude in the longitudinal direction of the console. At a rear side of the cassette transfer area CE, the drive console B includes a cassette transfer area CE corresponding to that of the base console A and includes three playing devices 10 at an upper side thereof as well as small, upper and lower cassette bays 4. At a front side of the cassette transfer area CE a pair of large, upper and lower cassette bays 4 are provided.

A cassette insert opening 10a of each playing device 10 may be positioned to correspond with a cassette K in a cassette receiving compartment 6 of the cassette bay 4.

Also, the cassette transfer area CE of the drive console B at upper and lower sides thereof, has horizontally disposed guide rails 8 mounted therein in base console A horizontal transport direction of the cassette transport mechanism 2, further, according to the preferred embodiment, an electrically conductive drive rail 9 is provided substantially proximate and along the course of, the lower guide rail 8 as with the base console A.

Also, the drive console B is selectably connectable with one or more base consoles A, cassette consoles C and/or elongate consoles D or with another drive console B. When the drive console A is connected with the elongate console D outer access via the input/output cassette bay 5 is enabled.

Hereinbelow, an arrangement of the cassette console C will be explained with reference to FIGS. 1, 6 and 7.

The cassette console C includes a cassette transfer area CE corresponding to that of the base console A and includes large, upper and lower cassette bays 4 receiving cassettes K in a plurality of cassette receiving compartments 6 of the cassette bay 4.

Also, the cassette transfer area CE of the cassette console C at upper and lower sides thereof, has horizontally disposed guide rails 8 mounted therein in base console A horizontal transport direction of the cassette transport mechanism 2. Further, according to the preferred embodiment, an electrically conductive drive rail 9 is provided substantially proximate and along the course of, the lower guide rail 8 as with the base console A.

Also, the cassette console C is selectably connectable with one or more base consoles A, drive consoles B and/or elongate consoles D or with another cassette console C. When the cassette console C is connected with the elongate console D access via the upper cassette cassette bay cassette bay 4 is enabled.

Now, referring to FIGS. 1, 8 and 9, the elongate console according to the invention will be described hereinbelow.

Figure 7A:
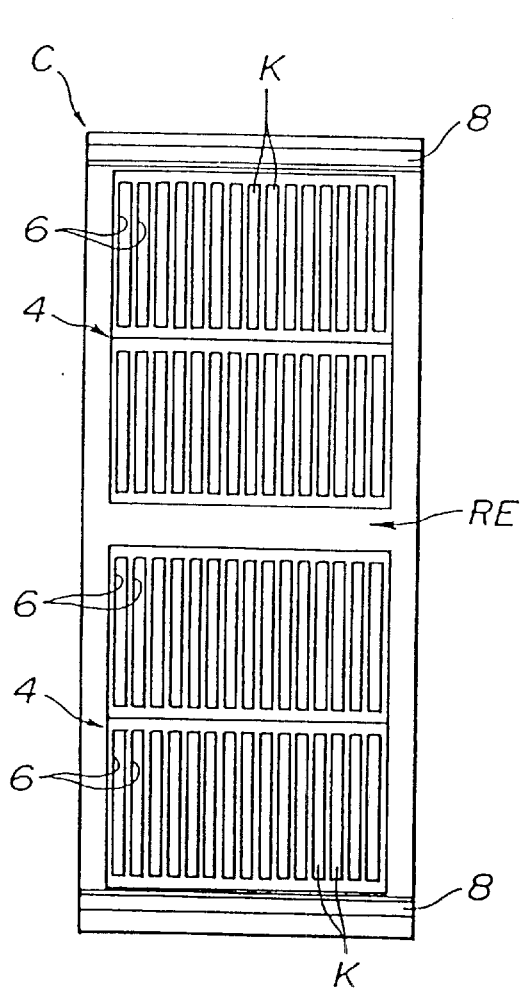
FIG. 7(a) is a cross-sectional view taken along line b—b of FIG. 6(a)
Figure 7B:
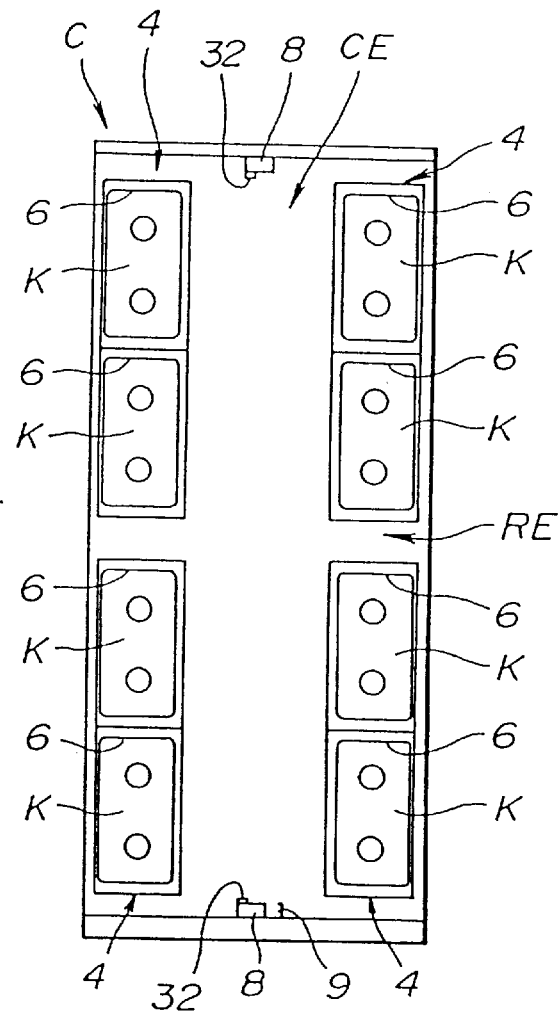
FIG. 7(b) shows a right side view of the cassette console.
Figure 8A:
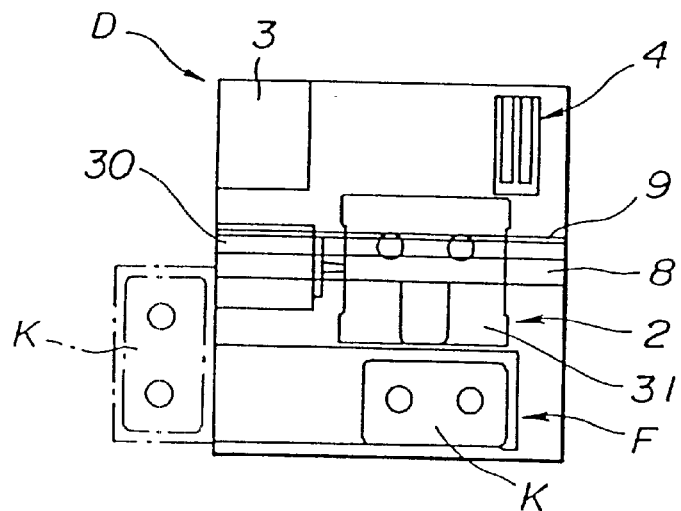
FIG. 8(a) is an enlarged plan view of a base console according to the invention and FIG. 8(b) is a front view of the enlarged base console.
Figure 8B:
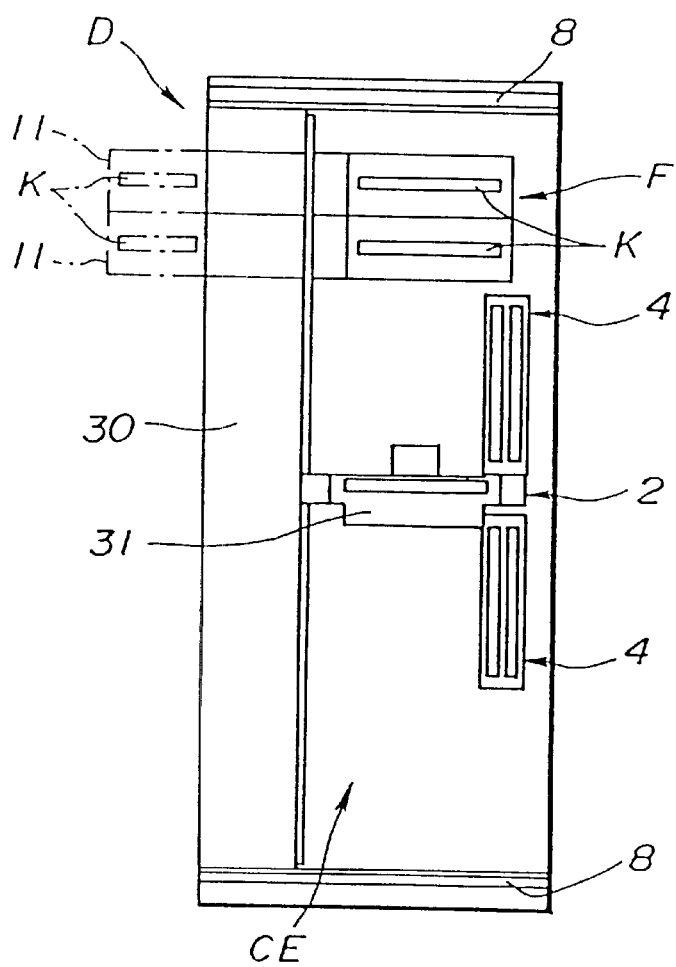

FIG. 6(a) is a plan view of a cassette console of the preferred embodiment while FIG. 6(b) shows a front view thereof. FIG. 7(a) is a cross-sectional view taken along line b—b of FIG. 6(a), FIG. 7(b) shows a right side view of the cassette console. FIG. 8(a) is an enlarged plan view of a base console according to the invention and FIG. 8(b) is a front view of the enlarged base console. FIG. 9(a) is a left side view of the base console of FIG. 8 and FIG. 9(b) shows the right side thereof.

The elongate console D is longitudinally aligned with the base console A such that the cassette transfer areas CE thereof correspond substantially. Further, the size of the base and elongate consoles is substantially the same. Mounted on the base console at an end of a cassette transfer area CE is a control box 3 having a small cassette bay 4 provided at upper and lower sides thereof. Each cassette bay 4 includes a plurality of cassette receiving compartments 6. Electrical circuitry for the control box 3 is also included.

Also, the cassette transfer area CE of the elongate console D at upper and lower sides thereof, has horizontally disposed guide rails 8 mounted therein in the horizontal transport direction of the cassette transport mechanism 2, further, according to the preferred embodiment, an electrically conductive drive rail 9 is provided substantially proximate and along the course of, the lower guide rail 8 as with the base console A.

Also, the elongate console D is selectably engageable in a first engagement direction and a second engagement direction crossing the first engagement direction, which may be perpendicular to the first engagement direction.

Referring to FIGS. 1, 8, 9 playing device 10 and 11, a cassette shuttle portion 11 of the auto changer system 1 according to the invention will be described hereinbelow. A plurality of cassette shuttle portions may be implemented in the auto changer system 1. Each cassette shuttle portion 11 includes a cassette insert opening 12 at one side thereof. A pair of the cassette shuttle portions are, according to the preferred embodiment, driven together by a single driving means.

Figure 10:
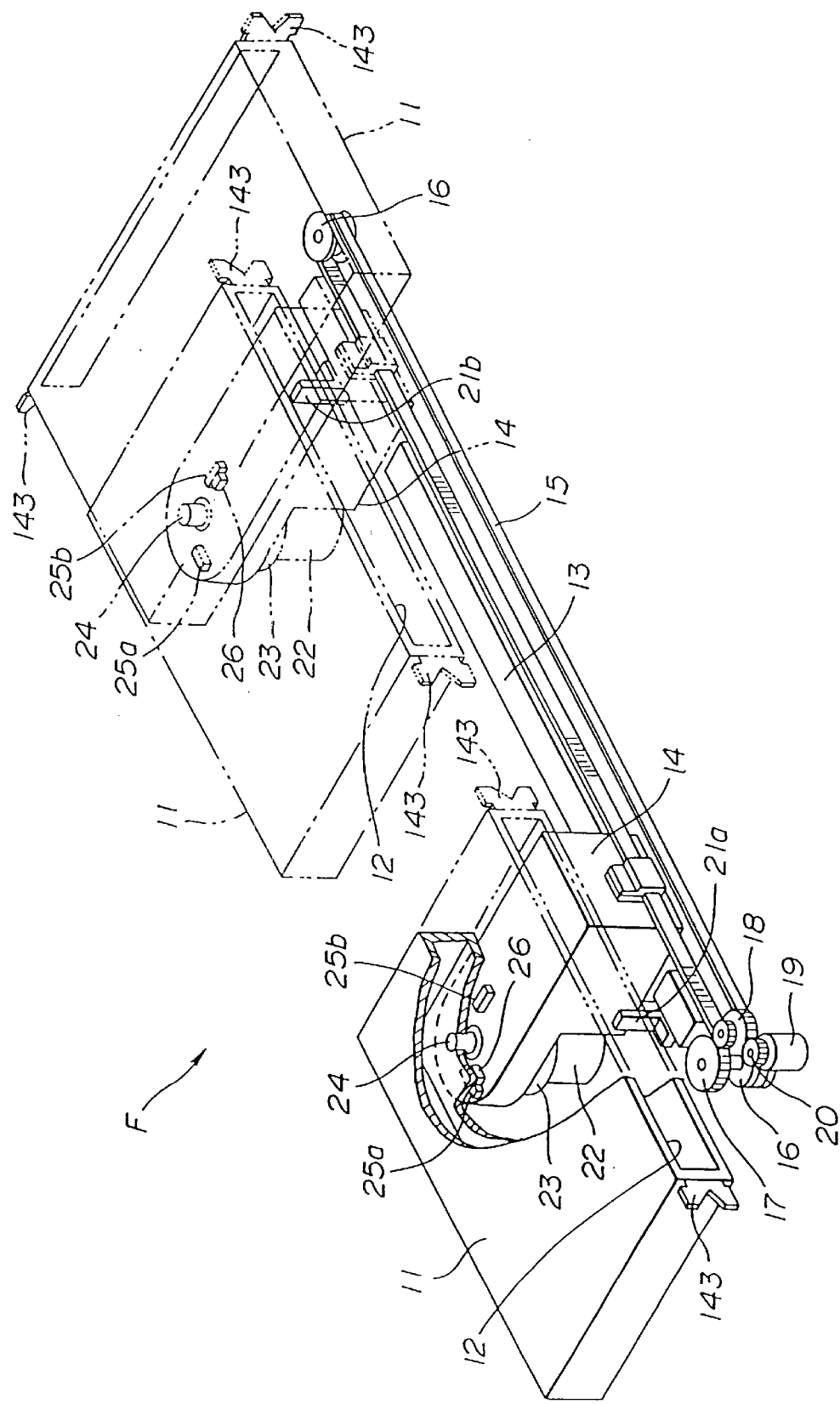
FIG. 10 is a partially cut away perspective view of a cassette shuttle mechanism of the auto changer device of the invention.

Referring to FIGS. 10 and 11, FIG. 10 is a partially cut away perspective view of a cassette shuttle mechanism of the auto changer device of the invention and FIG. 11 is a plan view showing operational motion of the cassette shuttle mechanism. A pair of cassette shuttle portions 11 are shown affixed to the elongate console D. Extending proximate the pair of guide rails 8, a slide rail 13 is disposed along which a slide block 14 is movably disposed. The slide block 14 is engaged with a timing belt 15 disposed between a pair of pulleys 16. The pulley 16 is driven at one side by gears 17, 18 driven by a motor 19 engaged with a larger drive gear 20. Further, a pair of stoppers 21a, 21b are provided to limit the slidable area of the slide block 14.

At a lower side the slide block 14 is engageable with a rotation motor 22 and reduction gear 23. The rotation motor 22 and reduction gear 23 determine a rotational speed of an output axis 24 of the cassette shuttle portion 11. The output shaft 24 protrudes from an upper surface of the slide block and is active to rotate the cassette shuttle portion by ninety degrees. Further, a pair of stopper portions 25a and 25b are projected from the upper side of the slide block 14. Also, a stopper 26 is projected from a lower side of the cassette shuttle portion such that, when the stopper 26 engages the stopper 25a a first set position of the cassette shuttle portion 11 is established and, when the stopper 26 engages the second stopper 25b a second set position of the cassette shuttle portion 11 is established.

Also, it is a feature of the invention that, for compactness, an overall width of the cassette transfer area CE is kept substantially equal to a width of the cassette shuttle portion 11.

When the pair of cassette shuttle portions 11 are positioned such that one is turned in a first direction and one in the second direction perpendicular to the first direction, the first cassette shuttle is positioned to receive a cassette K from a first cassette transport mechanism 2 and the second cassette shuttle portion is positioned to received another cassette K from a second cassette transport mechanism 2 associated, for example with a different console than the first cassette transport mechanism 2.

The cassette transport mechanism 2 according to the invention is movable horizontally within the modular consoles A–D along the opposed upper and lower guide rails 8, 8 thereof by means of a horizontally movable body portion 30. Further, a vertically movable cassette shuttle body 31 is enabled to move vertically between the upper and lower guide rails 8, 8. The vertically movable cassette shuttle body 31 is driven by driving means as will be described hereinbelow. Also, the vertically movable cassette shuttle body 31 is active to effect transport of the cassettes K between the cassette receiving compartments 6 and a playing device 10.

In addition, a console in a first engaging direction provided with a first cassette transport mechanism 2 and playing device 10 as well as a plurality of cassette receiving compartments 6 and a second console in a second engaging direction having a second playing device 10, cassette transport mechanism 2 and a plurality of cassette receiving compartments 6 may be implemented according to the invention.

Figure 12A:
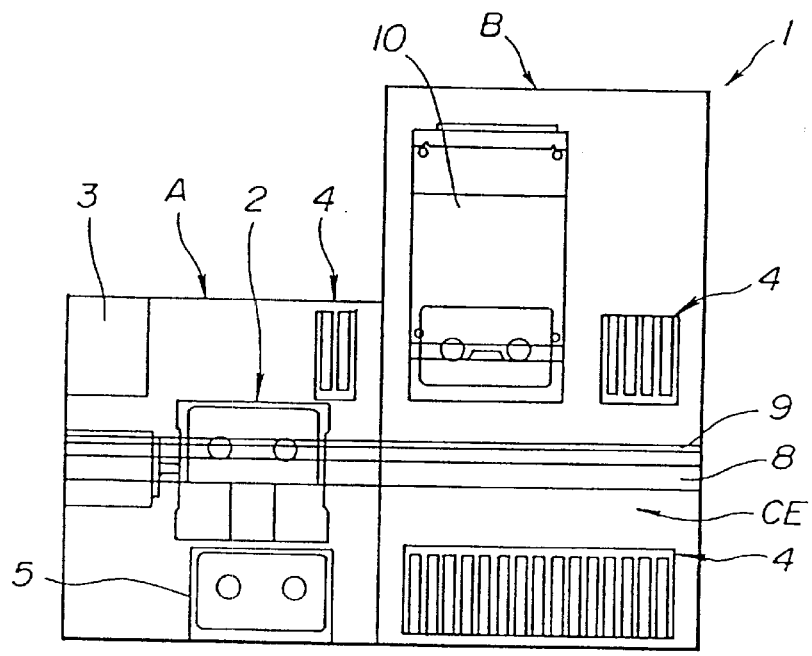
FIGS. 12(a) and 12(b) respectively show plan and front views of a compact cassette auto changer system according to the preferred embodiment.
Figure 12B:
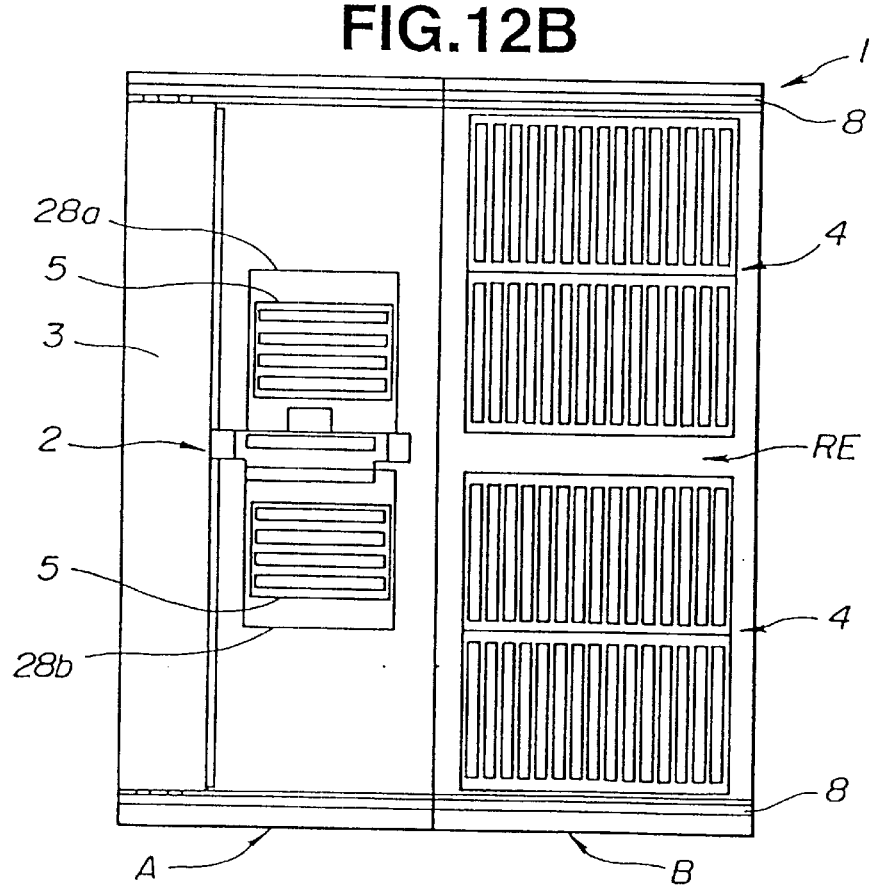
Figure 13:
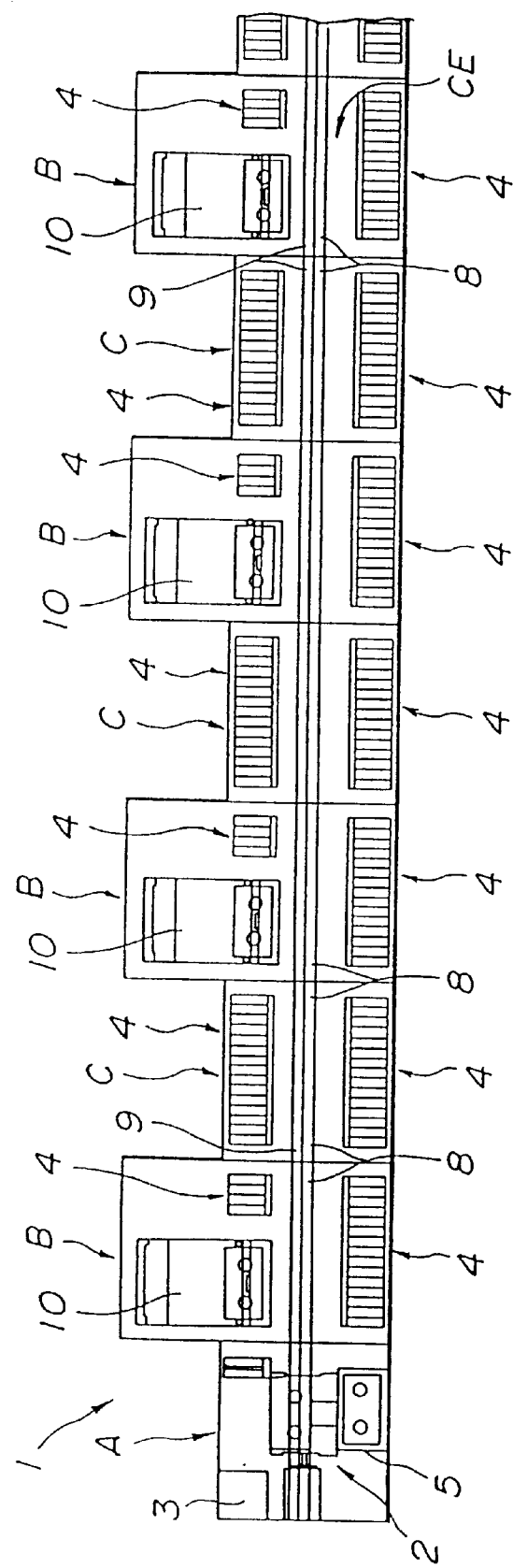
FIG. 13 is a plan view schematic diagram for explaining operation of the cassette auto changer in a single axial direction according to a first embodiment of the system of the invention.
Figure 14:
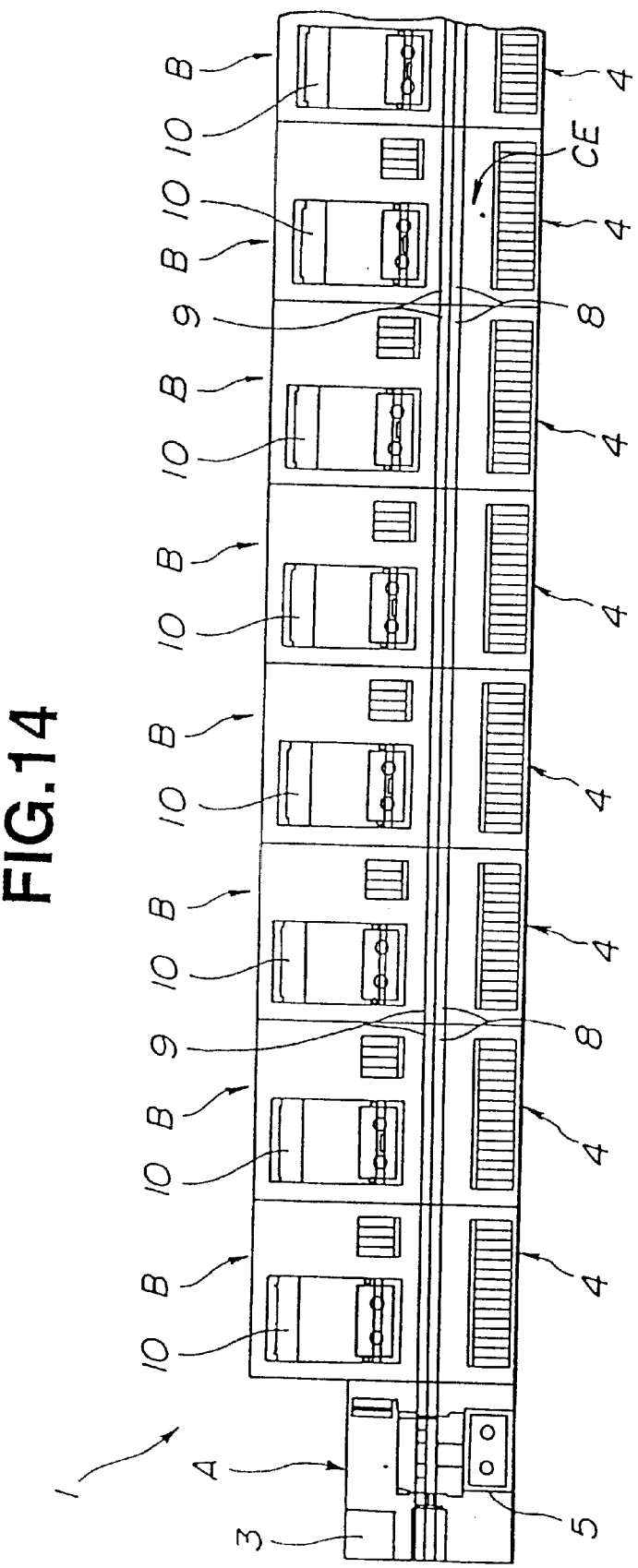
FIG. 14 is a plan view schematic diagram for explaining operation of an alternative embodiment of a cassette auto changer of the invention.

FIGS. 12(a) and 12(b) respectively show plan and front views of a compact cassette auto changer system according to a preferred embodiment in which a second cassette transport mechanism 2 is impemented between a base console A and a drive console B. FIG. 13 is a plan view schematic diagram for explaining operation of a compact cassette auto changer system according to an embodiment of the system of the invention including interchangable engagement between a plurality of drive consoles B and cassette consoles C. FIG. 14 is a plan view schematic diagram for explaining operation of an alternative embodiment of a cassette auto changer system auto changer system 1 according to the invention. The compact system of FIG. 14 is set in a different arrangement than that of FIG. 13 in that a single cassette console engages a plurality of drive consoles, although, similarly to FIG. 13, a single engaging direction is utilized.

Figure 15:
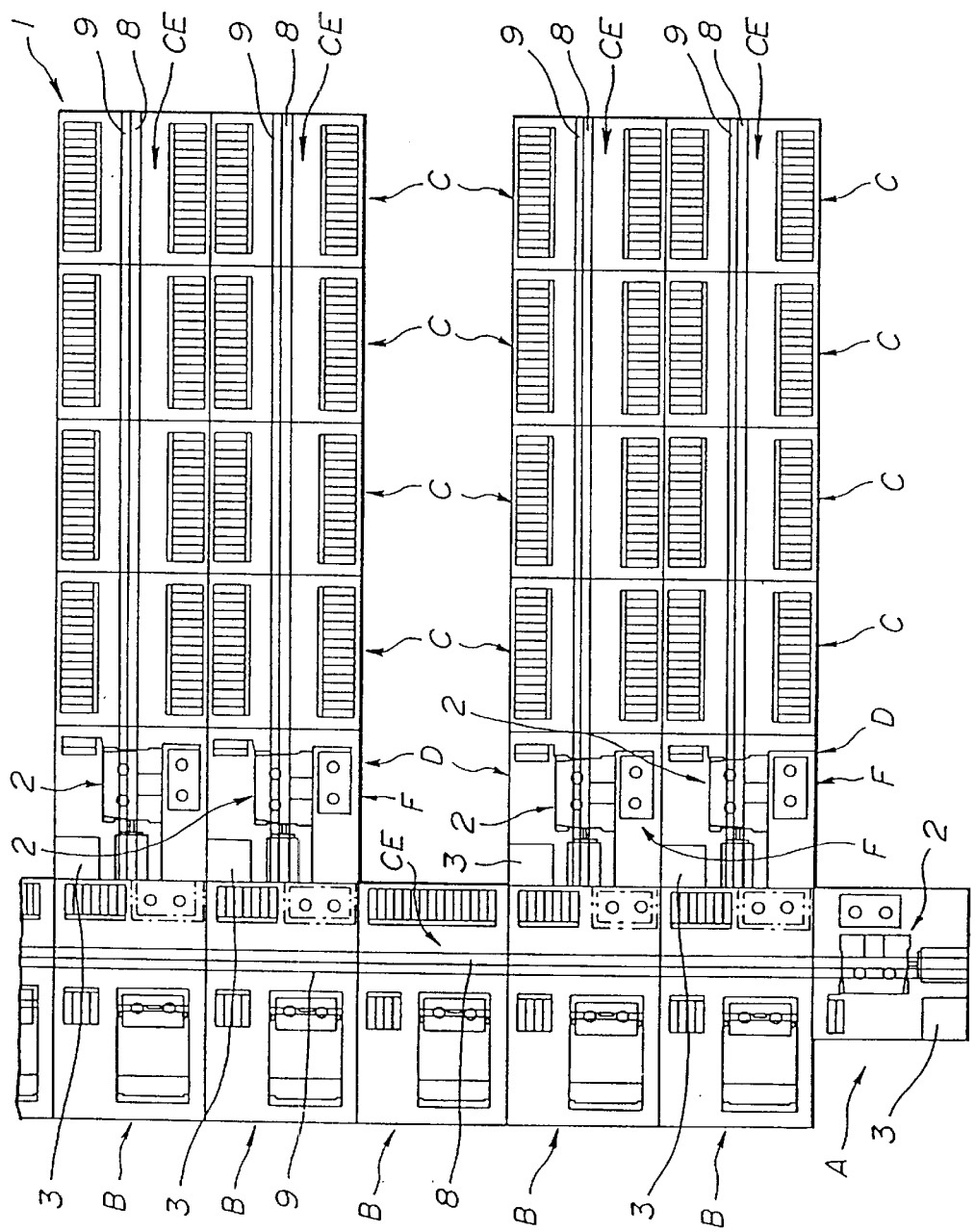
FIG. 15 is a plan view schematic diagram of a first embodiment of a biaxially operable cassette auto changer.

A view of a cassette auto changer system having an opposite relation to that of FIG. 14 is shown in FIG. 15, which is plan view schematic diagram of a biaxially operable cassette auto changer at a timing in which a front side of the drive console B is engaged with the elongate console D. Unlike FIG. 14, the second axial direction is elongated. According to this, for example, if, a cassette from a cassette shuttle body 11 of the second cassette transport mechanism 2 is engaged via a transport mechanism F of the auto changer, to transport a cassette K in the second axial direction toward the other of the paired cassette shuttle bodies 11, the other cassette shuttle body 11 of the other cassette transport mechanism 2 is urged in the first direction is engaged to transport a cassette K loaded therein to a playing device 10.

Figure 16:
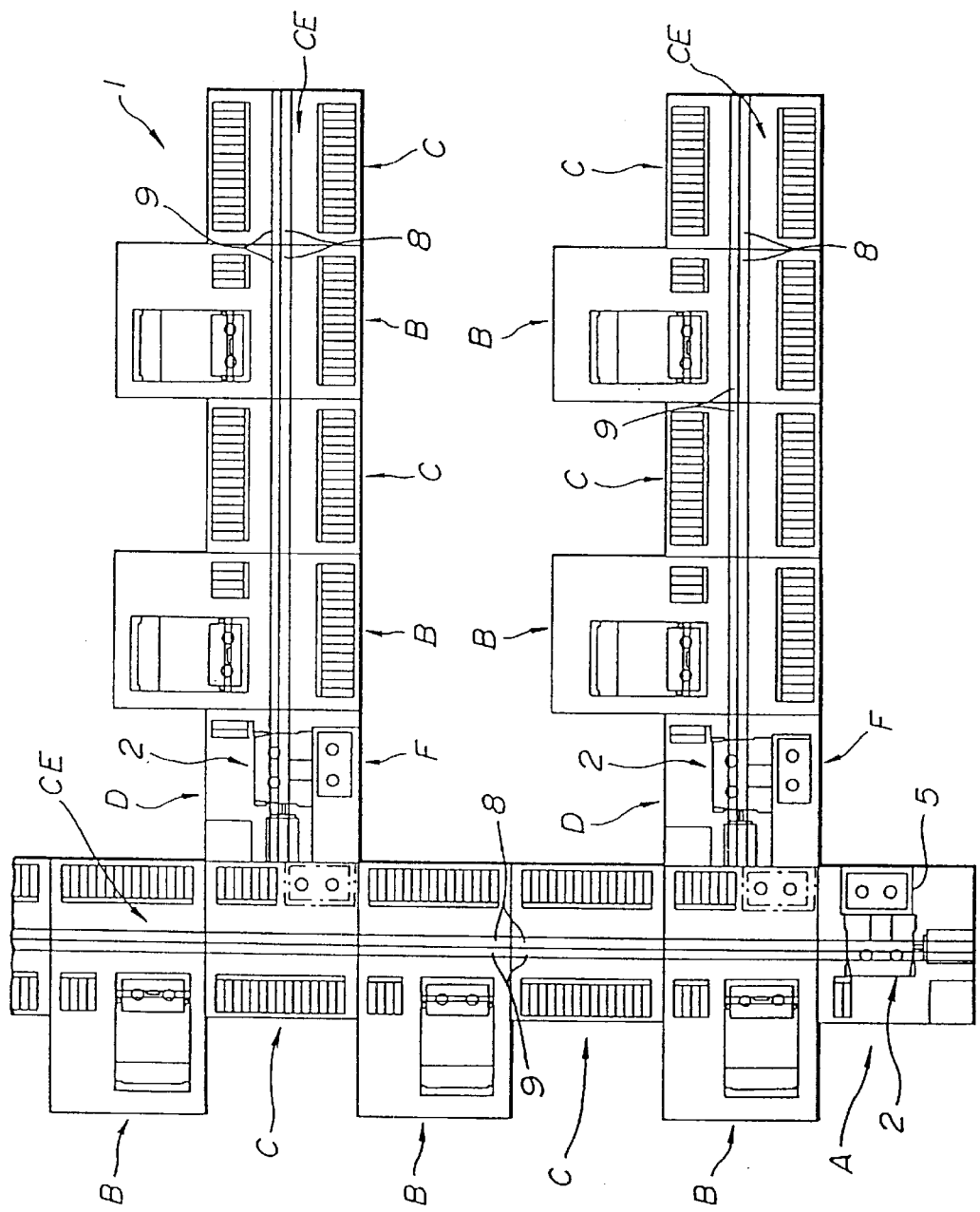
FIG. 16 is a plan view schematic diagram of a second embodiment of a biaxially operable cassette auto changer.

FIG. 16 is a plan view schematic diagram of a biaxially operable cassette auto changer system arranged in a different structure than that of FIG. 13. According to this variation, front sides of the drive console B and the cassette console C respectively engage a side of the elongate console D. According to this, the second axial direction is elongated relative to the first axial direction. According to this arrangement, a plurality of drive and cassette consoles can be continuously interchanged.

Figure 17:
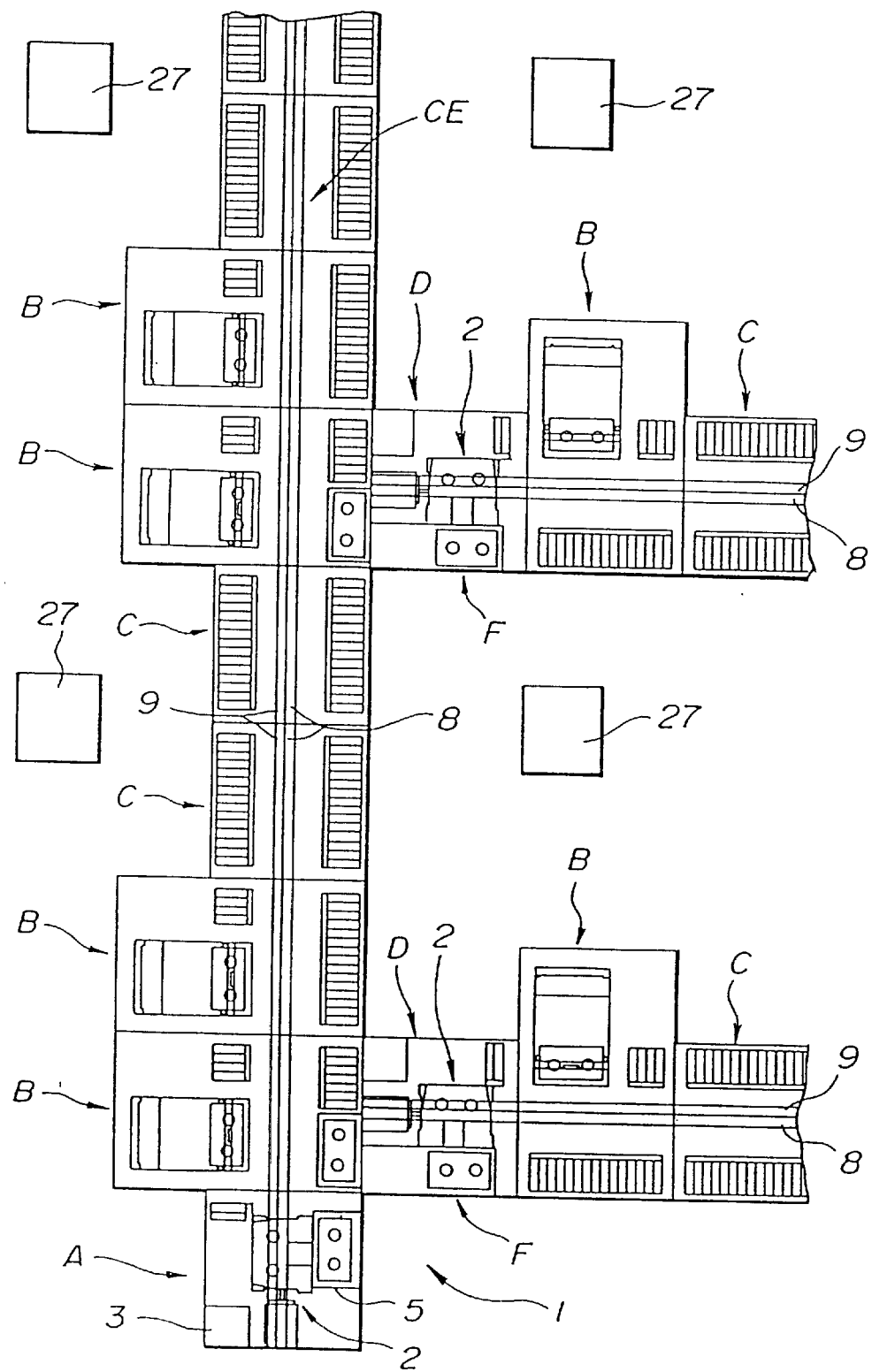
FIG. 17 is a plan view schematic diagram of a third embodiment of a biaxially operable cassette auto changer.

FIG. 17 is a plan view schematic diagram of a third embodiment of a biaxially operable cassette auto changer. According to this arrangement, a pair of cassette consoles and another pair of drive consoles are arranged opposed to a base console A to be continuously engaged via the elongate console D in the first axial direction.

Figure 18:
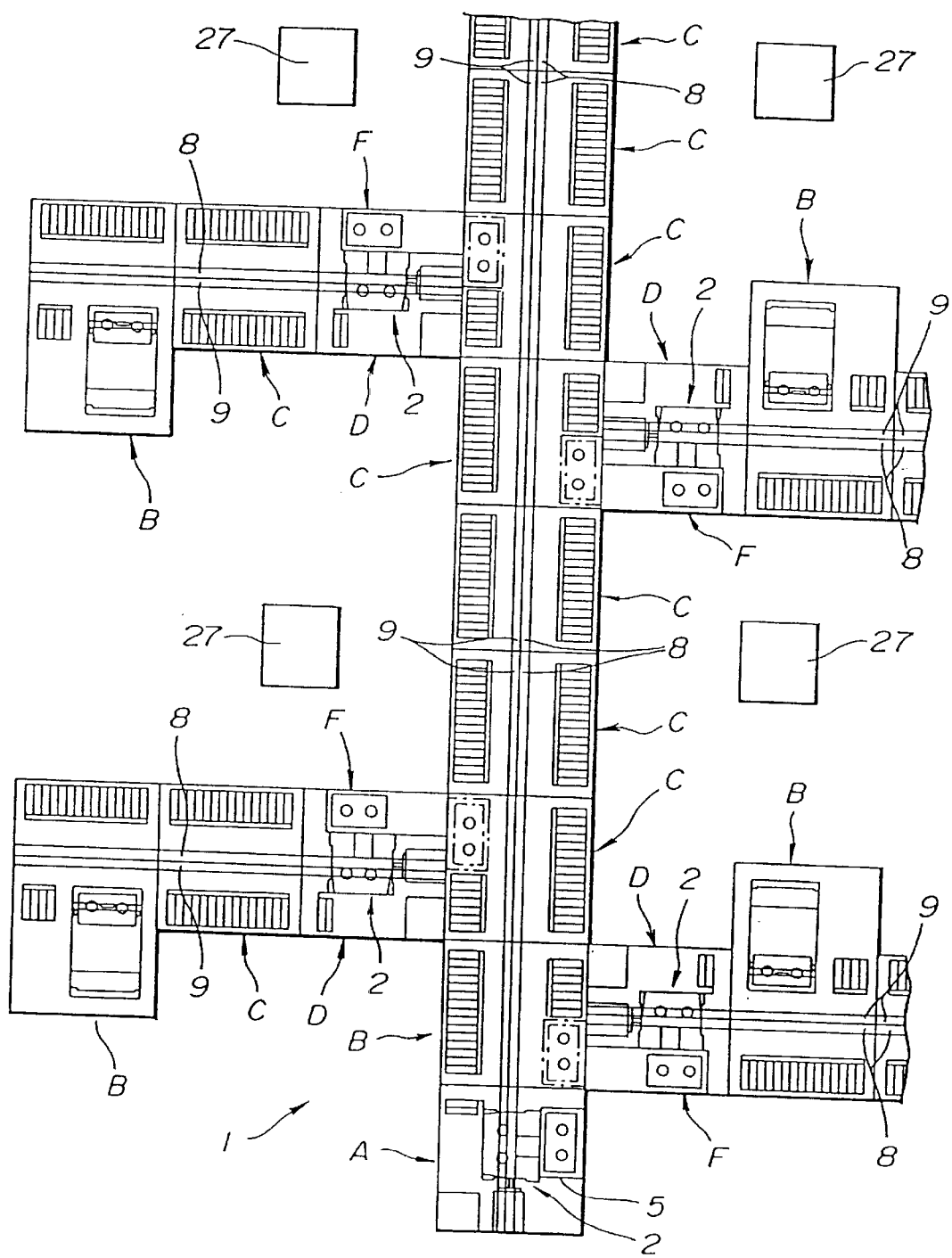
FIG. 18 is a plan view schematic diagram of a fourth embodiment of a biaxially operable cassette auto changer.

FIG. 18 is a plan view schematic diagram of a fourth embodiment of a biaxially operable cassette auto changer. In this arrangement, a plurality of cassette consoles C are arranged in a first axial direction against a base console A. Some of the cassette consoles C are engaged at one side by an elongate console D having a drive console B and a cassette console C arranged ajacently thereto. Other of the axially aligned cassette consoles C are engaged at an opposite side by an elongate console D, a cassette console C and a drive console B. According to this, each elongate console D is always engaged at one side with a cassette console C and at another side by a drive console B. This arrangement is flexible in being arrangeable to avoid structural members 27 of a room in which it is installed.

Figure 19:
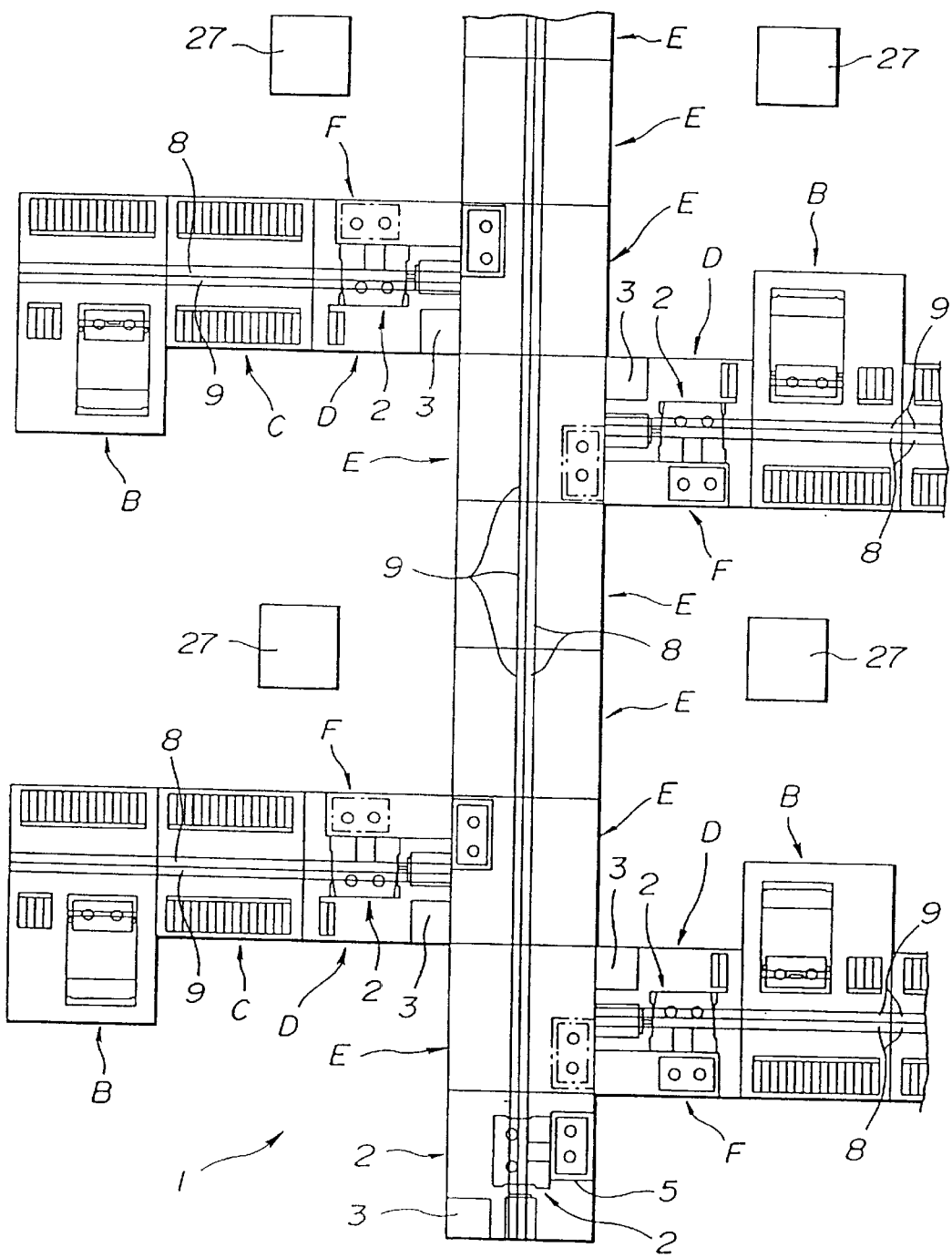
FIG. 19 is a plan view schematic diagram of a fifth embodiment of a biaxially operable cassette auto changer.

FIG. 19 is a plan view schematic diagram of a fifth embodiment of a biaxially operable cassette auto changer. As may be seen, a projecting console E is disposed in a first axial direction relative the base console and is engaged at one side thereof by by an elongate console D having a drive console B and a cassette console C arranged ajacently thereto. Portions of the other side of the projecting console E are engaged by an elongate console D, a cassette console C and a drive console B. According to this, each elongate console D is always engaged at one side with a cassette console C and at another side by a drive console B. This arrangement is also flexibly arrangeable to avoid structural members 27 of an installation room.

Figure 20:
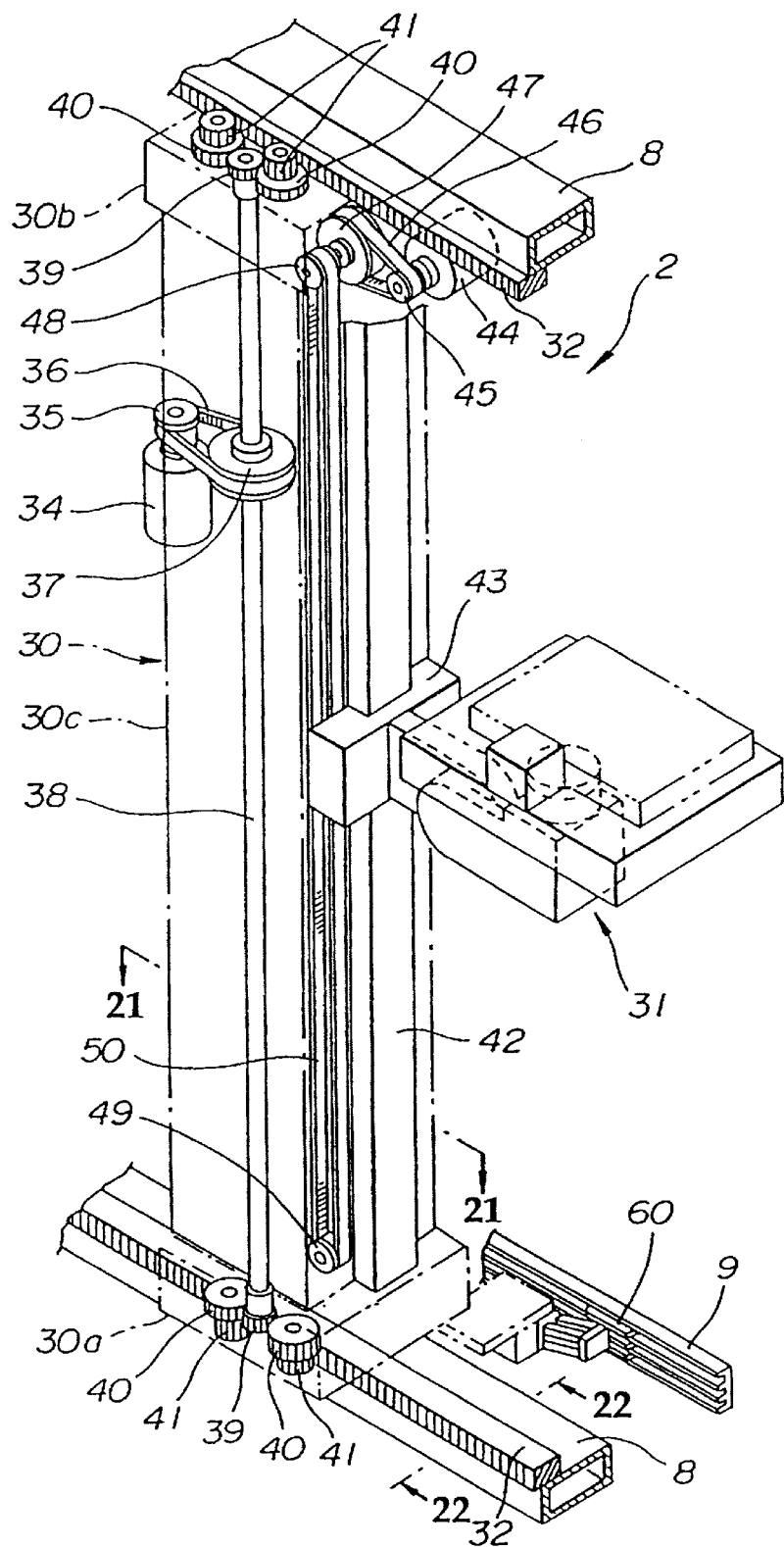
FIG. 20 is a perspective view of a cassette transfer mechanism utilized in the system of the invention.
Figure 21:
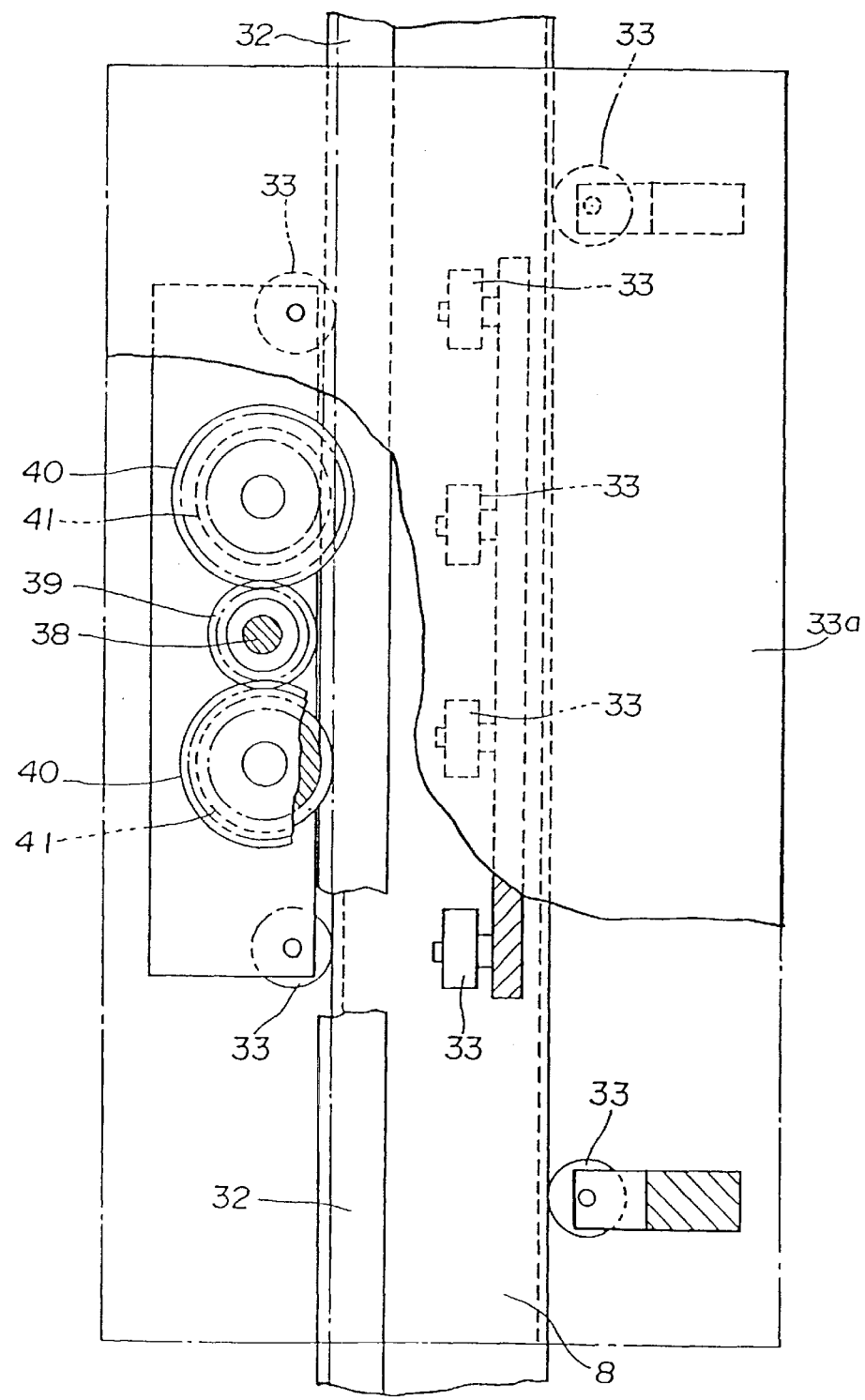
FIG. 21 is a cross-sectional view taken along line c—c of FIG. 20.
Figure 22:
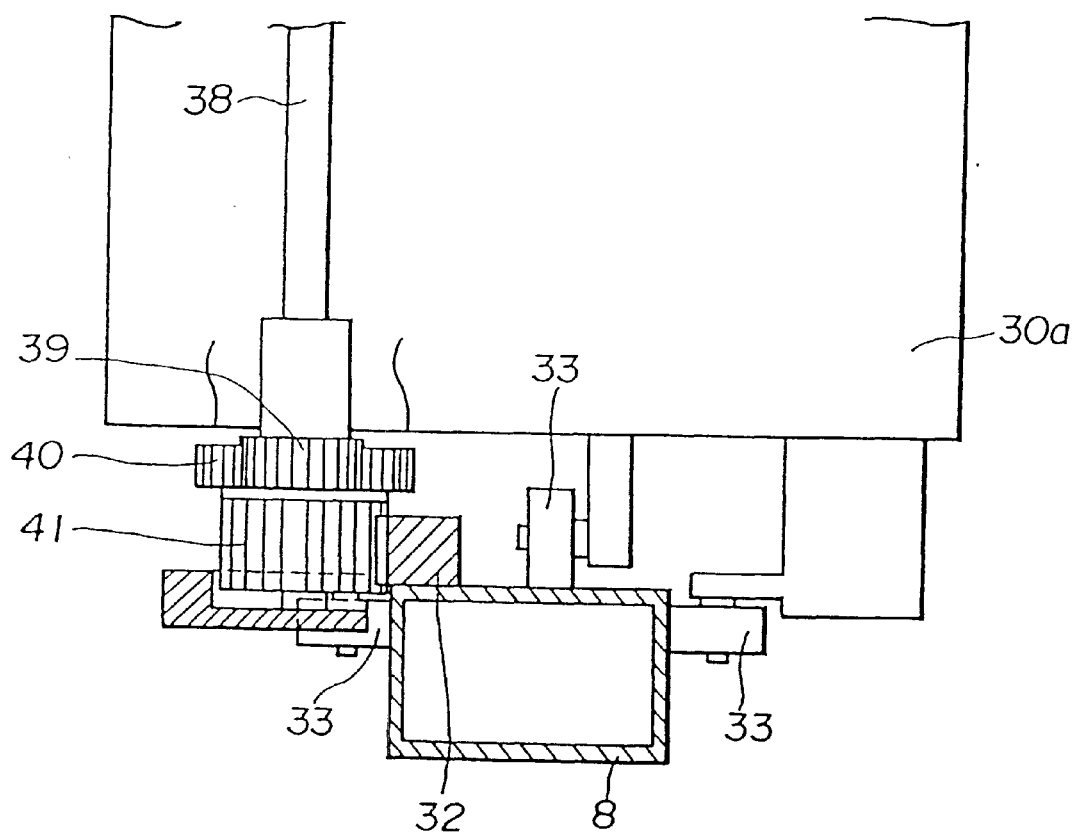
FIG. 22 is a cross-sectional view taken along line d—d of FIG. 20.

Hereinbelow, a detailed description of a cassette transfer mechanism which may be utilized in the above described auto changer system will be set forth according to a first preferred embodiment thereof, with reference to FIGS. 20–22. FIG. 20 shows a perspective view of a cassette transfer mechanism utilized in the system of the invention. FIG. 21 is a cross-sectional view taken along line c—c of FIG. 20, while FIG. 22 is a cross-sectional view taken along line d—d of FIG. 20. As may be seen in the drawings, the cassette transport mechanism 2 includes upper and lower horizontally arranged rack members 32 disposed so as to engage the upper and lower guide rails 8, 8 disposed on each of the consoles A–D. A vertical pillar 30 is supported between the upper and lower rack members 32 so as to be movable in a horizontal plane. Upper and lower end portions 30b, 30a are attached to each end of the pillar 30. As seen in FIG. 21, each of the end portions include a plurality of guide rollers 33 for pressingly engaging the guide rails 8 at three sides thereof, thus providing stable support and rolling movement for the cassette transport mechanism 2.

Further, a vertical rod portion 30c of the pillar 30 has a horizontal travel motor 34 attached thereto such that a drive axis thereof projects vertically parallel to the pillar 30. A pulley 35 mounted on the drive shaft of the motor 34 engages a timing belt which further engages a drive pulley 37 fixed on a vertically disposed rotatable shaft 38 from applying driving power via the rotatable shaft 38 to drive gears 39 affixed to each end thereof. The drive gears 39, 39 are engaged with adjacent reduction gears 40, 40 at each side thereof respectively. Smaller pinion gears are coaxially disposed at upper sides of the upper reduction gears 40, 40 and lower sides of the lower reduction gears 40, 40 to engage horizontal rack gear teeth formed on the upper and lower rack members 32, 32.

Also, referring still to FIG. 20, the vertical rod portion 30c has a vertical guide rail 42 disposed along one side thereof. A vertical slider portion 43 engages the vertical guide rail 42 and supports a cassette shuttle body 31 thereon, extending horizontally from the vertical guide rail 42. A vertical travel motor 44 is disposed at a lower side of the upper end member 30B such that a drive shaft thereof projects horizontally to support a drive pulley 45 which drives an upper pulley 47 via a small timing belt 46. The upper pulley in turn drives a coaxially mounted upper belt pulley 48 which is connected for co-rotation with a lower belt pulley 40 via a long vertically disposed timing belt 50. The timing belt 50 provides driving power for vertically moving the cassette shuttle body 31 upward or downward along the guide rail 42 via the slider member 43.

Thus, according to the above described structure, the cassette shuttle body 31 is movable in horizontal and vertical directions. The space occupied by the vertical and horizontal area in which the cassette shuttle body 31 is enabled to travel is defined as the cassette transfer area CE.

Further, referring to FIGS. 20 and 23, the means be which driving power is provided to the cassette transport mechanism 2 will be explained hereinbelow. As will be noted in the drawings, an electrically conductive rail 9 is disposed parallel to the lower guide rail 8. The electrically conductive rail 9 is engaged by a terminal member 60 at the lower end member of the pillar 30. Electrical driving power for the motors, or the like, of the cassette transport mechanism 2 are thus provided via wiring arranged within the pillar 30 and surrounding components.

Figure 23:
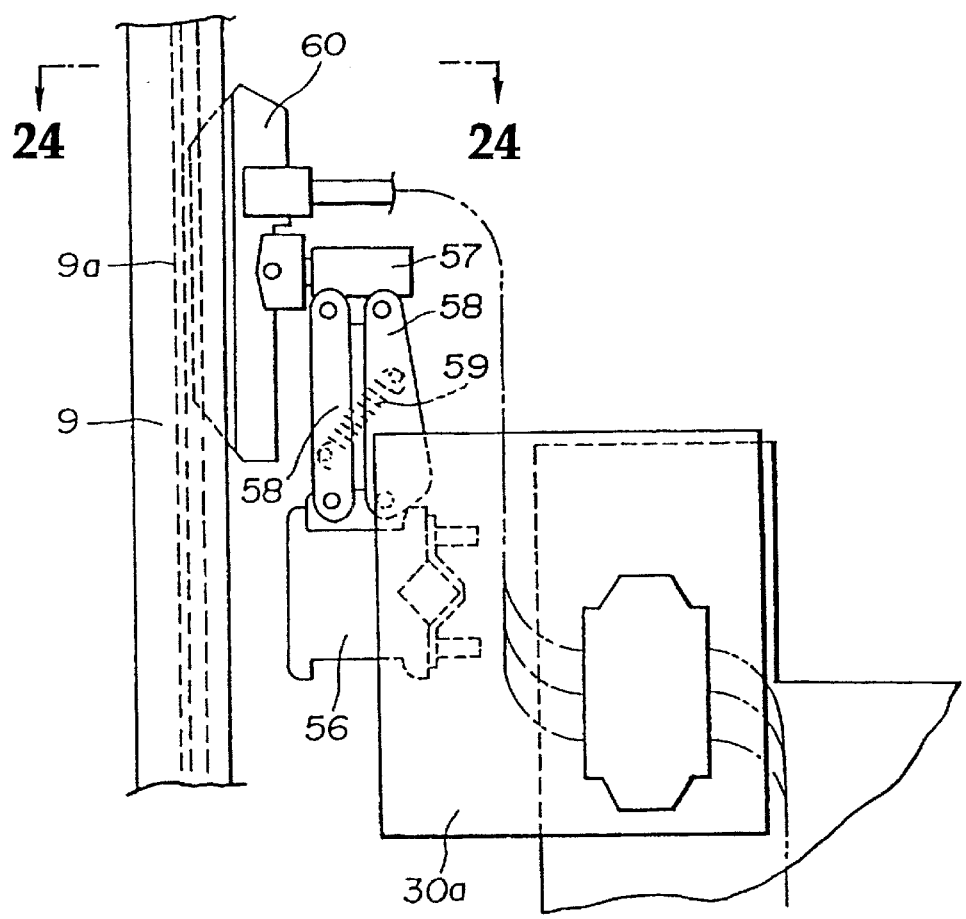
FIG. 23 in an enlarged cross sectional view of a connecting structure between a transport rail and shuttle portion of the cassette transfer mechanism.
Figure 24:
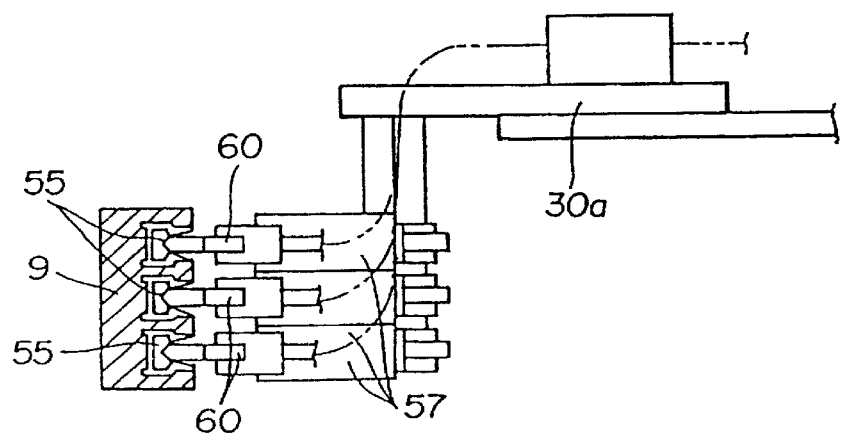
FIG. 24 is a cross sectional view taken along line e—e of FIG. 23.

FIG. 23 in an enlarged cross sectional view of a connecting structure between a transport rail and shuttle portion of the cassette transfer mechanism. FIG. 24 is a cross sectional view taken along line e—e of FIG. 23.

According to this, sufficient driving power may be efficiently provided to a plurality of driven components with simple enclosed circuitry which can maintain a highly reliable condition.

Movement of the cassette transport mechanism 2 may be determined according to commands via an infrared signal or the like from the autochanger wherein a control box (see FIG. 1) of the base console A and/or the elongate console D effect transmission while an input control box 3 (not shown) of the cassette transport mechanism 2 is set in a reception mode. According to the invention the control signal may be transmitted via the same apparatus as the electrical power supply.

According to this, sufficient driving power may be efficiently provided to a plurality of driven components with simple enclosed circuitry which can maintain a highly reliable condition.

Figure 25:
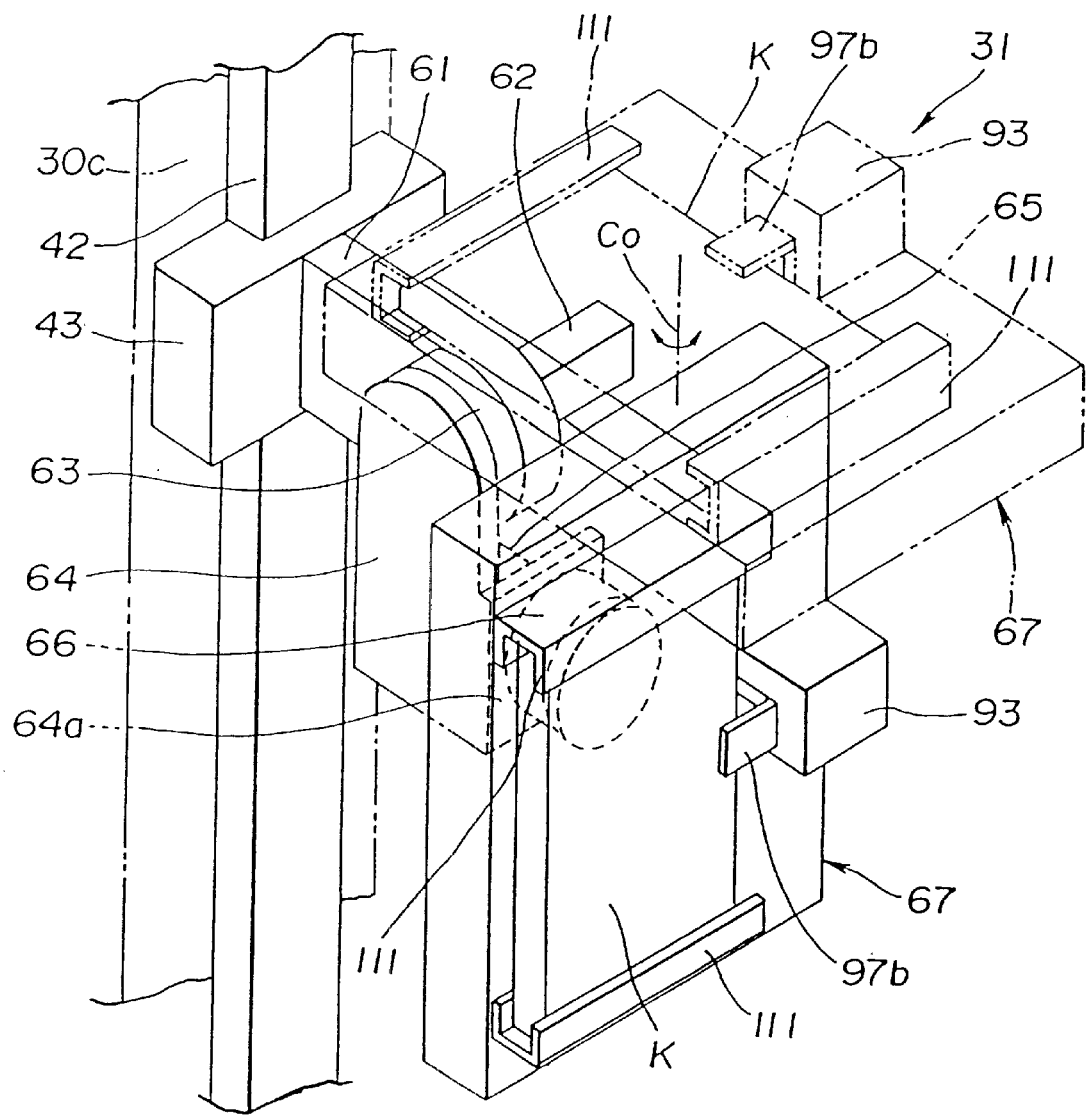
FIG. 25 is a perspective view of a driving portion of the cassette transfer mechanism.
Figure 26:
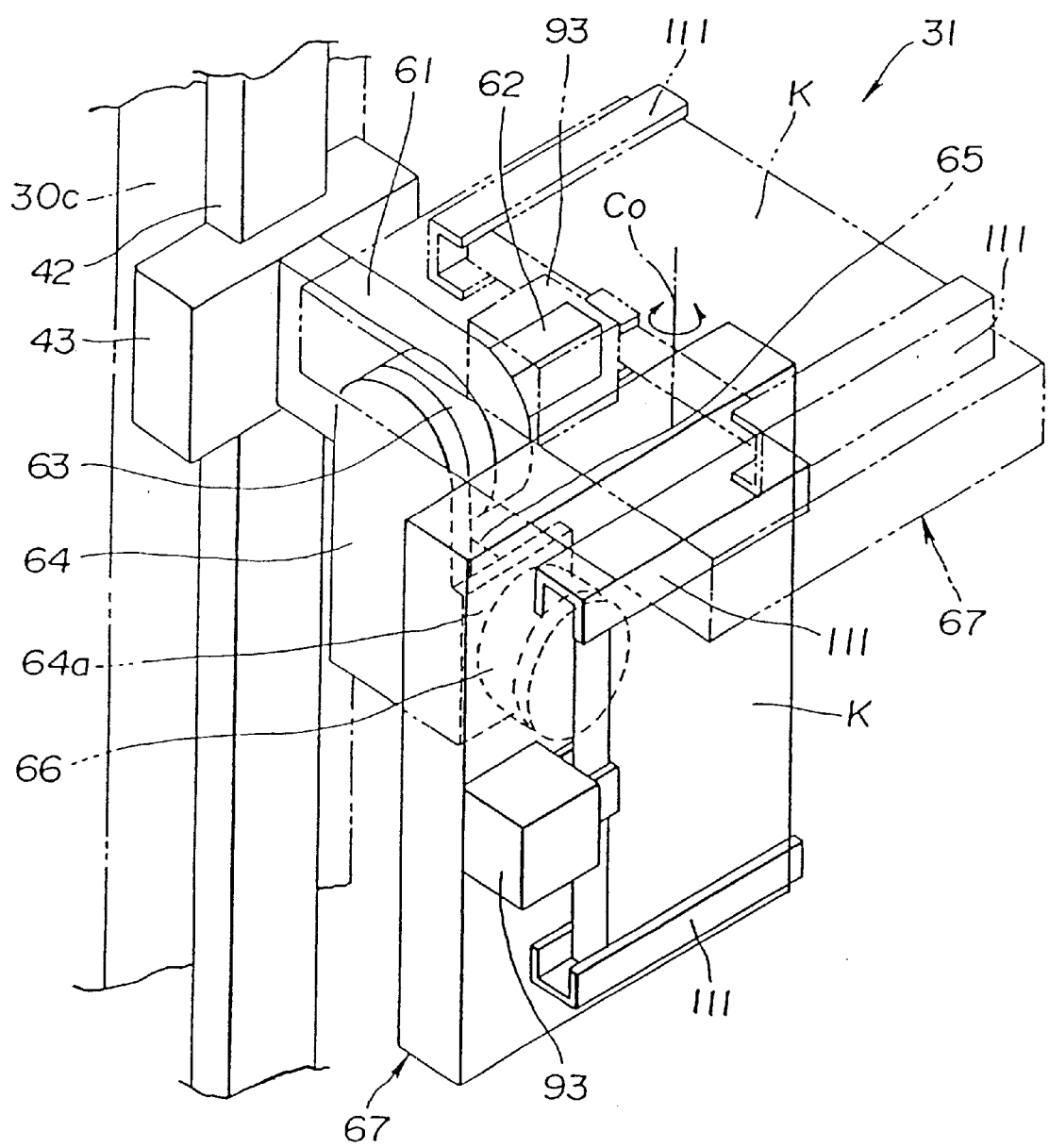
FIG. 26 is a perspective view of an alternative structure of a driving portion of a cassette transfer mechanism.
Figure 27:
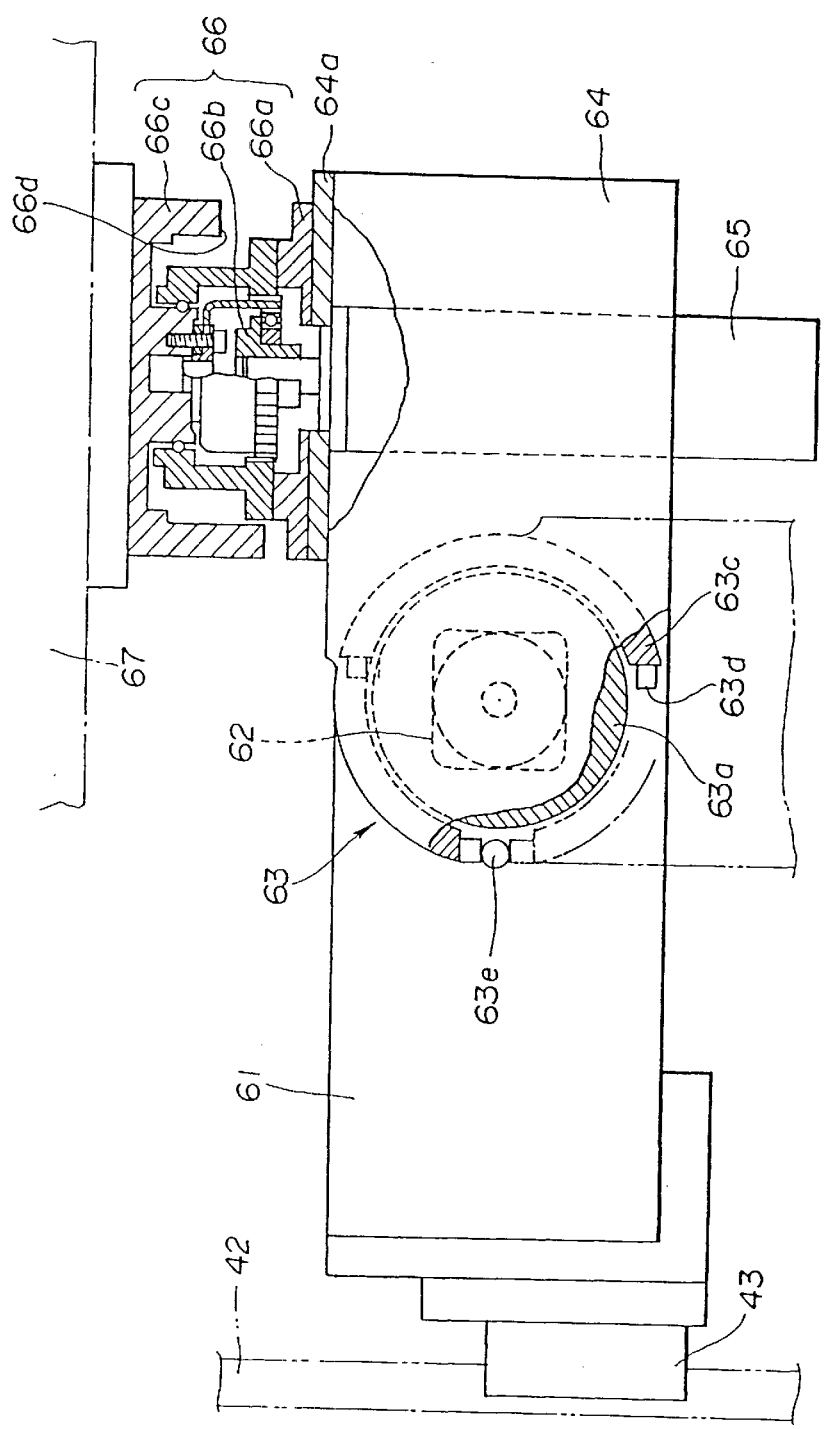
FIG. 27 is a cross-sectional plan view of a rotational driving means of the cassette transfer mechanism.
Figure 28:
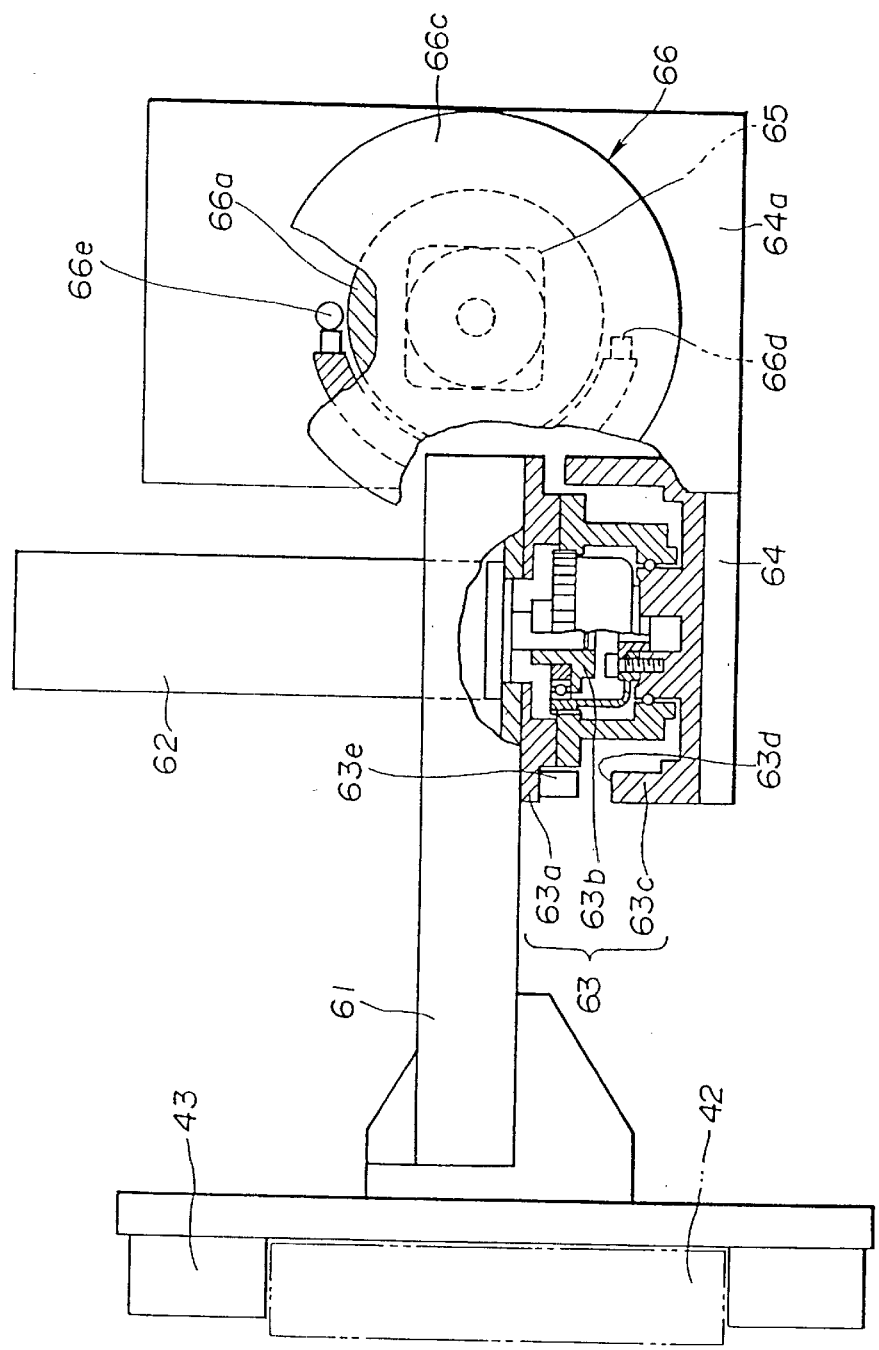
FIG. 28 is a cross-sectional front view of the rotational driving means of FIG. 27.
Figure 29:
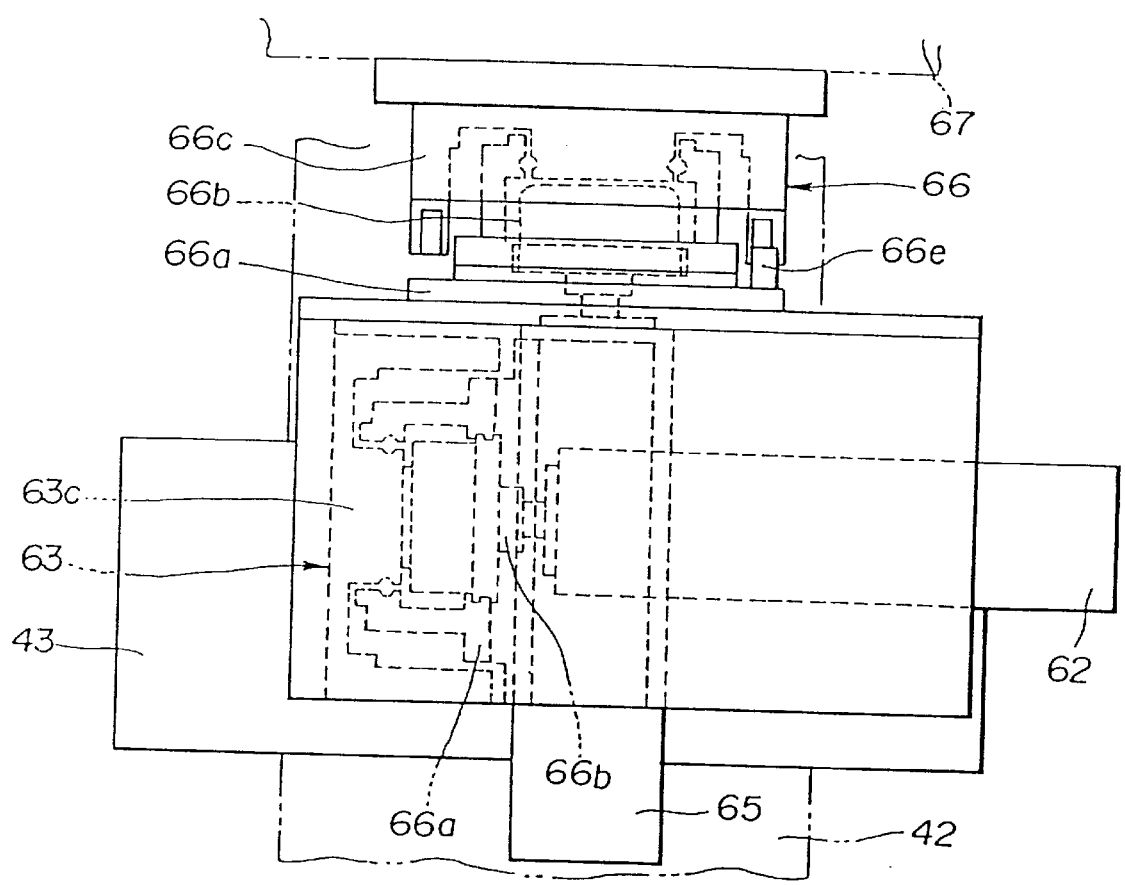
FIG. 29 is a right side view of the rotational driving means.

Hereinbelow, rotational operation of a casette shuttle body portion of the auto changer system 1 according to the invention will be explained in detail with reference to FIGS. 25–29. FIG. 25 is a perspective view of a driving portion of the cassette transfer mechanism and FIG. 26 is a perspective view of an alternative structure of a driving portion of a cassette transfer mechanism. FIG. 27 is a cross-sectional plan view of a rotational driving means of the cassette transfer mechanism. FIG. 28 is a cross-sectional front view of the rotational driving means of FIG. 27. FIG. 29 is a right side view of the rotational driving means.

As may be seen in the drawings, the vertical slider portion 43 movable along the vertical guide rail 42 has a first horizontal support projection 61 extending therefrom for supporting the cassette shuttle body 31. The first horizontal support projection 61 mounts a vertical rotation motor 62 on one surface thereof. A first harmonic gear type low speed drum 63 is affixed to an opposite side of the first horizontal support projection 61 via an attachment portion 63*a*. The lower speed drum 63 further includes a rotational input portion 63*b* to receive rotational force from the motor 62, a low speed output portion 63*c* to transmit the rotational force from the motor 62 input from the rotational input portion 63*b* to a vertical rotation arm 64. The low speed drum 63 has a cut-out portion 63*d* formed on an outer side thereof at a 90 degree rotation position and a rotation stopper portion 63*e* provided at the cut-out portion 63*d* to limit rotation of the vertical rotation arm 64.

According to this structure, the rotation of the vertical rotation arm 64 is limited to 90 degrees for rotating a cassette support body 67 which carries a cassette K therein.

It will be noted that the vertical rotation arm 64 has a mounting plate 64*a* extending perpendicularly from one side thereof. The mounting plate 64*a* has a second low speed drum 66 attached thereto for transferring rotational force from the motor 62 to the cassette support body 67. The second low speed drum is substantially the same as the above-described first low speed drum 63, having an attachment portion 66*a*, a rotational input portion 66*b*, a low speed output portion 66*c* to transmit the rotational force from the motor to the cassette support body 67. The low speed drum 66 has a cut-out portion 66*d* formed on an outer side thereof at a 180 degree rotation position and a rotation stopper portion 66*e* provided at the cut-out portion 66*d* to limit rotation of the cassette support body 67. Comparison of FIGS. 25 and 26 shows the rotational movement of the cassette support body 67 according to this arrangement.

It will be noted in FIGS. 25 and 26 that, according to the position of the cassette shuttle body 31, a cassette K may be loaded into a cassette receiving opening 10*a* of a playing device 10, or a cassette insert compartment 7 of a cassette IN/OUT port or into a cassette receiving compartment 6 of a cassette bay (rack) 4. Thus, these components may be arranged in any combination around the cassette transfer area CE allowing a compact structure to be flexibly designed.

Figure 57:
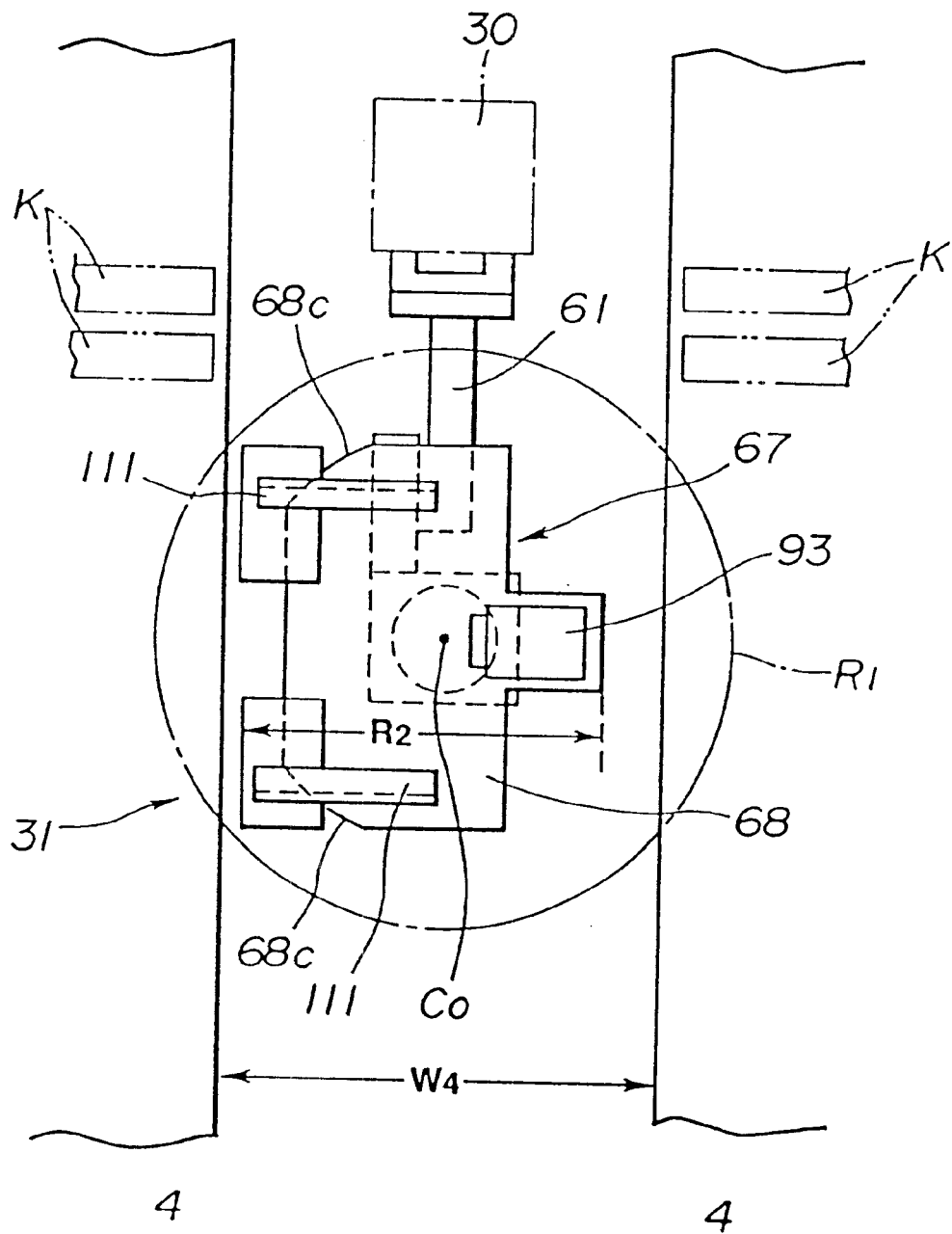
FIG. 57 is a partially cut-away plan view of the rotation area established for the cassette transfer mechanism shown in FIG. 56.

As may be seen in FIG. 57, a horizontal rotation axis CO of the cassette transfer area CE is arranged at a center thereof so as to allow further compact design for the auto changer system 1.

Figure 30:
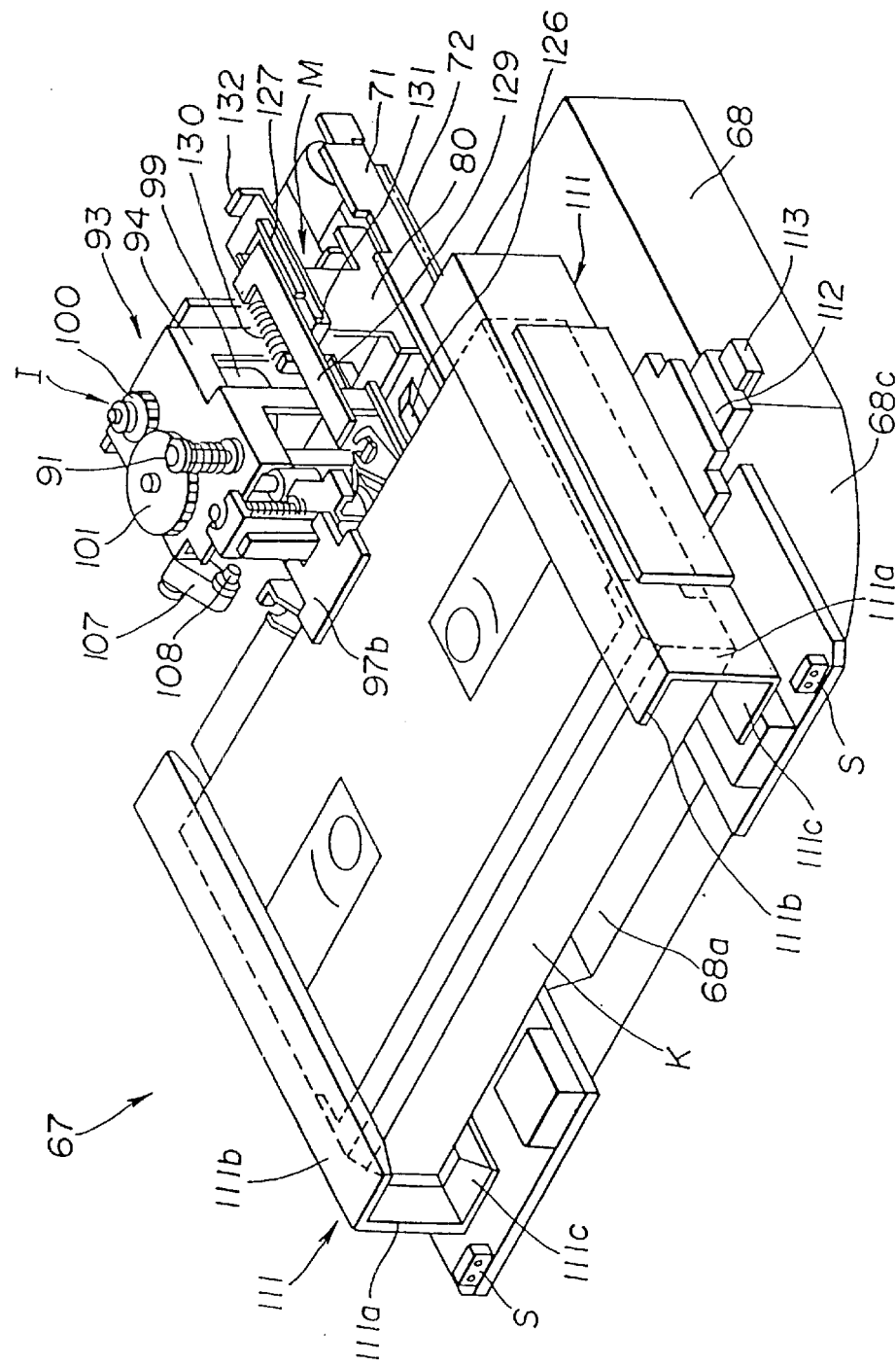
FIG. 30 is a perspective view of a cassette support structure of the auto changer device.
Figure 31:
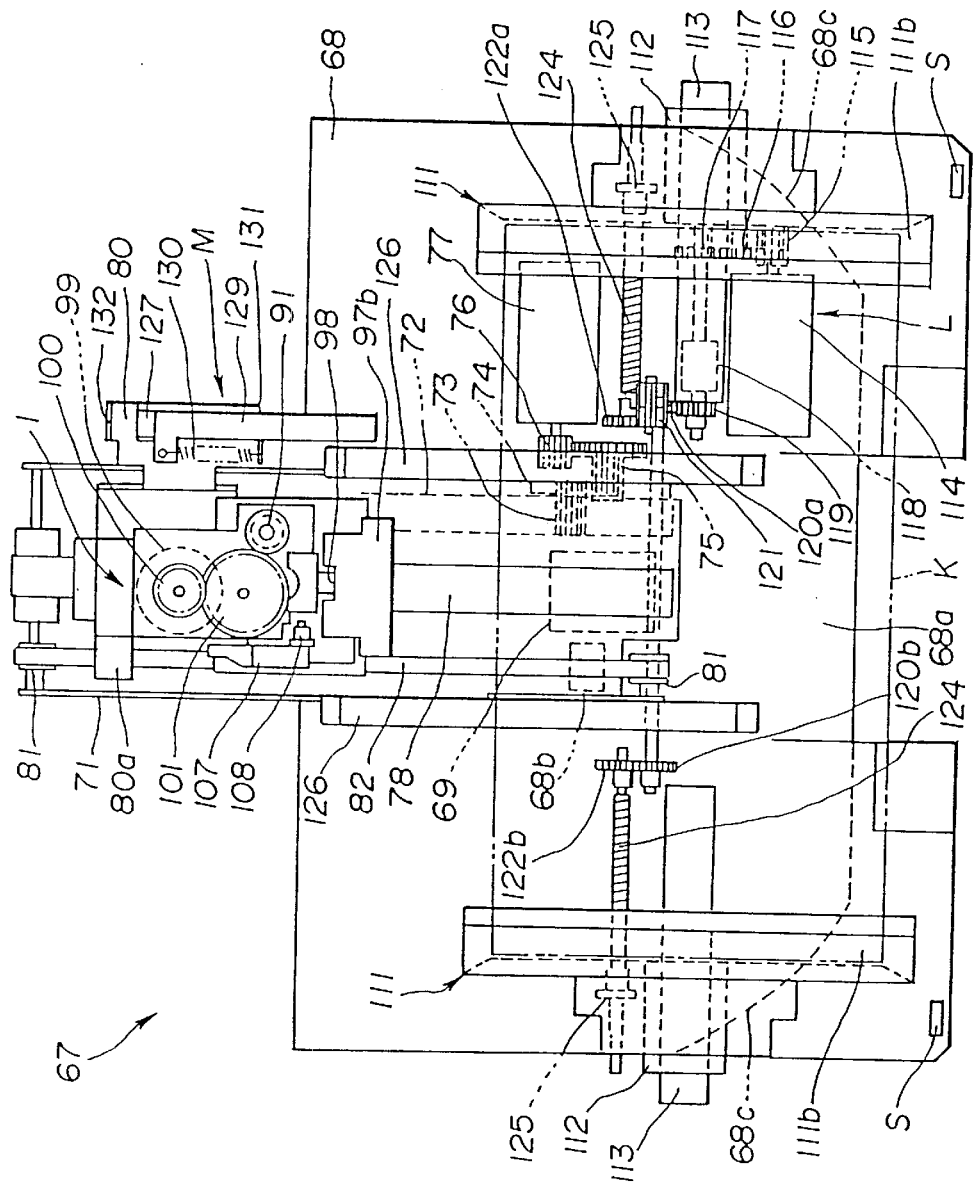
FIG. 31 is a plan view of the cassette support structure of FIG. 30.
Figure 32:
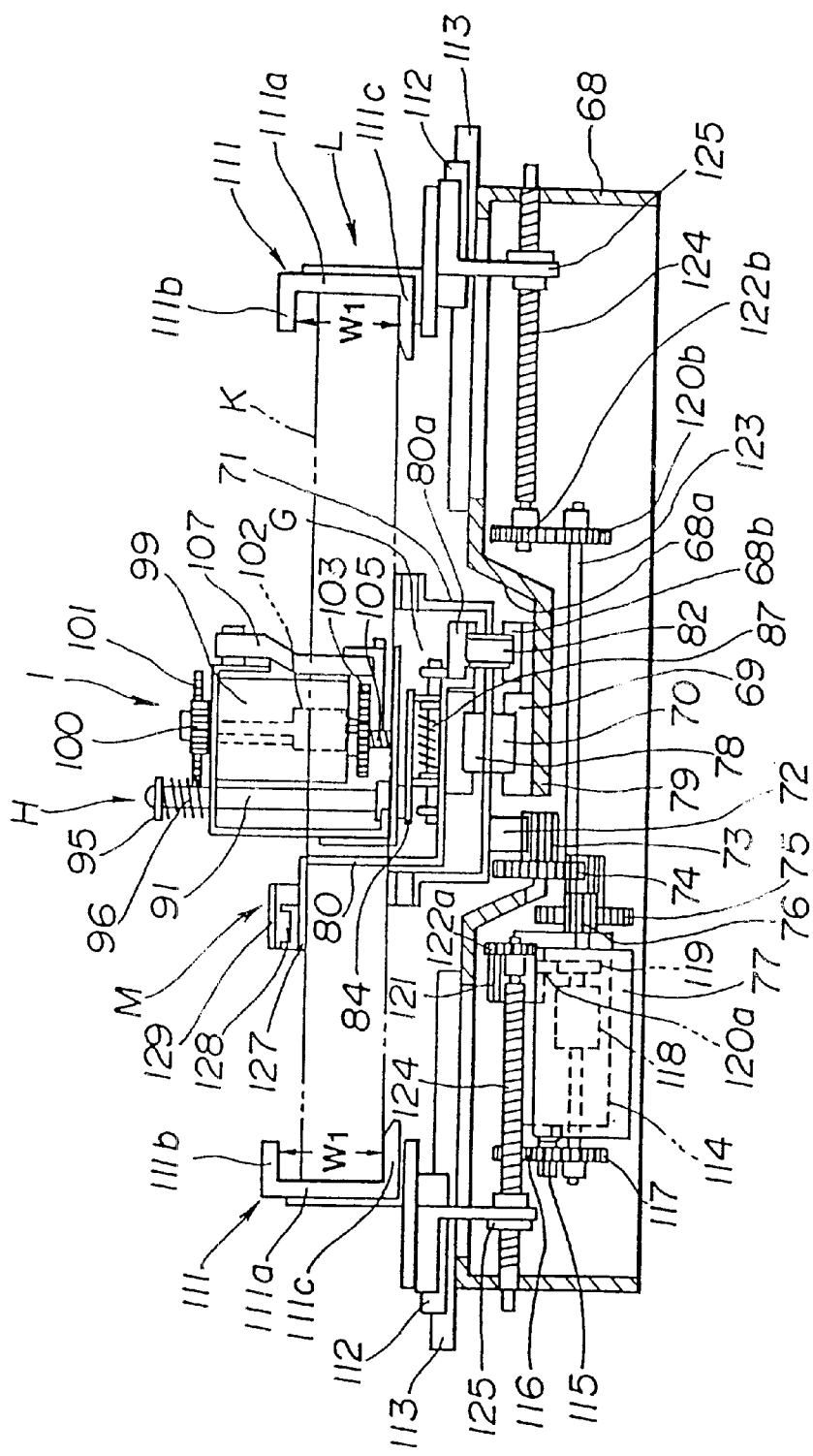
FIG. 32 cross sectional view of a rear side of a main portion of the cassette support structure.
Figure 33:
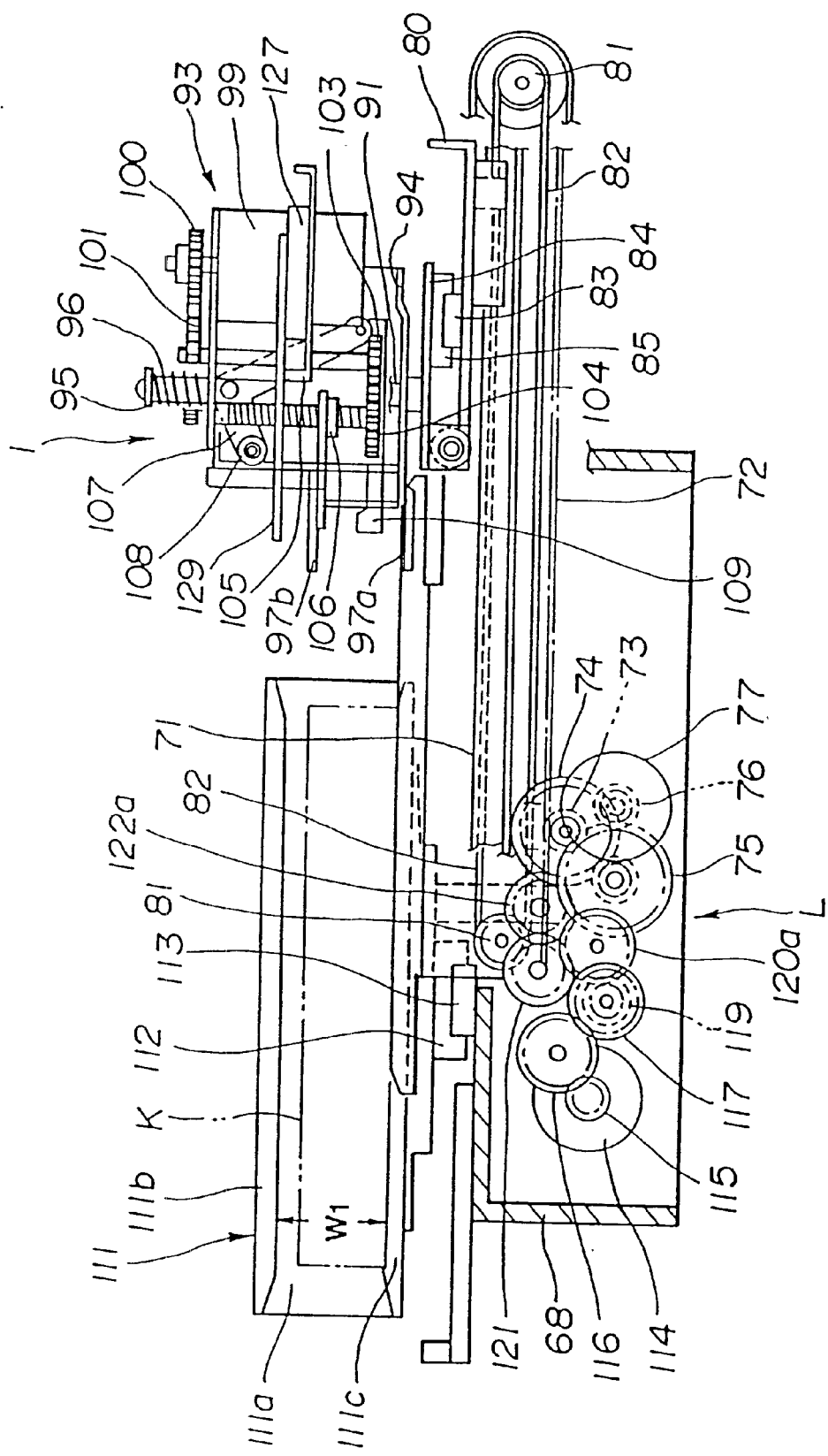
FIG. 33 is a cut way view of a right side of the main portion of the cassette support structure.
Figure 34:
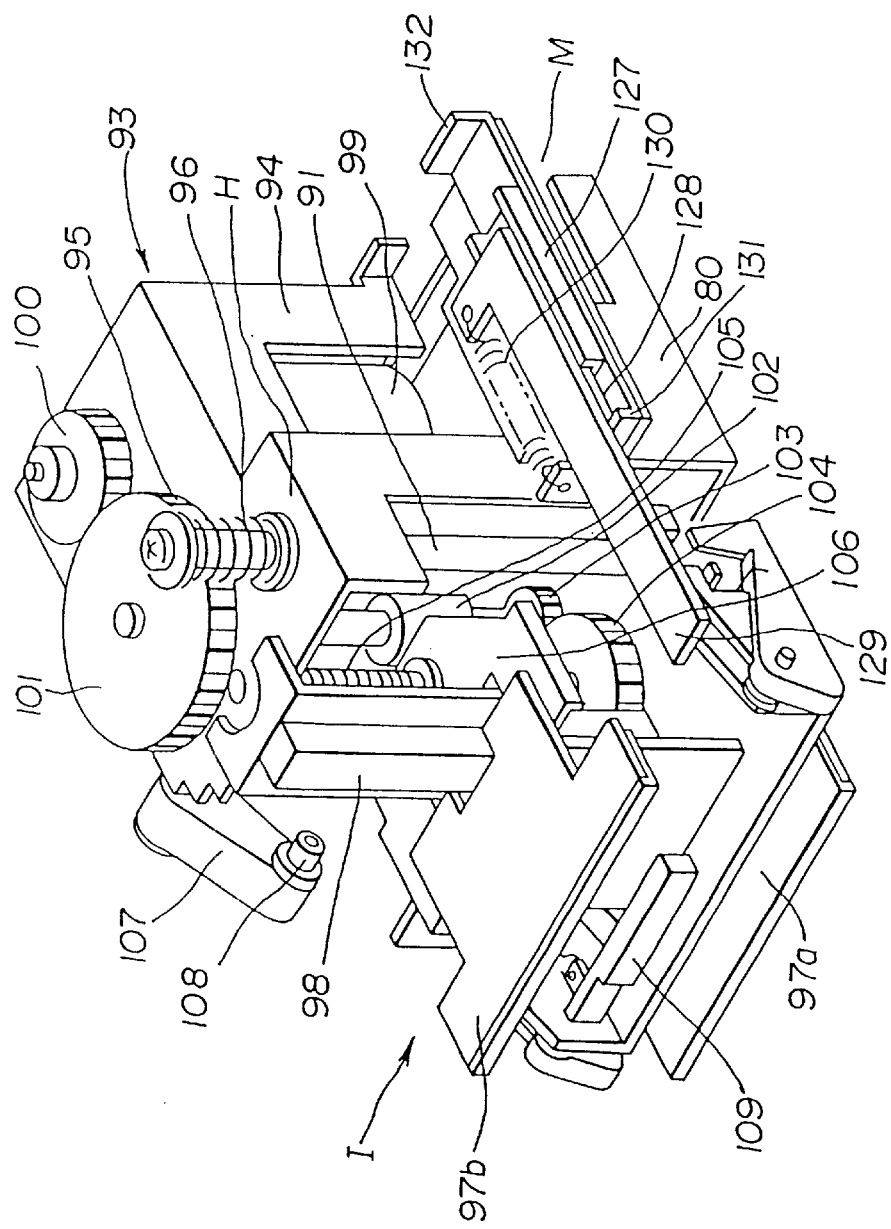
FIG. 34 shows a perspective view of a magnetic head and mounting structure therefor, utilized in the system of the invention.
Figure 35:
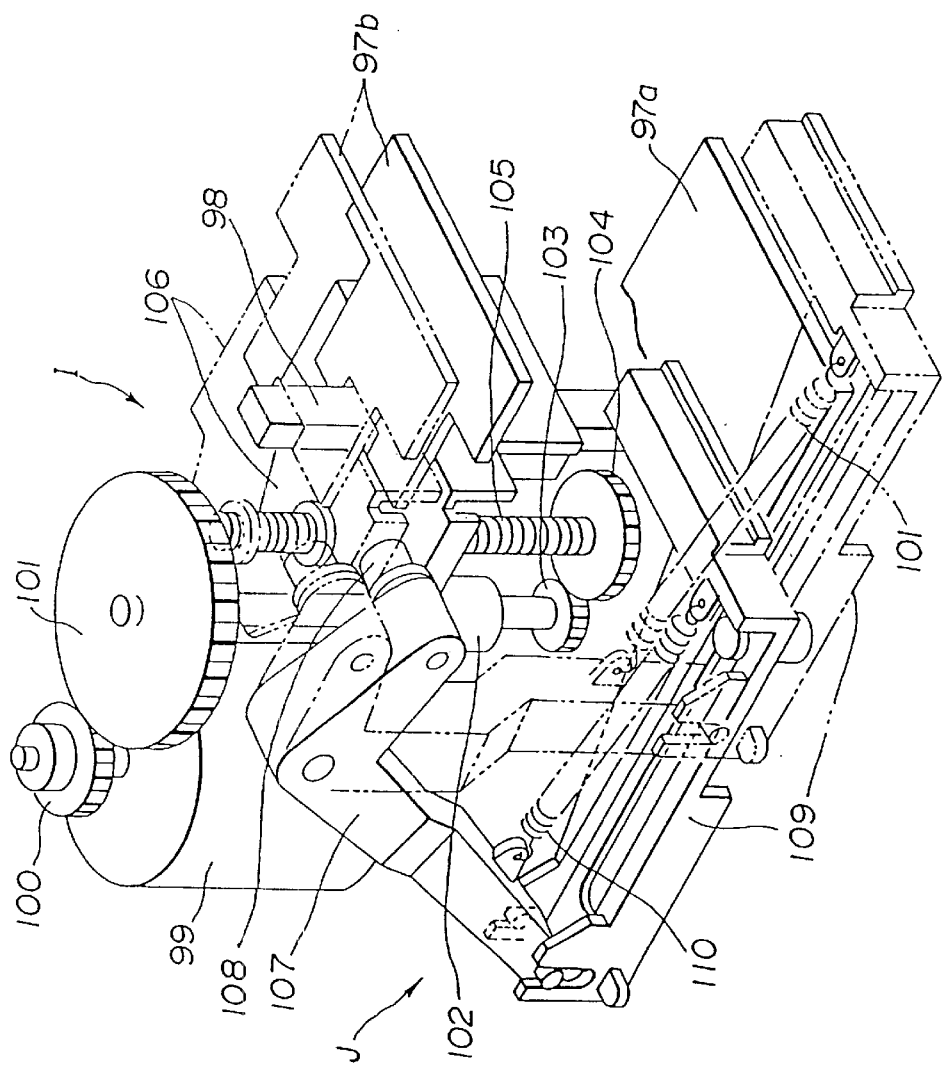
FIG. 35 is perspective view showing the structure of a cassette loading/unloading mechanism according to the invention.

Hereinbelow, a structure of the cassette support body 67 and the cassette shuttle body 31 of the auto changer system 1 according to the invention will be explained in detail with reference to FIGS. 30–36. FIG. 30 is a perspective view of a cassette support structure of the auto changer device. FIG. 31 is a plan view of the cassette support structure of FIG. 30. FIG. 32 is a cross sectional view of a rear side of a main portion of the cassette support structure. FIG. 33 is a cut way view of a right side of the main portion of the cassette support structure. FIG. 34 shows a perspective view of a magnetic head and mounting structure therefore and FIG. 35 is a perspective view showing the structure of a cassette loading/unloading mechanism. FIG. 36(*a*) is a cross sectional view for explaining operation of a main portion of the head mounting structure while FIGS. 36(*b*), (*c*) and (*d*) illustrate operation of the main portion of the head mounting structure during left, right and upward positional variation thereof.

Referring to the drawings, it may be seen that the cassette support body 67 includes a base plate 68 attached to the rotational force output portion 66*c* of the second low speed drum 66. The base plate 68 has a concave groove 68*a* formed therein in forward and rearward directions for guiding movement of the cassette support body 67. A guide member 69 is attached at the surface of the concave groove 68*a* for receiving a slider member 70 disposed at the lower side of a first operational member 71. The first operational member 71 further has a rack gear 72 disposed on the lower side for engaging with a pinion gear 73 and associated gears 74, 75, 76 for receiving rotational force from a hand motor 77. Thus, the base plate 68 is supported in a rotatable fashion. As will be explained herein, the hand motor 77 controls forward and rearward motion of a cassette hand portion.

At an upper side of the first operational portion 71 a guide rail 78 is disposed in forward and rearward operational directions. The guide rail 78 slidingly supports a slider 79 which is attached to a second operational portion 80. Pulleys 81, 81 are disposed at forward and rear sides of the first (lower) operational portion 71 having a timing belt 82 supported therebetween for transferring cooperational force to the second (upper) operational member 80 according to a lower contact portion 68*b* of the base plate 68 and an upper contact portion 80*a* of the second operational portion 80 which touch the timing belt 82. And, it will be noticed that another guide rail 83 is disposed at an upper side of the second operational member 80 for engaging a slider 85 attached to a lower side of a positioning member 84 which allows left and right positioning of the mechanism for accurately positioning the apparatus for receiving or transferring of cassettes K.

It will be noted that, only according to movement of the first operational portion 71, is motive power transferred to the timing belt 82 and thus to the second operational portion 80. Thus, no separate driving source is necessary for the second operational portion 80.

Referring to FIG. 36(a) to 36(d), operation of a cassette hand adjustment mechanism G will be explained hereinbelow.

As mentioned above, the guide rail 83 is disposed at an upper side of the second operational member 80 for engaging a slider 85 attached to a lower side of a positioning member 84 which allows left and right positioning of the mechanism. A rod 90 is disposed in the left right direction of the mechanism on an upper side of the second operational member 80. The left right movement is limited by a pair of link portions 86a, 86b at each end of the rod 90. A coil spring 87 is disposed coaxially with the rod 90 between the two link portions 86a, 86b. The link portions 86a, 86b are urged against opposed center members 88a, 88b according to the spring force of the coil spring 87. The center members 88a, 88b are positioned in relation to an axis of left right movement of the cassette support body 67. The lower side of the positioning member 84 has two adjustment projections 89a, 89b disposed at an outer side of the link portions 86a, 86b between the link portions 86a, 86b and the center members 88a, 88b. The adjustment projections 89a, 89b determine the axis of left right movement of the cassette hand 93.

Referring to FIGS. 36(b) and 36(c), movement in first and second directions N1 and N2 of the cassette hand 93 is effected until the spring force of the coil spring 87 no longer urges the adjustment projections 89a, 89b.

Upward and downward adjustment of the cassette hand 93 is effected via a vertical rod 91 and a vertical guide rod 92 projected from an upper side of the positioning member 84, as may be seen in FIG. 36(d). One side of the cassette hand 93 includes a vertical bracket 94 attached thereto. An end of the vertical guide rod 92 passes therethrough via a boss 9a and is capped by a flanged cap member 95. A coil spring 96 is disposed coaxially with the guide rod 92 between the cap member 95 and the end of the bracket 94. Movement in the direction M is thus limited by the spring resistance of the coil spring 96.

As seen in FIGS. 32–34, the cassette hand mechanism I includes upper and lower fingers 97a, 97b, retained on a hand frame 94. The upper finger 97b is movably disposed on a guide rail 98 of he hand mechanism I. A hand motor 97 is also mounted on the hand frame 94. The hand motor 97 transfers driving power to the mechanism via first and second gears 100, 101 to a torque limiter 102 to a second gear set consisting of a first smaller gear 10, control box 3 and a larger gear 104 to a screw gear 105 which carries a threaded mounting plate 105 for moving the upper finger 97b upwards and downwards via the guide rail 98.

Referring to FIG. 35, when cassette extraction operation is effected, a curved arm 107 mounted via a pivotal member 108 to the hand frame 94 is utilized to actuate an extraction mechanism J. The other end of the curved arm 107 engages a cutout formed in one end of an extraction lever 109. When the upper finger moves upward, the curved arm pulls the extraction lever 109 out. According to downward movement of the upper finger 97b, the curved arm 107 is pulled in a rearward direction by a coil spring 110 disposed between a inner side of the extraction lever and an underside of the curved arm 107.

Further included in the mechanism of the cassette hand structure, supported on the base plate 68, left and right cassette guide members 111 are disposed. The cassette guide members comprise and upper support portion 111b and a lower support portion 111c projected from upper and lower sides of a side wall portion 111a, forming a squared C-shape having a width W1 which is slightly greater than a width W2 of a cassette K (see FIG. 39), the cassette guide members 111 are arranged so as to face each other to act as guides for receiving the sides of a cassette K. The cassette guide members 111 are supported by a pair of sliders 112 movable along the upper side of the base plate 68 via a pair of guide rails 113.

The cassette guide structure L is driven by a motor 114, the output of the motor 114 is transferred by gears 115, 116 to a gear 117 which is coaxially mounted with a gear 119 via a torque limiter 118. The gear 119 engages a gear 120a which drives a gear 122a via an intermediate gear 121. The gear 122a has a screw shaft formed integrally and coaxially therewith. The motor 114 thereby drives the screw shaft 124 to rotate and drives a nut 125 which mounts the left slider 112 for driving the left cassette guide member 111. Further, the gear 120a is coaxially mounted with a corresponding right side gear 120b via a shaft 123. Thus rotation of the gear 120a also drives the gear 120b. The right side gear 120b engages a gear 122b which, similarly to the gear 122a coaxially mounts a screw gear 124 which is rotatably mounted on a right side of the base plate 68. The right side screw is driven to rotate and engages a right side nut 125 for driving the right side guide member via the slider 112. It will be noted that the left and right side screw gears 124 are threaded so as to drive the left and right side cassette guide members 111, 111 in opposite directions.

The cassette guide structure further includes left and right lower cassette guide members 126, 126 provided on the first operational member 71 which are movable in forward and rearward directions together with movement of the first operational member 71.

A unlocking lever 129 is mounted on an outer side of one of the lower cassette guide members 126 via a guide rail 127 and a slider 128. The slider 128 is moveable between a forward stopper 131 and a rear stopper 132. The unlocking lever 129 is biased in the forward direction by a coil spring 130 disposed between the forward stopper 131 and the rear side of the unlocking lever 129. It will be noted that the spring force of the coil spring 130 is selected to be greater than that of a coil spring 142 associated with a cassette look portion 141 as will be explained hereinlater.

Figure 38:
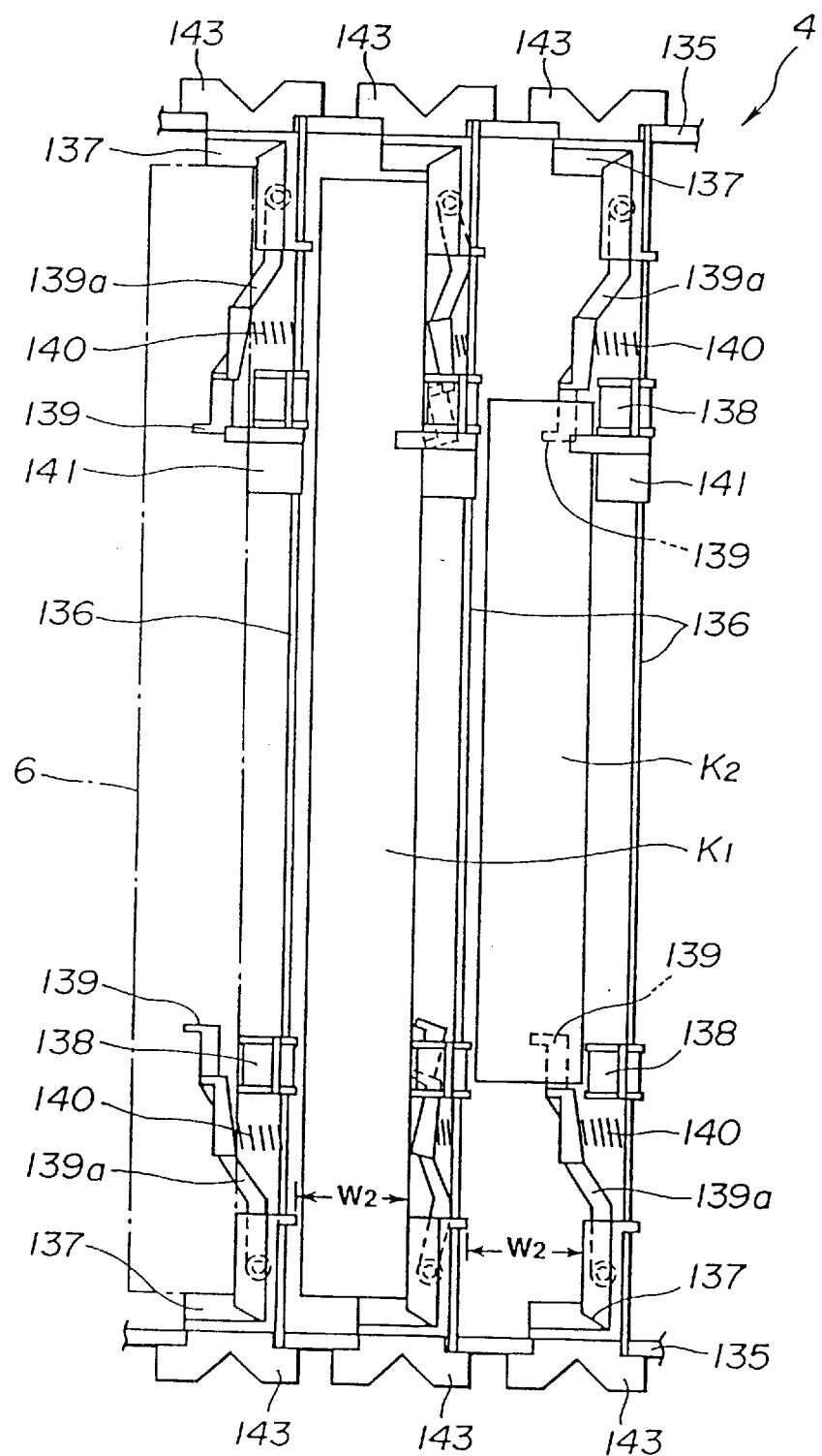
FIG. 38 is a front view of the cassette rack.
Figure 39:
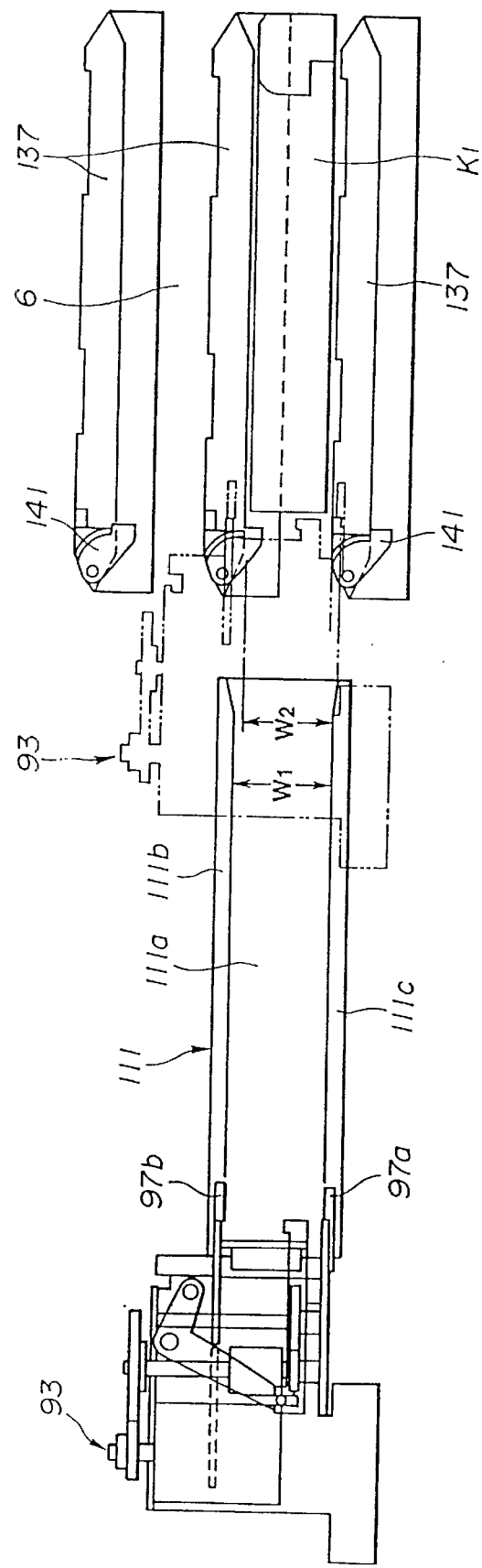
FIG. 39 is a side view showing operation of the cassette guide portion and a cassette receiving compartment.

Referring now to FIGS. 37–39 a structure of a cassette rack, or cassette bay 4 according to the invention will be described in detail.

FIGS. 37(a) and 37(b) show a perspective views of the configuration of a cassette bay 4 of the auto changer system including a cassette receiving compartments 6 (FIG. 37(b)). FIG. 38 is a front view of the cassette bay 4. FIG. 39 is a side view showing operation of cassette guide portions and a cassette receiving compartment.

As may be seen, the cassette bay 4 is a modular structure composed of a plurality of cassette receiving compartments 6. The cassette receiving compartments 6 are joined via horizontal plates 135 which engage vertical cut out portions 136 at upper and lower sides of the cassette bay 4. The cassette receiving compartments 6 each include upper and lower L-shaped cassette guides 137, 137 which have beveled edges for easily guiding side portions of a cassette K into the cassette receiving compartments 6. Further, the cassette receiving compartments 6 also include small cassette edge guides 139, 139 and bottom guides 138, 138 inwardly of the L-shaped cassette guides 137 for retained small size cassettes, such as DAT cassettes of the like. The small size cassette edge guides 139 are retractable to a side area between the L-shaped cassette guides when not required so as to allow unimpeded loading and unloading of larger cassettes. Further, the cassette edge guides 139 are pivotably mounted on the L-shaped cassette guides 137 via an arm portion 139a outwardly biased by an expansion coil spring 140. Thus, loading of both large and small size cassettes may be easily accomplished, as seen in FIG. 38.

As noted above, a cassette locking lever 141 engaged by a coil spring 142 is provided at a forward side of one of the cassette bottom guides 138 on each of the cassette receiving compartments 6. The locking lever is engaged by the unlocking lever 129 during cassette unloading for releasing the cassette for extraction. When a cassette is inserted into the cassette receiving compartments 6 the locking lever 141 is again engaged via the coil spring 142. The locking lever 141 is positioned so as to be able to be utilized for both large or small size cassettes, whichever is loaded into the auto changer system 1.

At each longitudinal end of each cassette receiving compartment 6, positioning tabs 143 are projected. The positioning tabs 143 include a V-shaped cut out therein for enabling the positional detection means of the invention as will be explained further hereinafter.

FIGS. 40–55 show side, top and and enlarged side view of the interaction between the cassette hand 93 and the cassette receiving compartments 6 during cassette extraction, conveyance and insertion operations.

Figure 41:
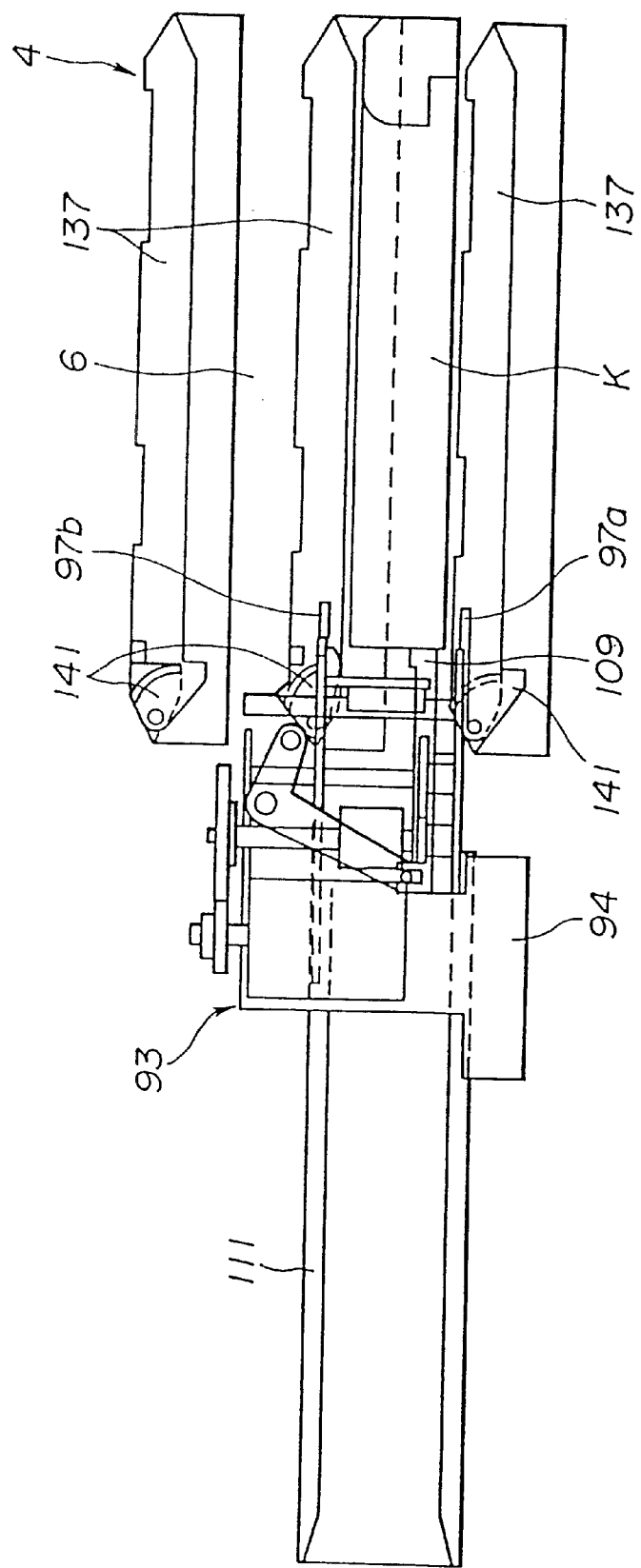
FIG. 41 is side view of the cassette selection operation at a second phase thereof.
Figure 42:
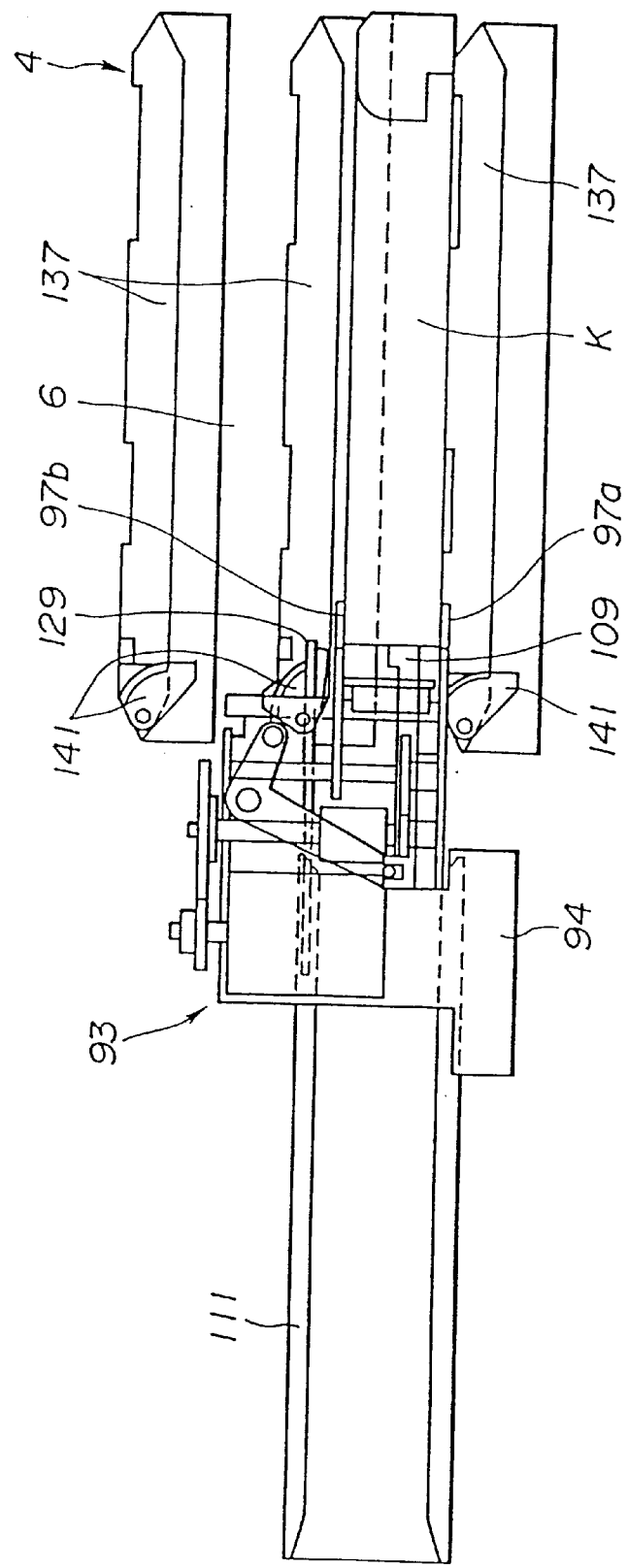
FIG. 42 is side view of the cassette selection operation at a third phase thereof.
Figure 44:
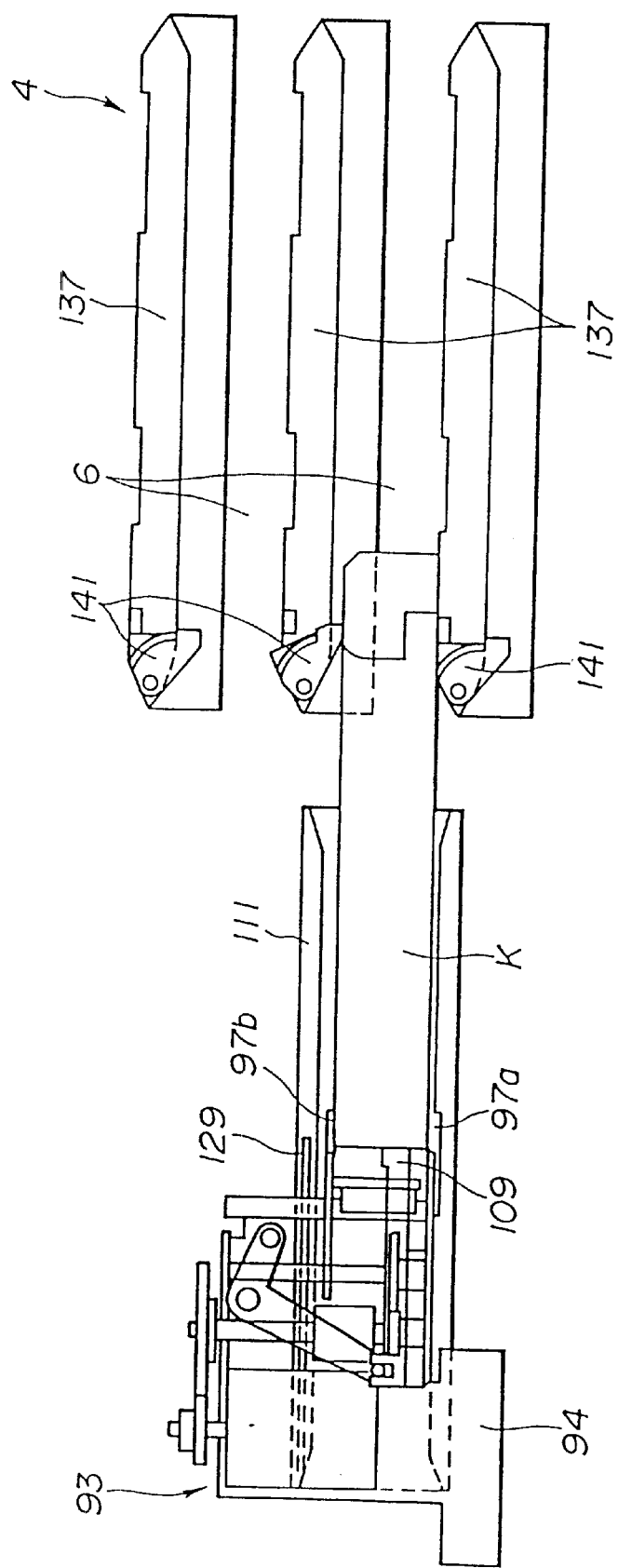
FIG. 44 is a cross-sectional plan view of a cassette conveyance operation of the cassette transfer mechanism at a second operational phase.
Figure 45:
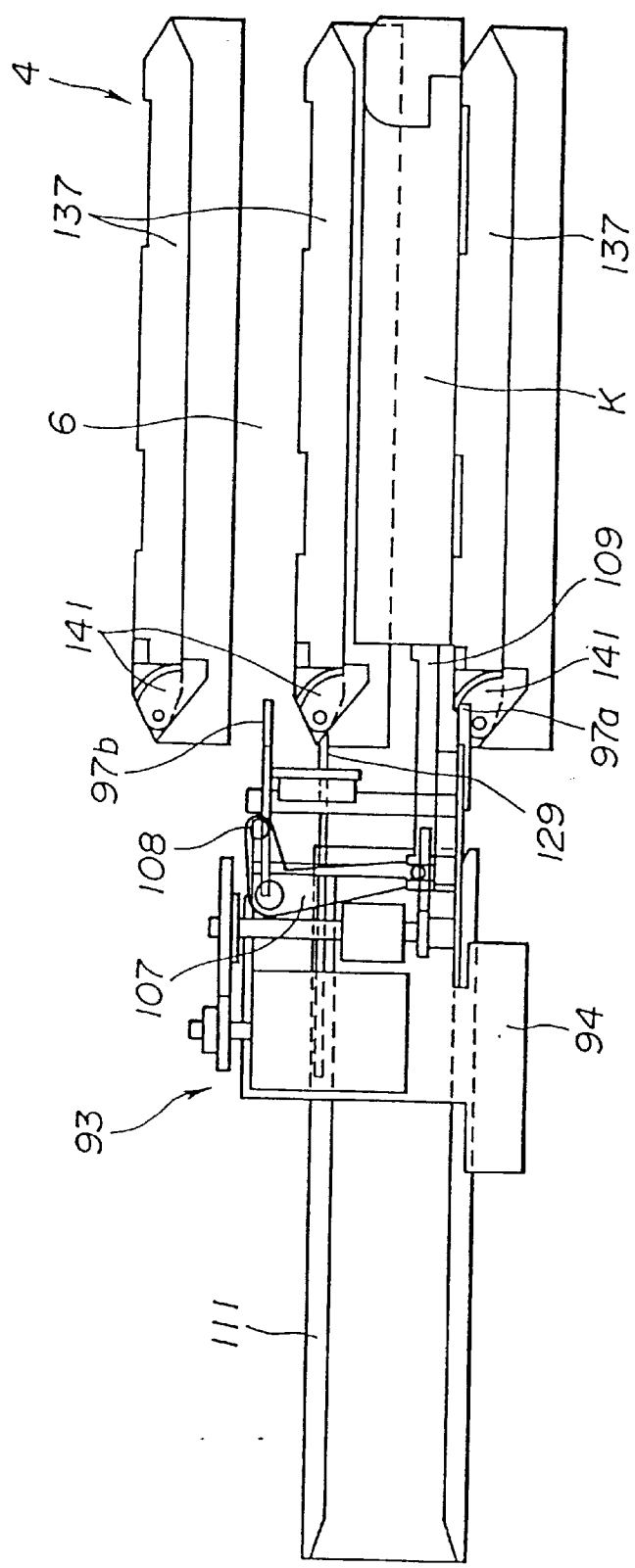
FIG. 45 is a cross-sectional plan view of a cassette conveyance operation of the cassette transfer mechanism at a third operational phase.
Figure 46:
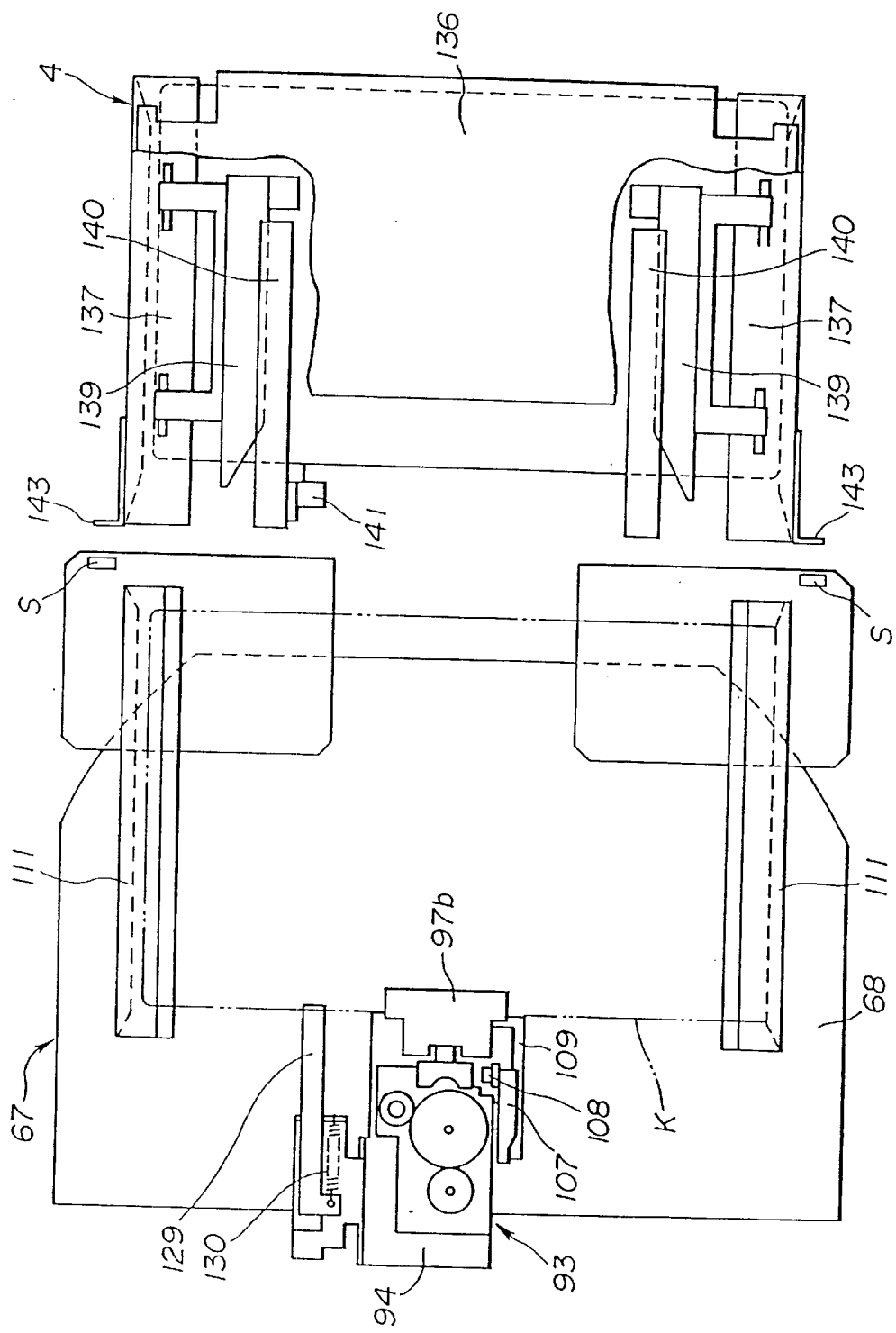
FIG. 46 is a front view of a cassette selection operation of the cassette transfer mechanism at a first phase of operation.
Figure 47:
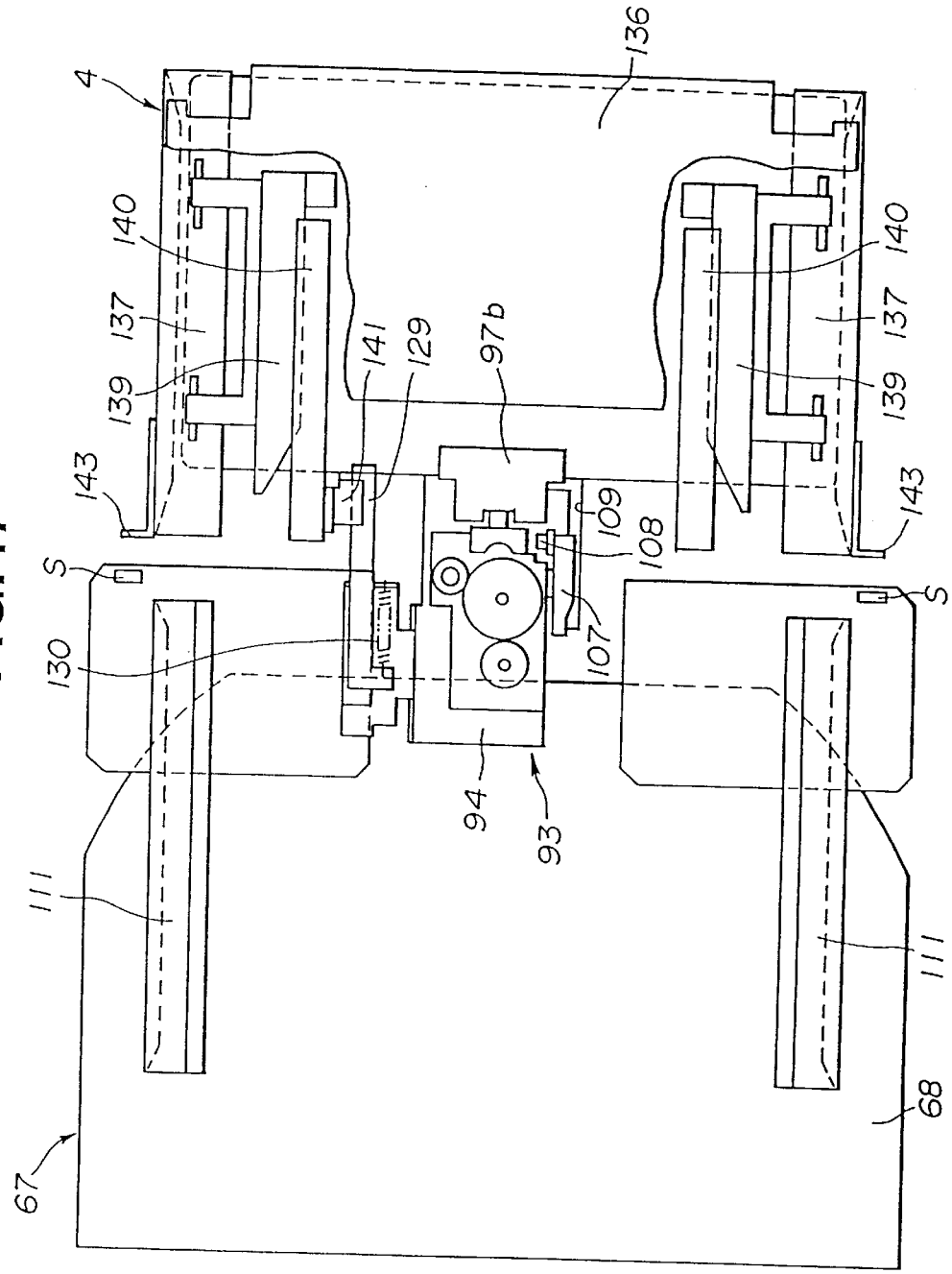
FIG. 47 is a front view of a cassette selection operation of the cassette transfer mechanism at a second phase of operation.
Figure 48:
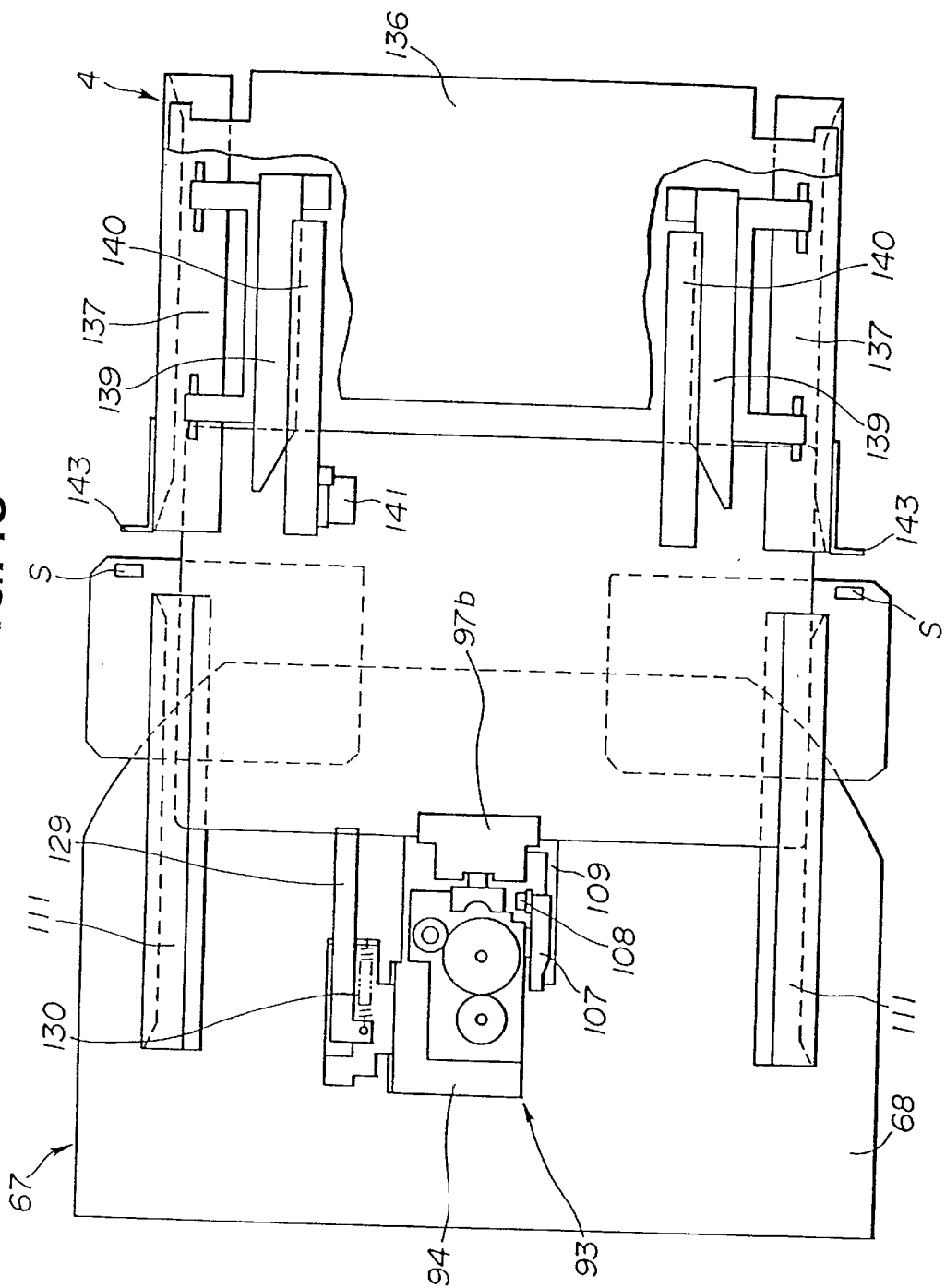
FIG. 48 is a front view of a cassette selection operation of the cassette transfer mechanism at a third phase of operation.
Figure 49:
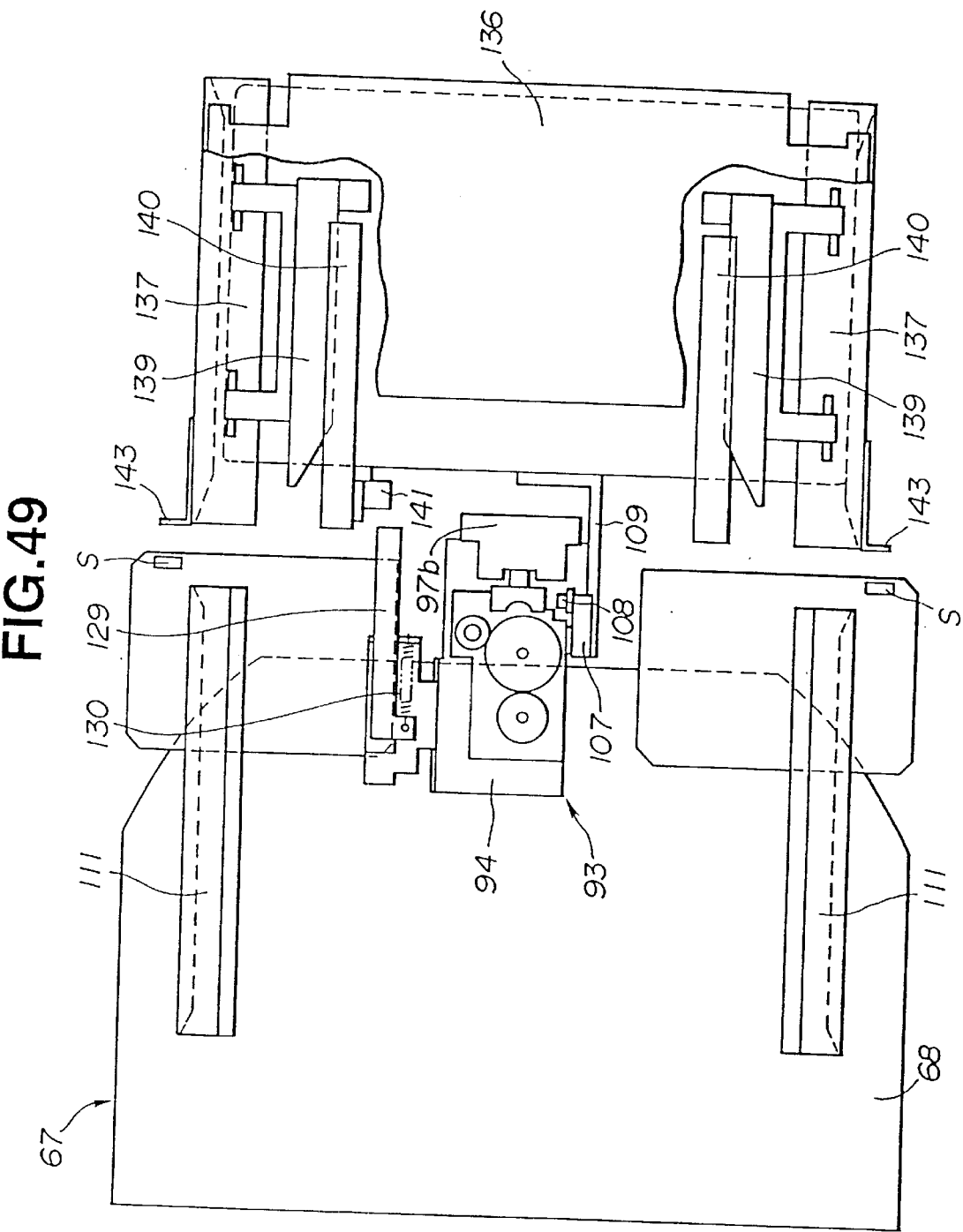
FIG. 49 is a front view of a cassette selection operation of the cassette transfer mechanism at a fourth phase of operation.
Figure 50:
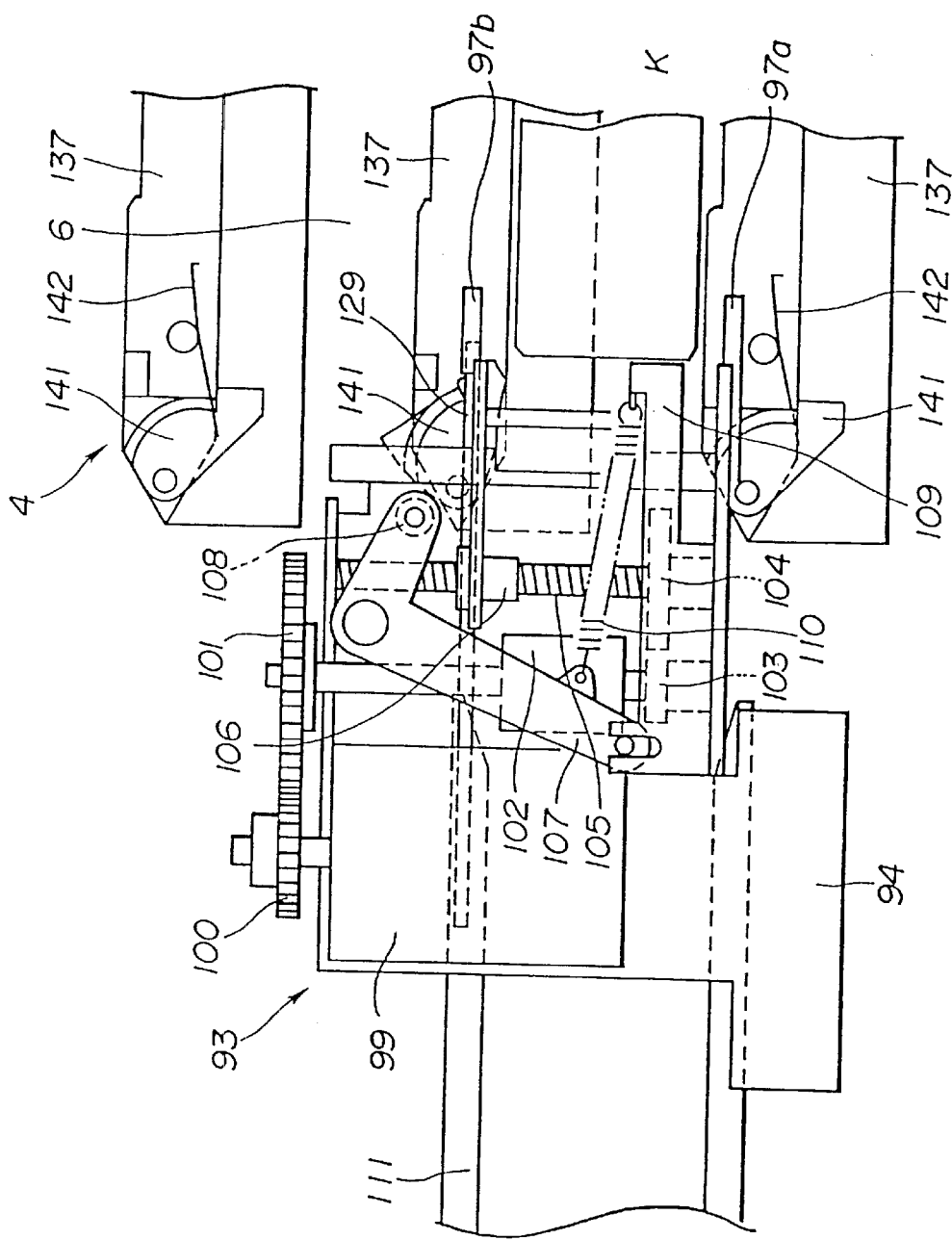
FIG. 50 is a front view of a main portion of the invention at the time of extraction of a cassette from the cassette shuttle compartment by the cassette transfer mechanism.
Figure 52A:
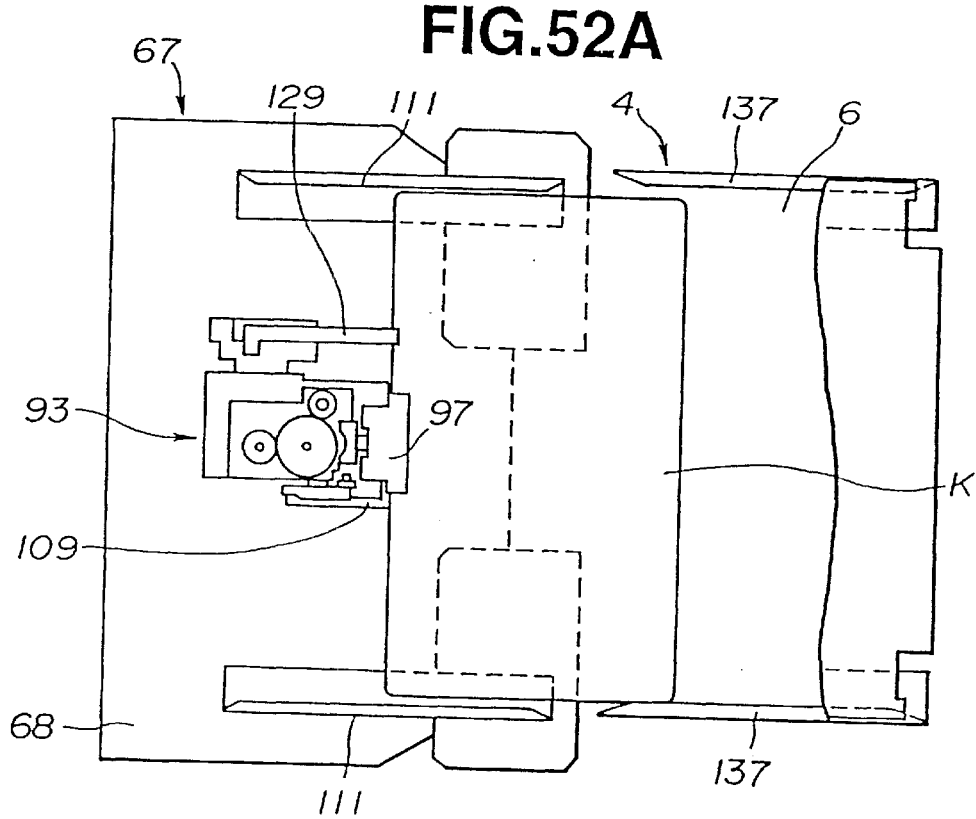
FIGS. 52(a) and (b) are front views respectively showing first and second stages of a positional disengagement operation of the cassette transfer mechanism and the cassette shuttle compartment.
Figure 52B:
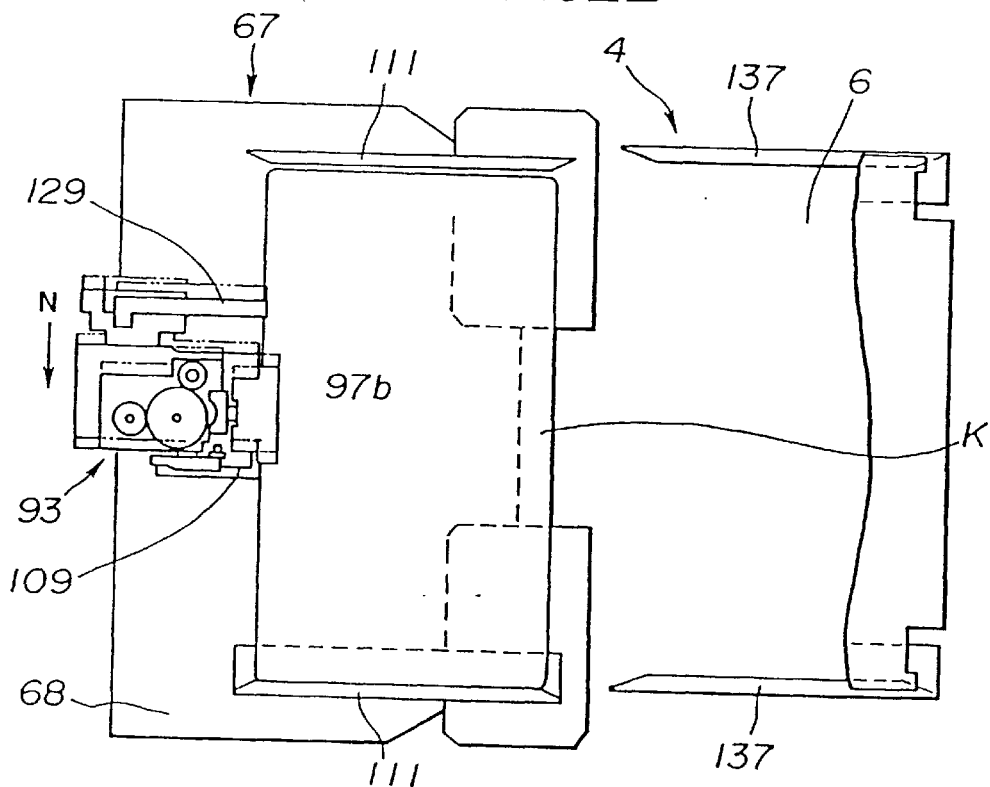
Figure 53:
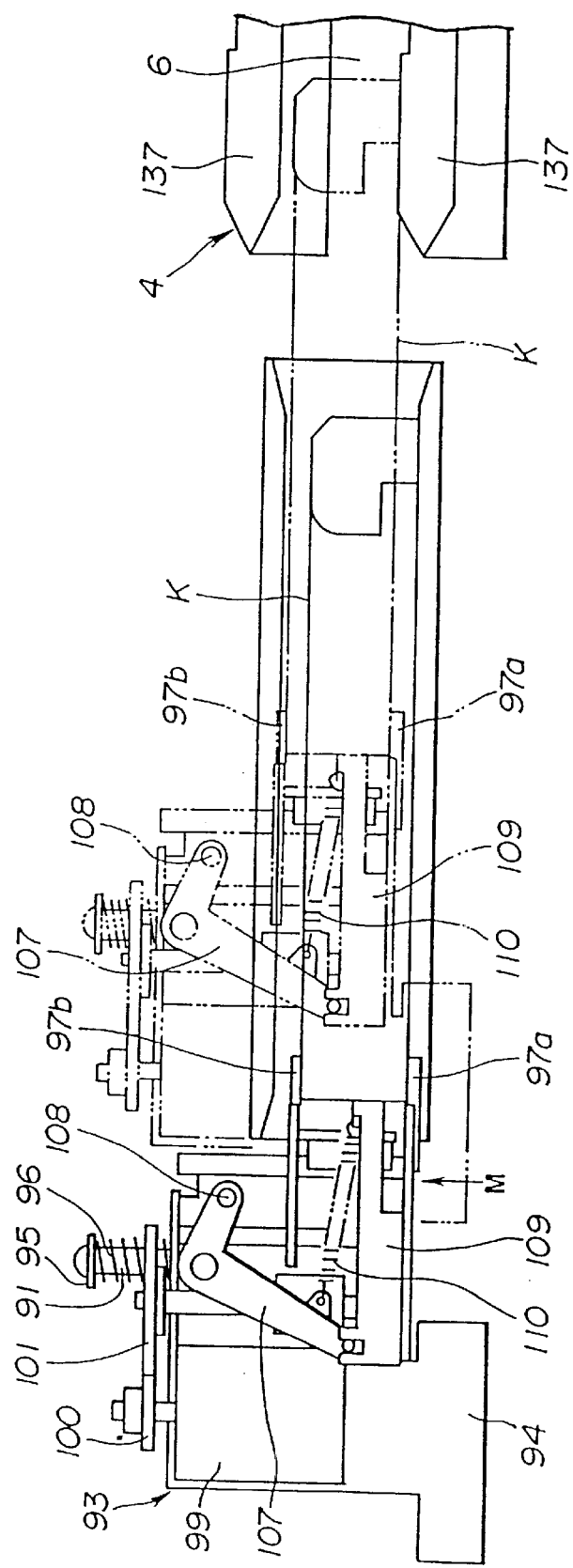
FIG. 53 shows a cross-sectional plan view of a relation between the tape transport mechanism and the cassette shuttle compartment during a horizontal cassette transfer operation.
Figure 54A:
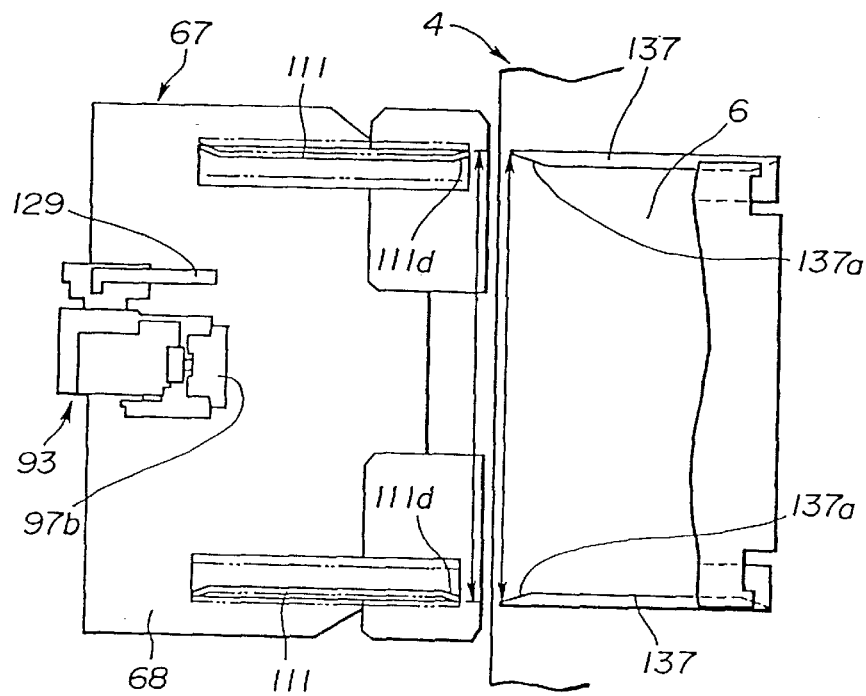
Figure 54B:
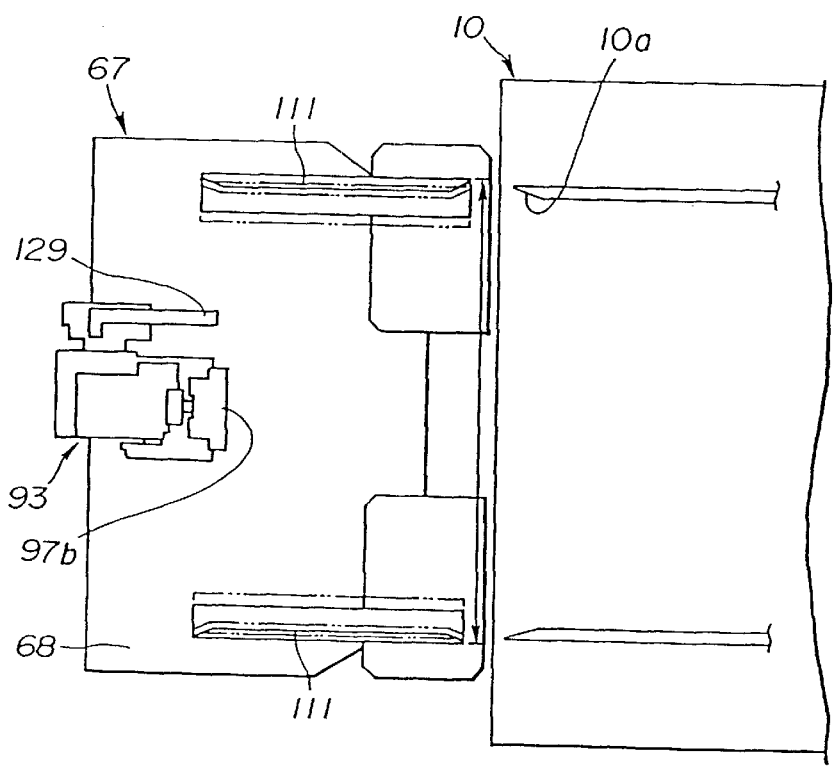
FIG. 54(b) is a plan view of a relation between the cassette guide portion and a cassette shuttle mechanism of a tape playing unit.
Figure 55:
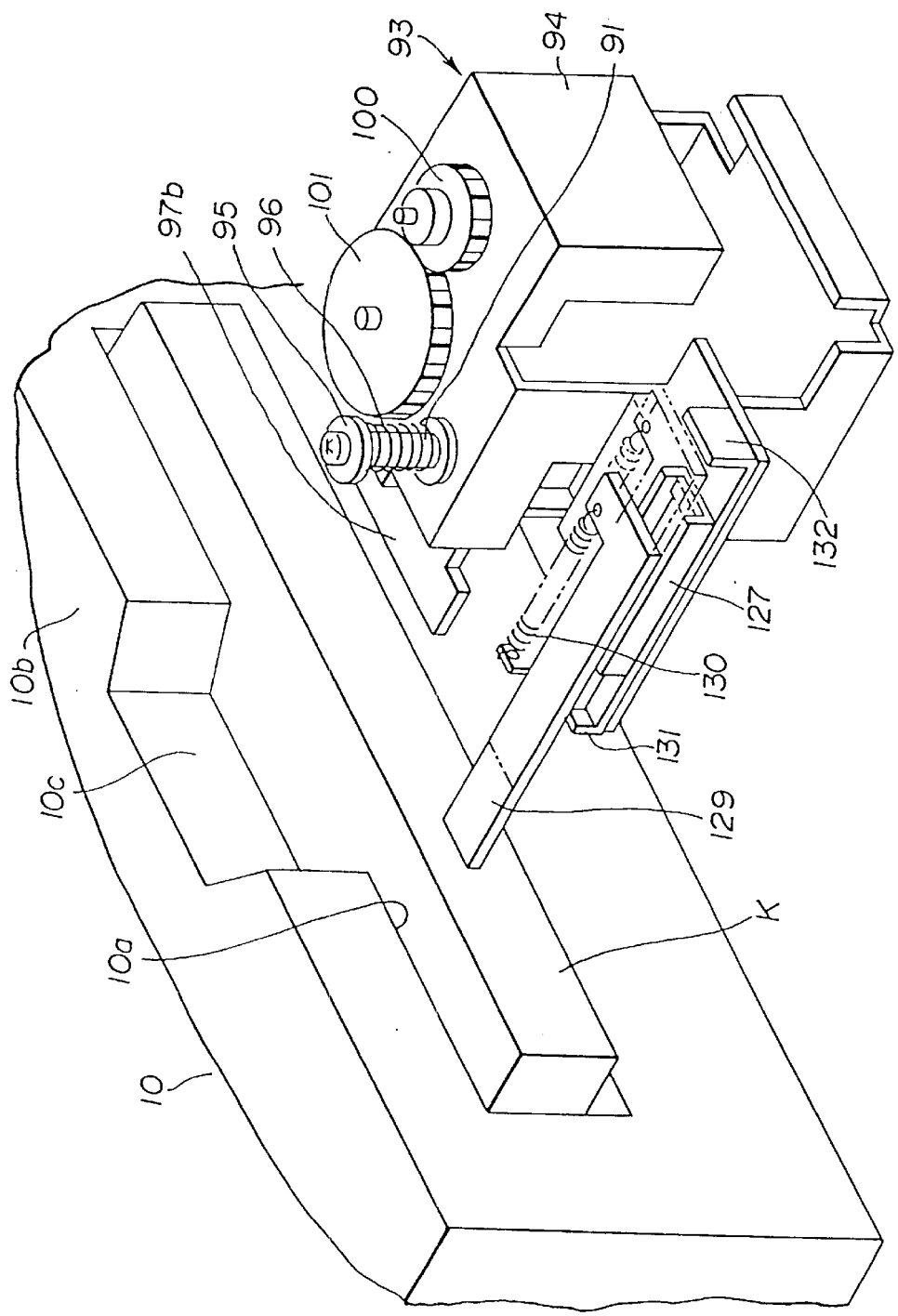
FIG. 55 is a perspective view of a lock release mechanism of the invention.

FIG. 40 shows a main portion of the cassette transfer mechanism during one phase of a cassette transfer operation thereof. FIG. 41 is side view of the cassette transfer operation at a second phase thereof. FIG. 42 is side view of the cassette transfer operation at a third phase thereof. FIG. 43 is a cross-sectional plan view of a cassette conveyance operation of the cassette transfer mechanism at a first operational phase. FIG. 44 is a cross-sectional plan view of a cassette conveyance operation of the cassette transfer mechanism at a second operational phase. FIG. 45 is a cross-sectional plan view of a cassette conveyance operation of the cassette transfer mechanism at a third operational phase. FIG. 46 is a front view of a cassette selection operation of the cassette transfer mechanism at a first phase of operation. FIG. 47 is a front view of a cassette selection operation of the cassette transfer mechanism at a third phase of operation. FIG. 48 is a front view of a cassette selection operation of the cassette transfer mechanism at a third phase of operation. FIG. 49 is a front view of a cassette selection operation of the cassette transfer mechanism at a fourth phase of operation. FIG. 50 is a front view of a main portion of the invention at the time of extraction of a cassette from the cassette shuttle compartment by the cassette transfer mechanism. FIG. 51 is a front view of a main portion of the invention at the time of insertion of a cassette from the cassette shuttle compartment by the cassette transfer mechanism. FIGS. 52(a) and (b) are front views respectively showing first and second stages of a positional disengagement operation of the cassette transfer mechanism and the cassette shuttle compartment. FIG. 53 shows a cross-sectional plan view of a relation between the tape transport mechanism and the cassette shuttle compartment during a horizontal cassette transfer operation. FIG. 54(a) shows a front view of a relation between the cassette shuttle compartment and a cassette guide portion while FIG. 54(b) is a plan view of a relation between the cassette guide portion and a cassette shuttle mechanism of a tape playing unit. FIG. 55 is a perspective view of a lock release mechanism of the invention.

As may be seen, the cassette hand mechanism I is driven toward the front longitudinal opening of the cassette receiving compartment 6 according to positional determination made via a pair of sensors S provided on each side of the cassette hand mechanism I, as will be explained in detail hereinafter. While the cassette guides 126, 126 are moved forward with the first operational portion 71, the cassette guides 111, 111 are brought towards the front of the cassette receiving compartment 6 for guiding the cassette K into or out of the cassette receiving compartment 6. Also, the unlocking lever 129 is brought against the locking lever 141 to disengage same according to the greater spring force thereof and the upper and lower fingers 97b, 97a are inserted sufficiently to grasp the cassette K. According to the present embodiment, only the upper finger 97b is driven, although the mechanism may be arranged such that both upper and lower fingers may be driven towards and away from each other. Thus, the cassette K rests on the lower finger 97a and the upper finger 97b is driven downwardly so as to effect grasping operation to firmly hold the cassette to be moved to or from the unlocked cassette receiving compartment 6. According to this, reliable tape transfer operation may be accomplished with efficiency.

As may be seen in FIG. 55, when the cassette K is inserted into a cassette opening 10a of the playing device 10, an indentation 10c is provided at the upper side 10b of the cassette opening so as to accommodate the upper finger 97b during cassette insertion and extraction from the playing device 10.

Figure 56:
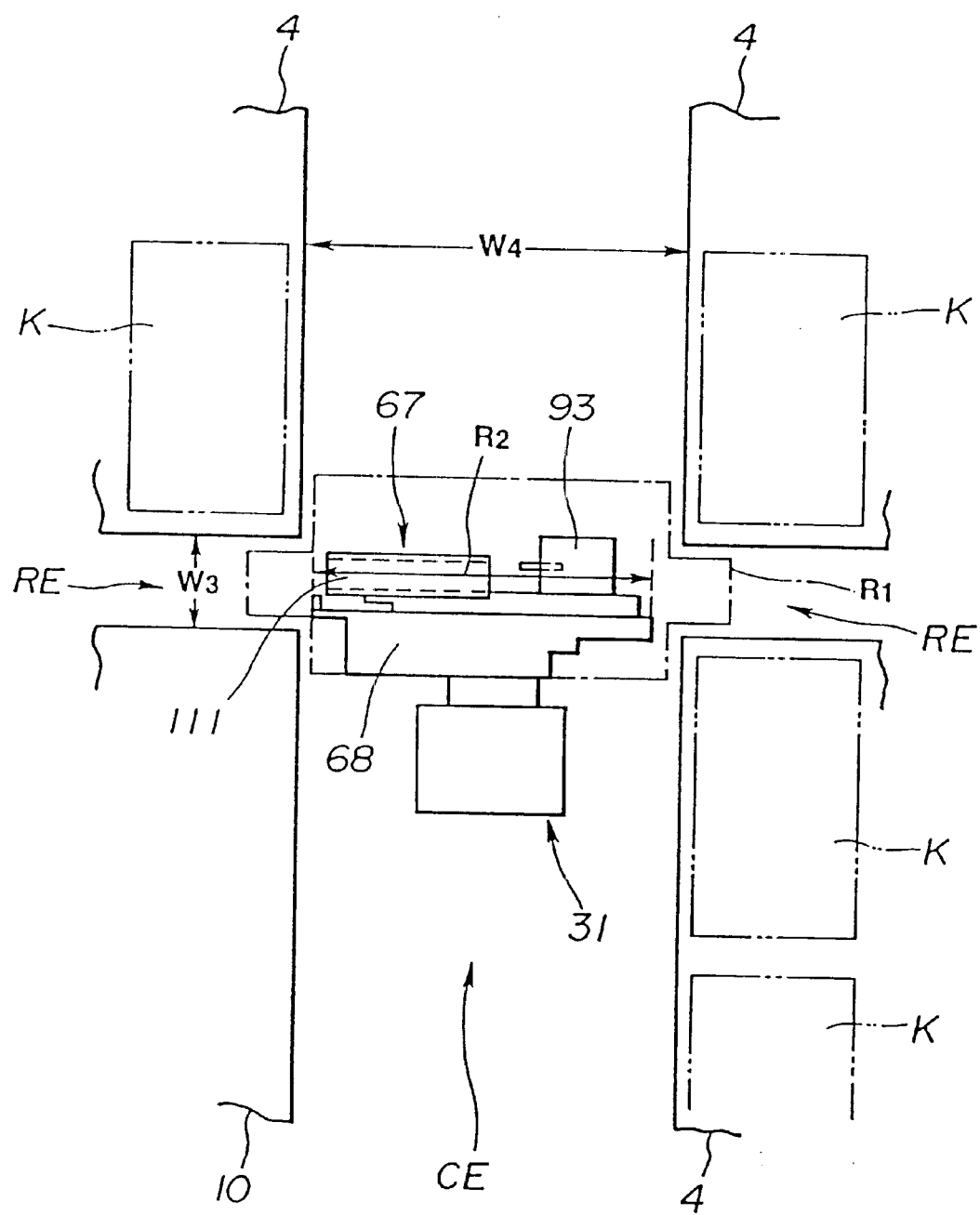
FIG. 56 is a schematic front view illustrating a rotation area of the tape transport mechanism according to the preferred embodiment of a cassette auto changer unit according to the invention.

FIG. 56 is a schematic front view illustrating a rotation area of the tape transport mechanism cassette transfer area CE according to the preferred embodiment of a cassette auto changer unit according to the invention. FIG. 57 is a partially cut-away plan view of the rotation area established for the cassette transfer mechanism shown in FIG. 56.

The cassette transfer area CE includes a cassette rotation area RE established to allow rotation of the cassette shuttle body 31. A width W4 is provided between the various consoles A–D for allowing rotation of the cassette support body 67 without significant extra space so as to maintain compactness of the auto changer system 1. Similarly, a horizontal space W3 is provided for allowing rotation of the cassette support body 67 within a radius R1. A second radius R2 is defined to be smaller than the width W4. Thus, the auto changer system 1 according to the invention is maintained as compact as possible.

Next, a positional detection arrangement N according to the invention will be explained with reference to FIGS. 58–62.

Figure 58:
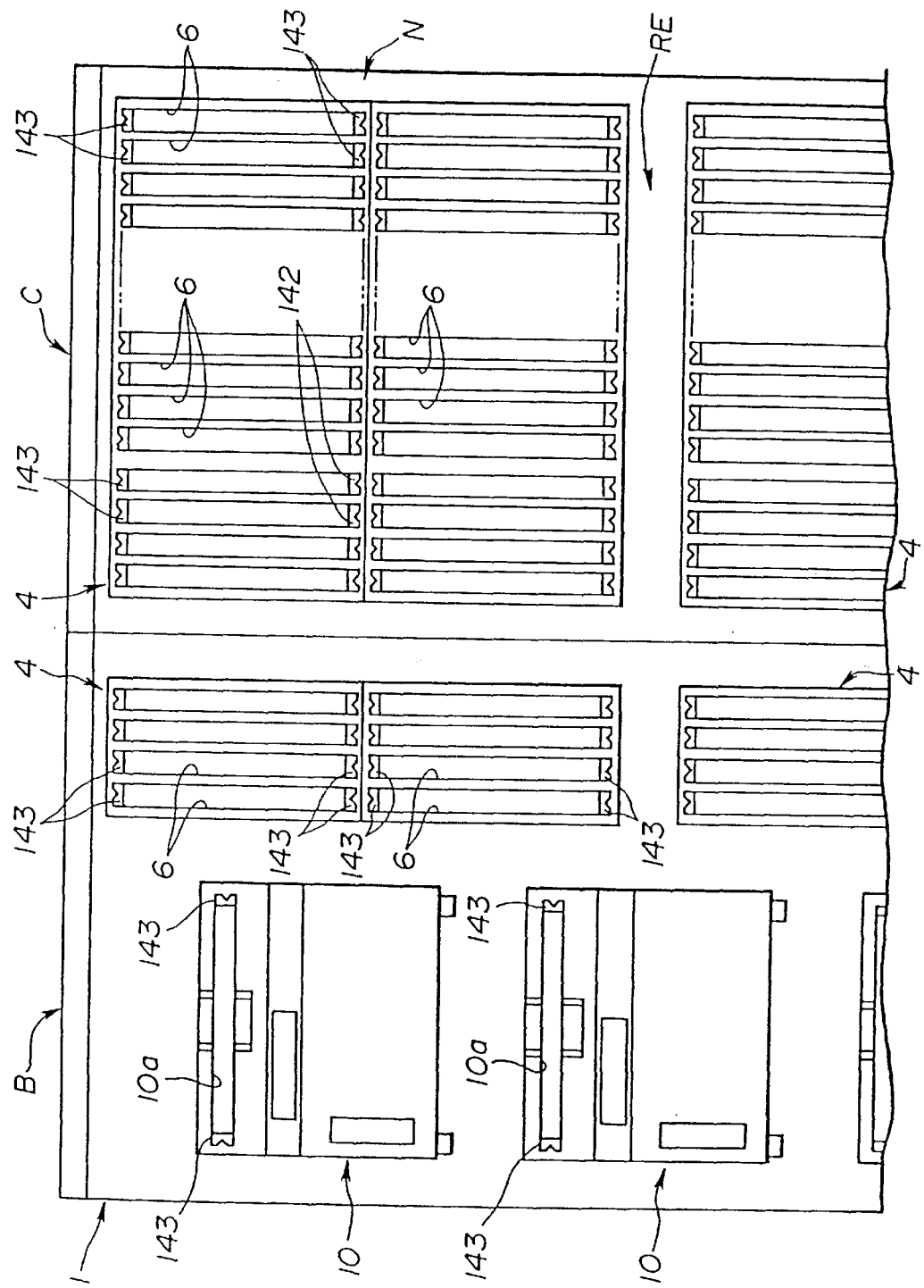
FIG. 58 is an enlarged view of a main portion of the cassette auto changer unit according to a preferred embodiment.
Figure 59A:
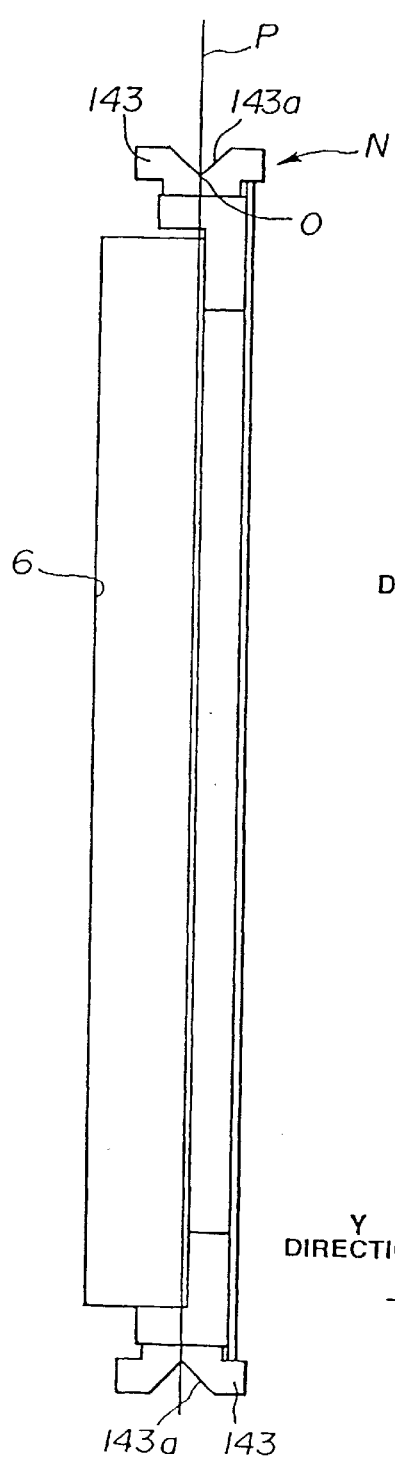
FIGS. 59(a)–(c) are an enlarged front views showing relations between the cassette shuttle compartment and a selection search portion of the auto changer unit according to operation thereof.
Figure 59B:
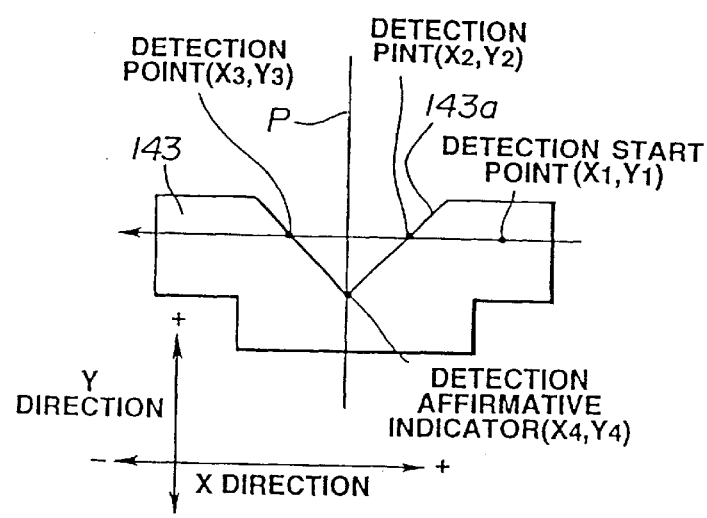
Figure 59C:
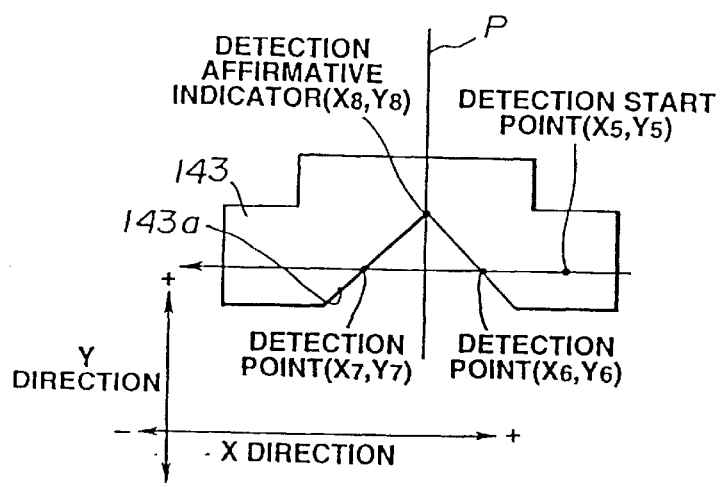

FIG. 58 is an enlarged view of a main portion of the cassette auto changer unit according to a preferred embodiment. FIGS. 59(a)–(c) are an enlarged front views showing relations between the cassette shuttle compartment and a selection search portion of the auto changer unit according to operation thereof.

The positional detection arrangement N according to the invention utilizes position markers in the form of positioning tabs 143 which may be seen in FIGS. 1–9 and 12–19. Referring to FIG. 58 it may be appreciated that these tabs 143 are provided at each longitudinal side of all cassette receving components including the cassette receiving compartments 6, cassette insert compartment 7, the cassette opening 10a of the playing device 10 as well as the cassette insert opening 12 of the cassette shuttle portion 11.

Referring to FIGS. 59(a)–59(c), with reference to the positioning tabs 143 of the cassette receiving compartments 6, it may be seen that a detection affirmative indicator O is established at a point where the slanted sides of the V-shaped cut out 143a meet. These detection affirmative indicator points O are established along a line P corresponding to a longitudinal center line of a cassette side indicating optimal positional alignment. According to this, a light reflective portion of the cut out 143a may be established as a detection zone while a non-reflection portion may be set as a no detection zone.

The sensors S are of an optical type, provided in pairs at opposite sides of the base plate 68, of the cassette shuttle body 31, as seen in FIGS. 30, 31.

The sensors S scan the positioning tabs 143 along an X axis direction of the cassette shuttle body 31. Scanning determination may be effected via encoding such as pulses from the horizonal motor 34 by a pulse counter or the like.

For effecting positional detection, detection start points (X1, Y1), (X5, Y5) are established on the cut out 143a of the positioning tabs 143. Similarly, detection points (X2, Y2), (X3, Y3) and (X6, Y6), (X7, Y7) are defined. Based on data representative of these points, determination of the correct position indicating points (X4, Y4), (X8, Y8) may be derived according to the following equation.

$$X4=(X2+X3)/2$$

$$Y4=\{(Y2-Y3)/2\}\div\tan(\theta/2)+Y1$$

$$X8=(X6+X7)/2$$

$$Y8=\{(Y6-Y7)/2\}\div\tan(\theta/2)+Y5$$

Based on this data, the sensors can reliably determine a correct poisitioning of the cassette shuttle body 31 in relation to a cassette receiving compartment 6 of the cassette bay 4 or other cassette receiving component of the auto changer system 1 for assuring reliable operation and longer playing life of the cassettes K since they are not subject to damage due to faulty positioning of conveyance mechanisms, or the like.

Figure 60:
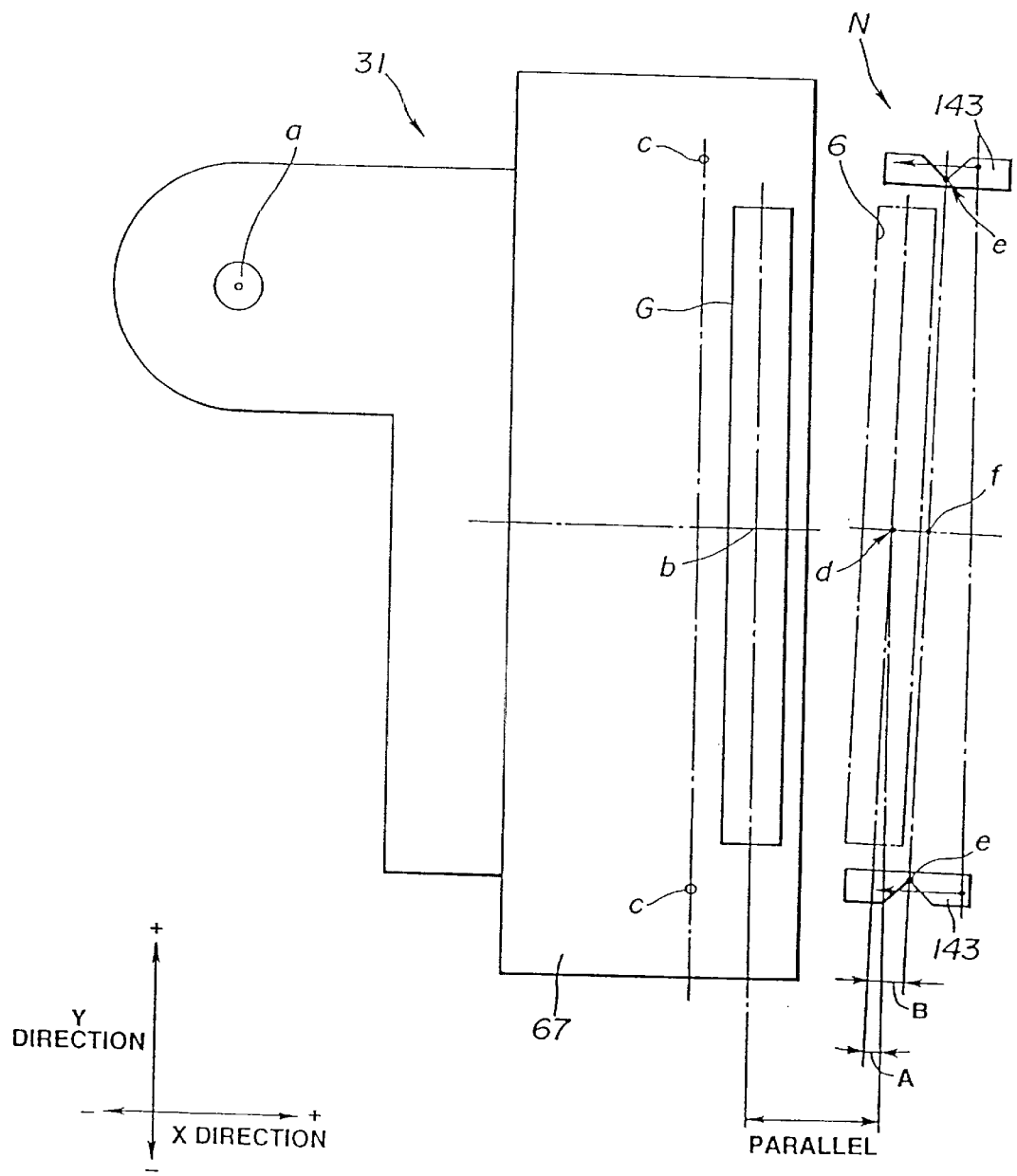
FIG. 60 is a schematic diagram showing the configuration of a cassette transport device utilized in the auto changer unit.

FIG. 60 is a schematic diagram showing the configuration of a cassette transport device utilized in the auto changer unit. The drawing indicates a rotational center a of the cassette shuttle body 31 as well as a center b of a cassette support position G. The position of the sensors S are indicated by a point c and d is a center line of an insert opening of the cassette receiving compartment 6. In addition, center positions f (X9, Y10) of each of the positioning tabs 143 may be determined as follows.

$$X9=(X4+X8)/2$$

$$Y9=(Y4+Y8)/2$$

In addition, angular discrepancy between the cassette shuttle body 31 and the cassette receiving compartments 6 for determining a correction angle A may be determined as follows.

$$A=\tan^{-1}\{(Y4-Y8)\div(X4-X8)\}$$

In addition, from determination of the correction angle A, d(X, Y) is:

$$X=X9|B\times\cos(A)|$$

$$Y=Y9|B\times\sin(A)|$$

Figure 61:
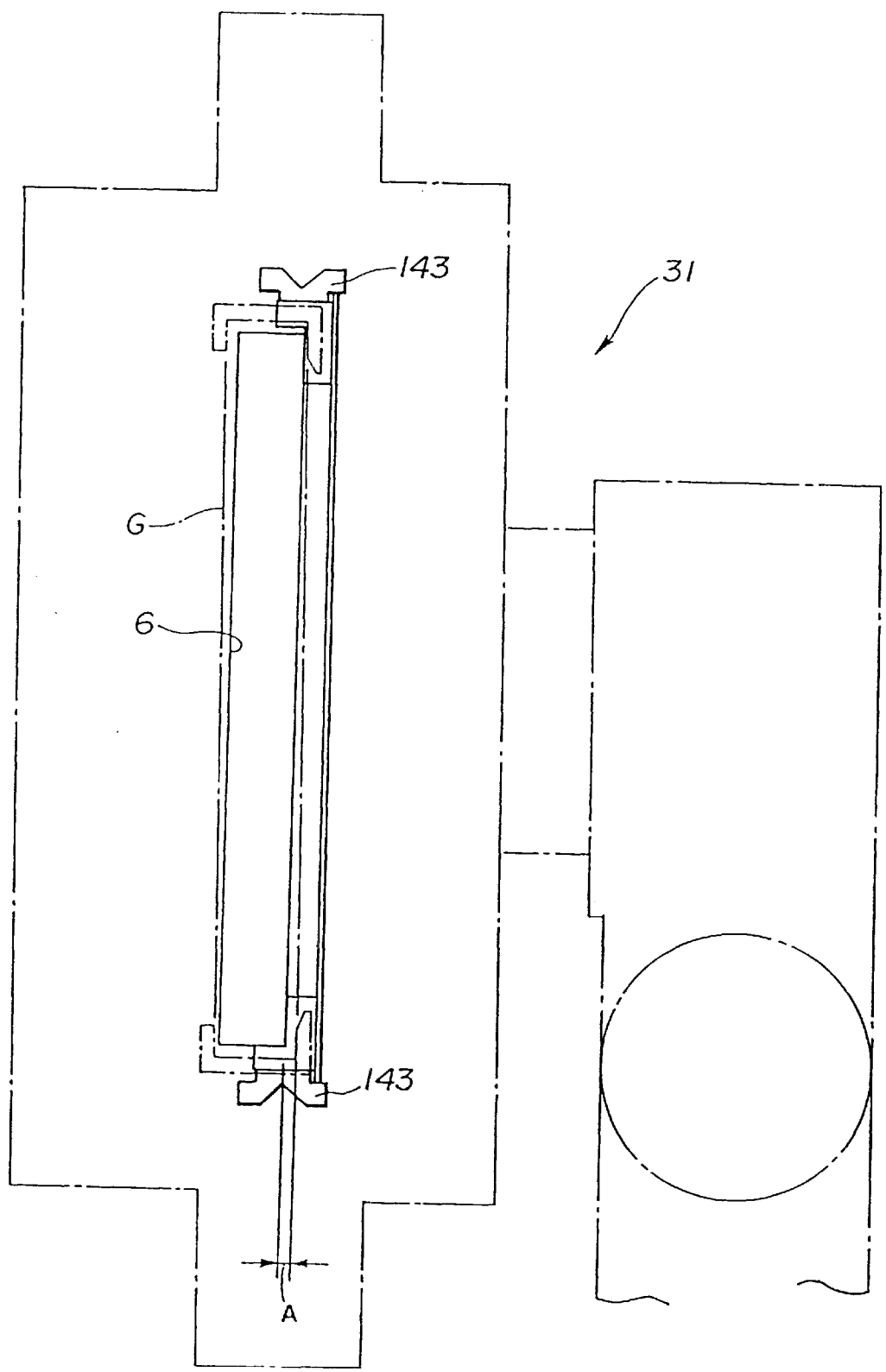
FIG. 61 shows an operational phase of a positional adjustment operation of the cassette shuttle compartment.
Figure 62:
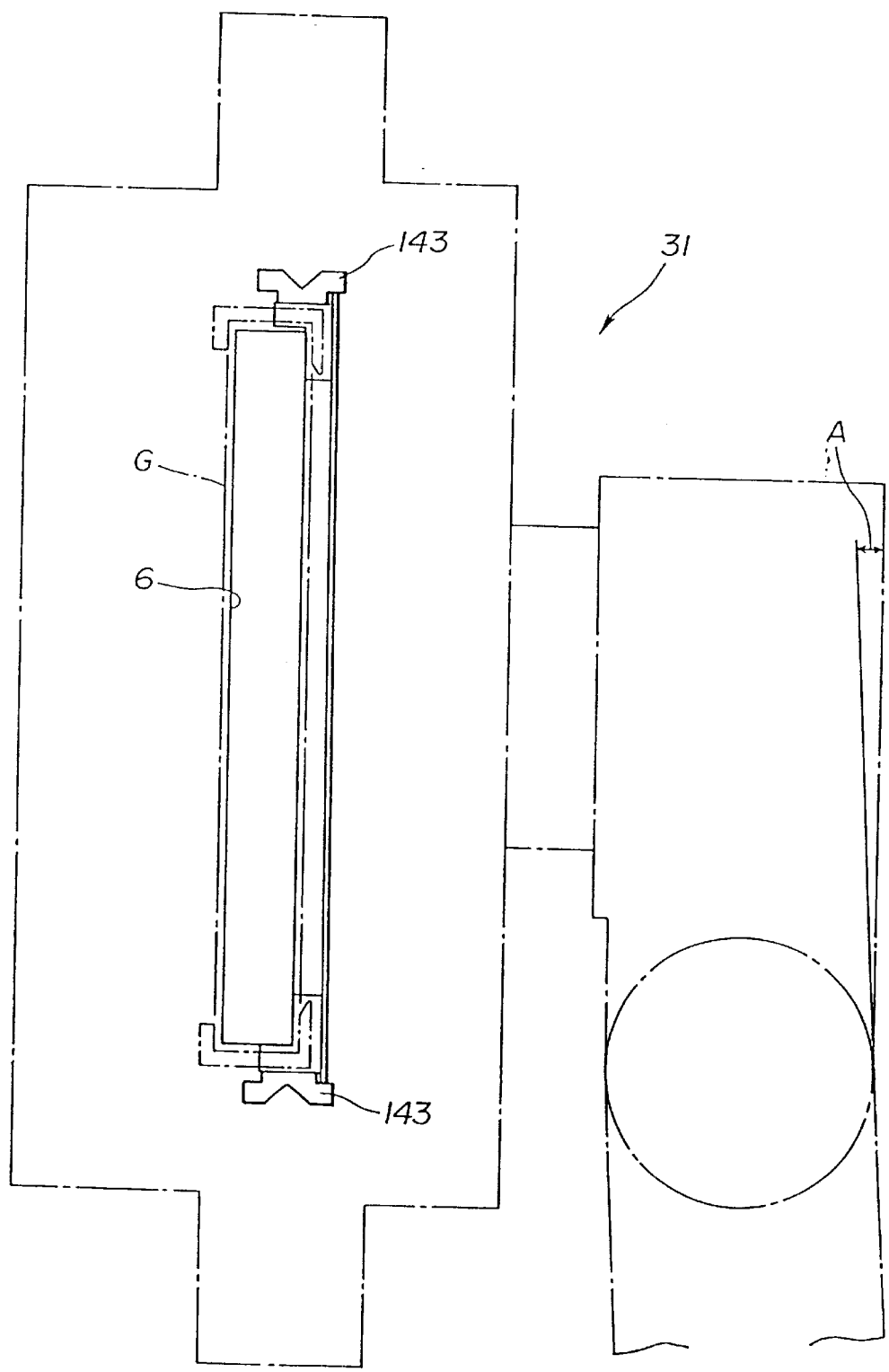
FIG. 62 shows a second operational phase of a positional adjustment operation of the cassette shuttle compartment.

FIG. 61 shows an operational phase of a positional adjustment operation of the cassette shuttle compartment. FIG. 62 shows a second operational phase of a positional adjustment operation of the cassette shuttle compartment. According to the positional determination of the invention correction determination may be foregone since correct positional detection is reliably assured.

Hereinbelow, a cassette IN/OUT port arrangement according to the invention will be described with reference to FIGS. 63–69.

Figure 63:
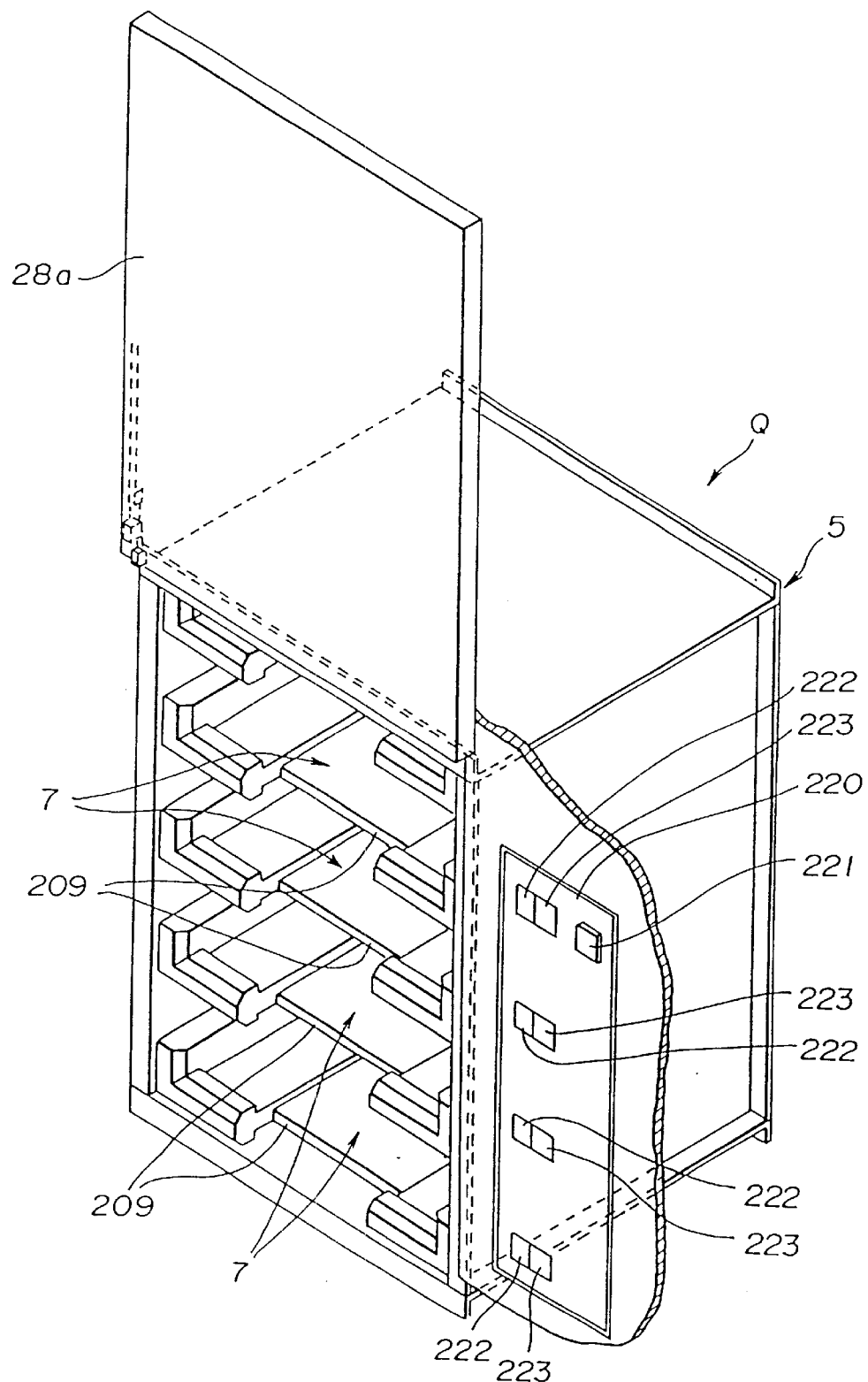
FIG. 63 is a perspective view of a cassette receiving rack of the auto changer unit.
Figure 64:
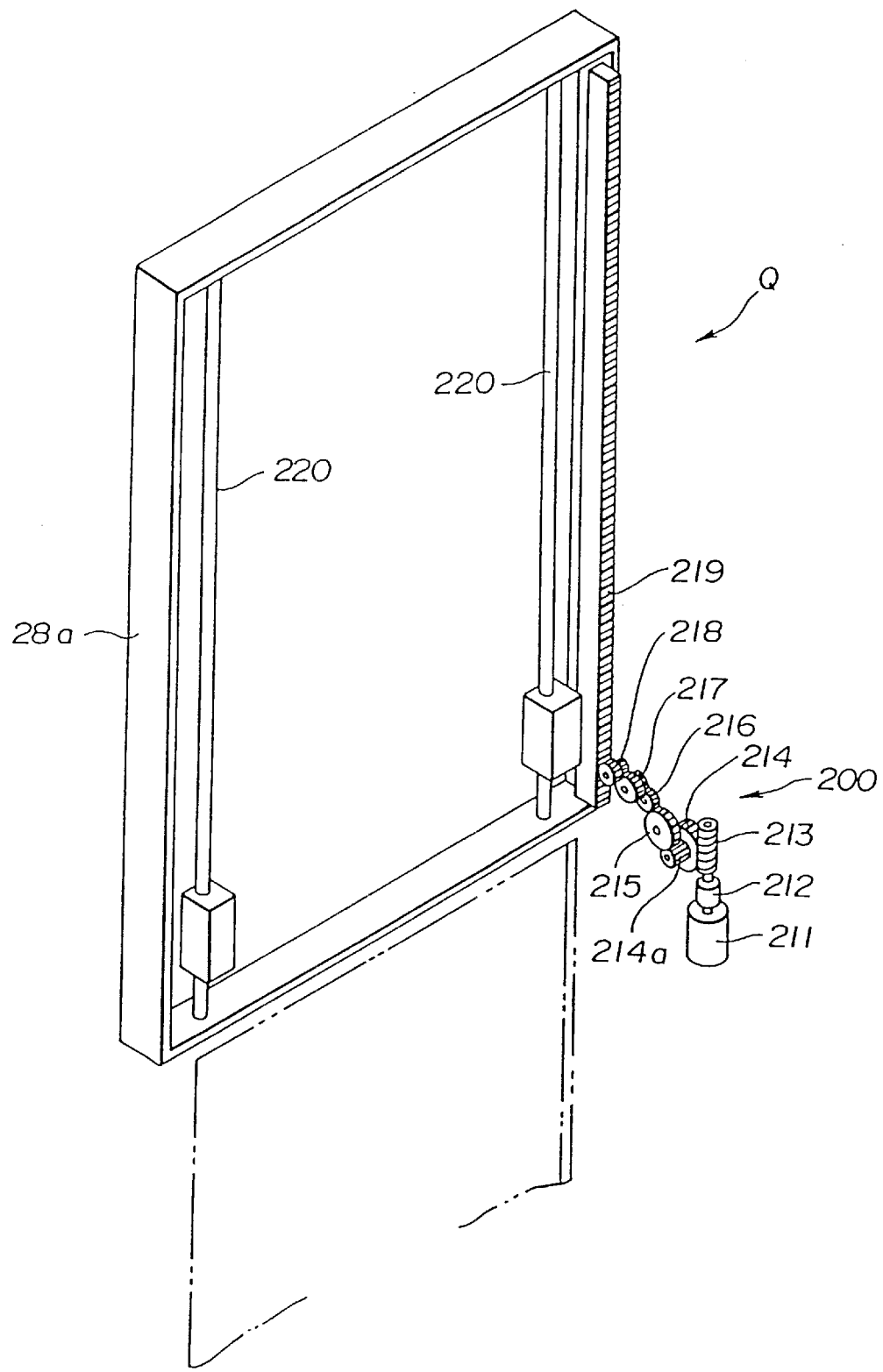
FIG. 64 is a perspective view of a hatch opening/closing mechanism.
Figure 65:
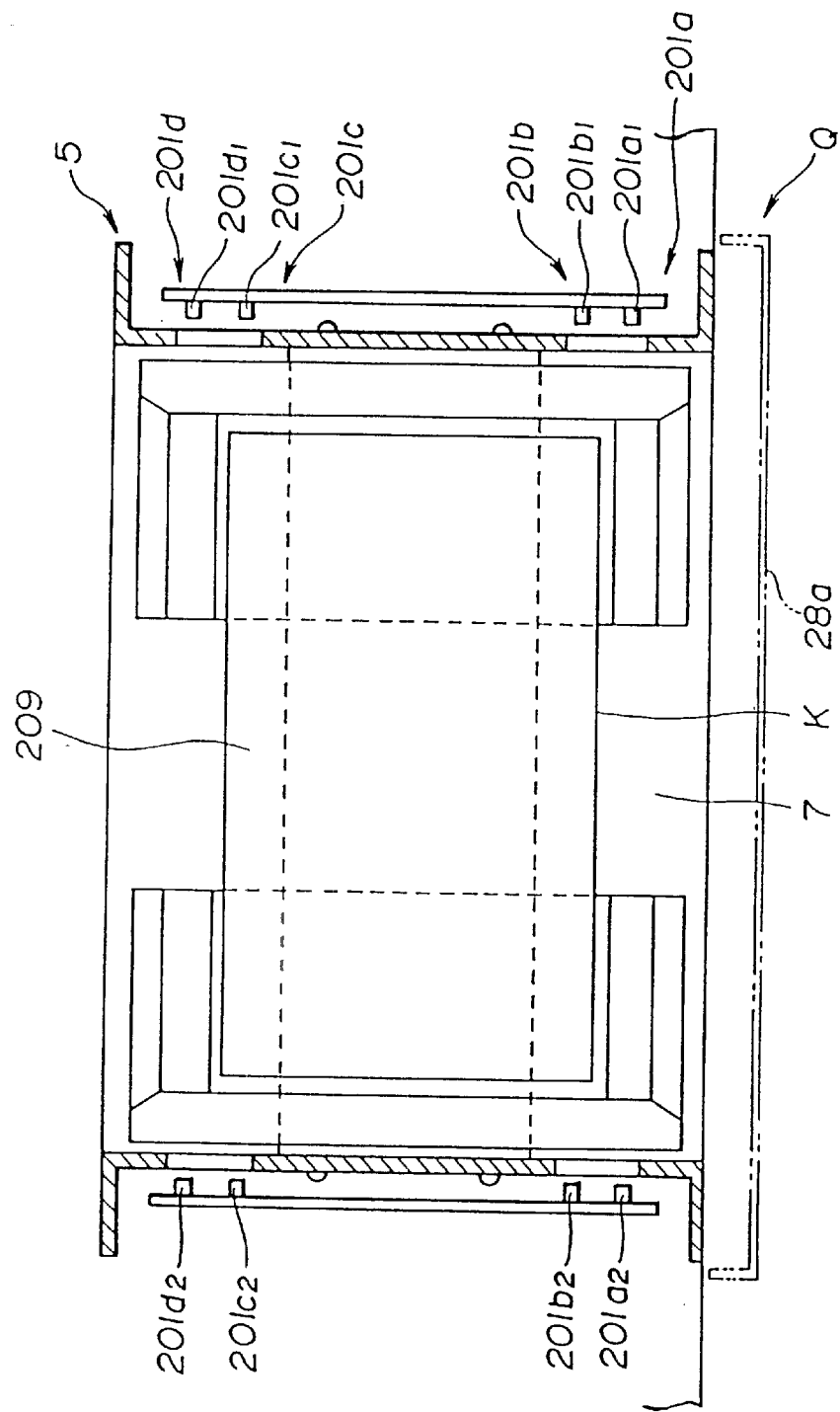
FIG. 65 shows a plan view of the cassette receiving rack of FIG. 63.
Figure 66:
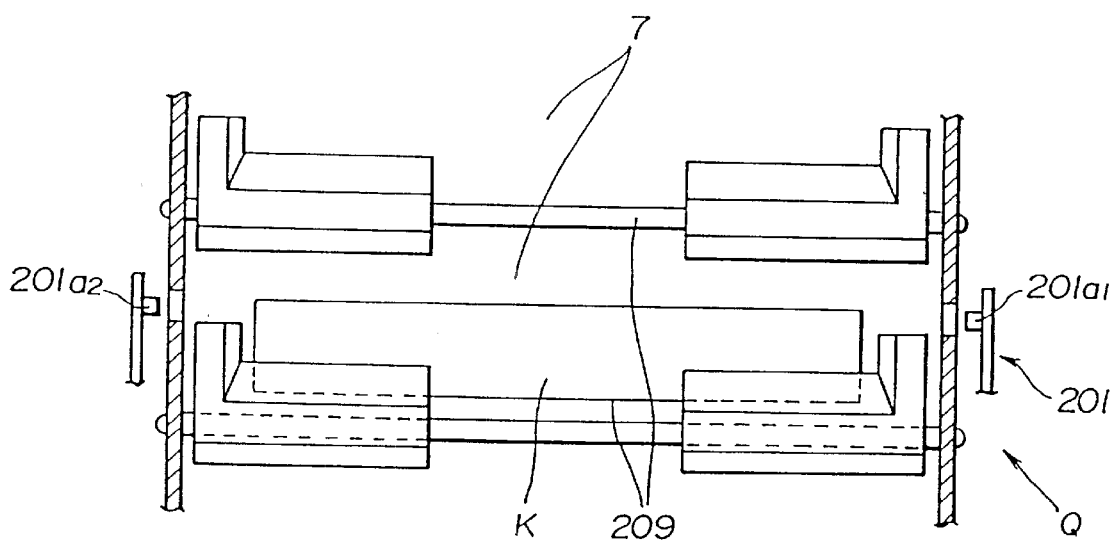
FIG. 66 shows a front view of the cassette receiving rack.
Figure 67:
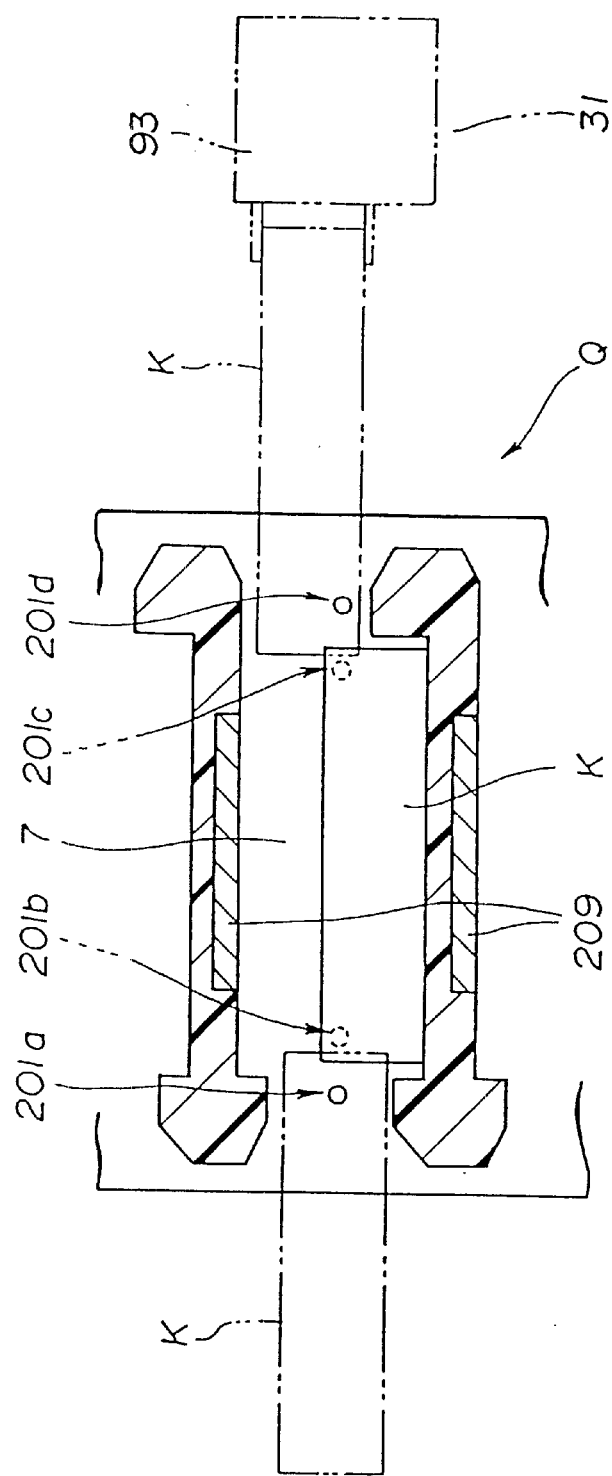
FIG. 67 shows a cross-sectional view of the cassette receiving rack.
Figure 68:
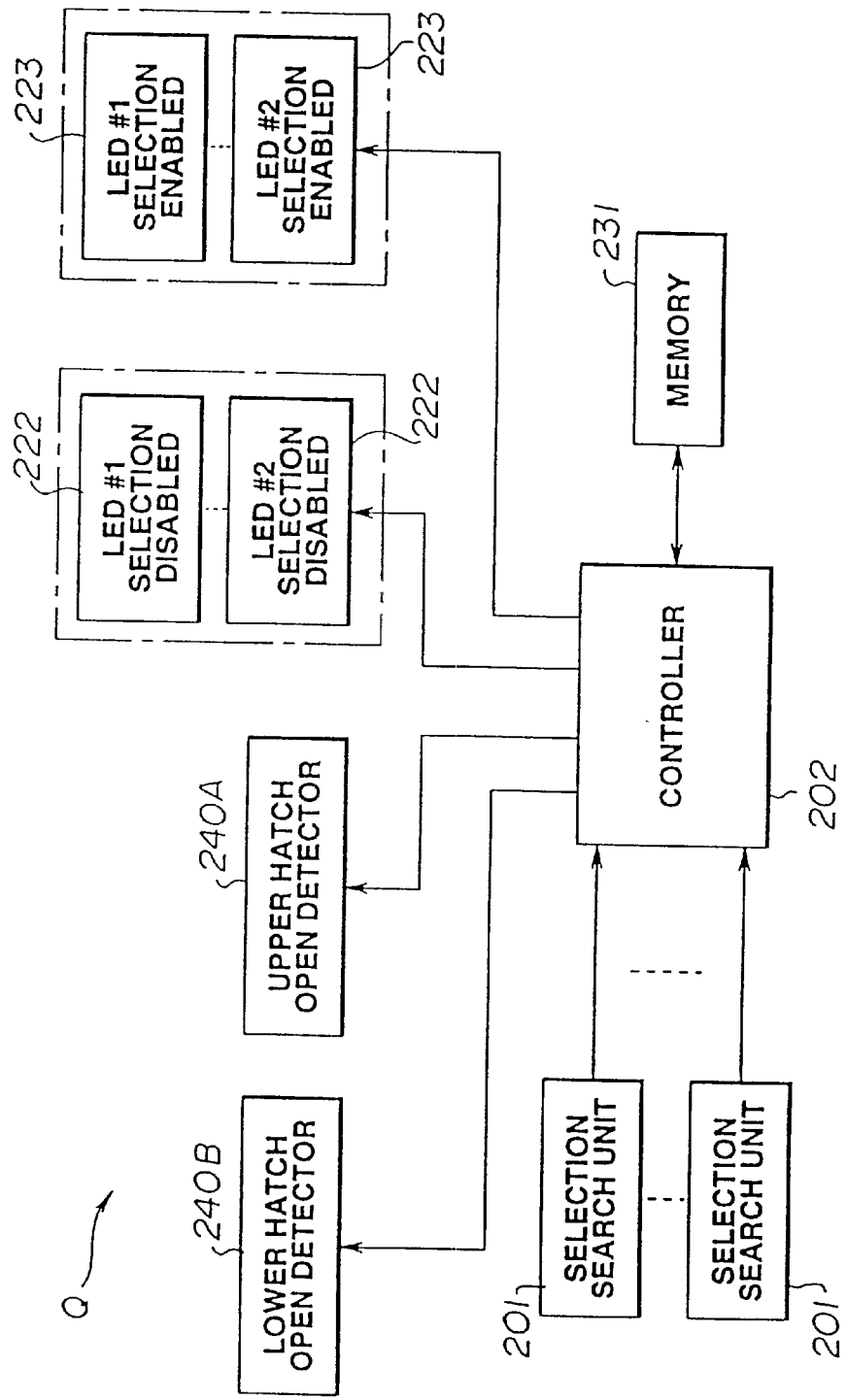
FIG. 68 is a block diagram of a cassette IN/OUT circuit according to the invention.
Figure 69:
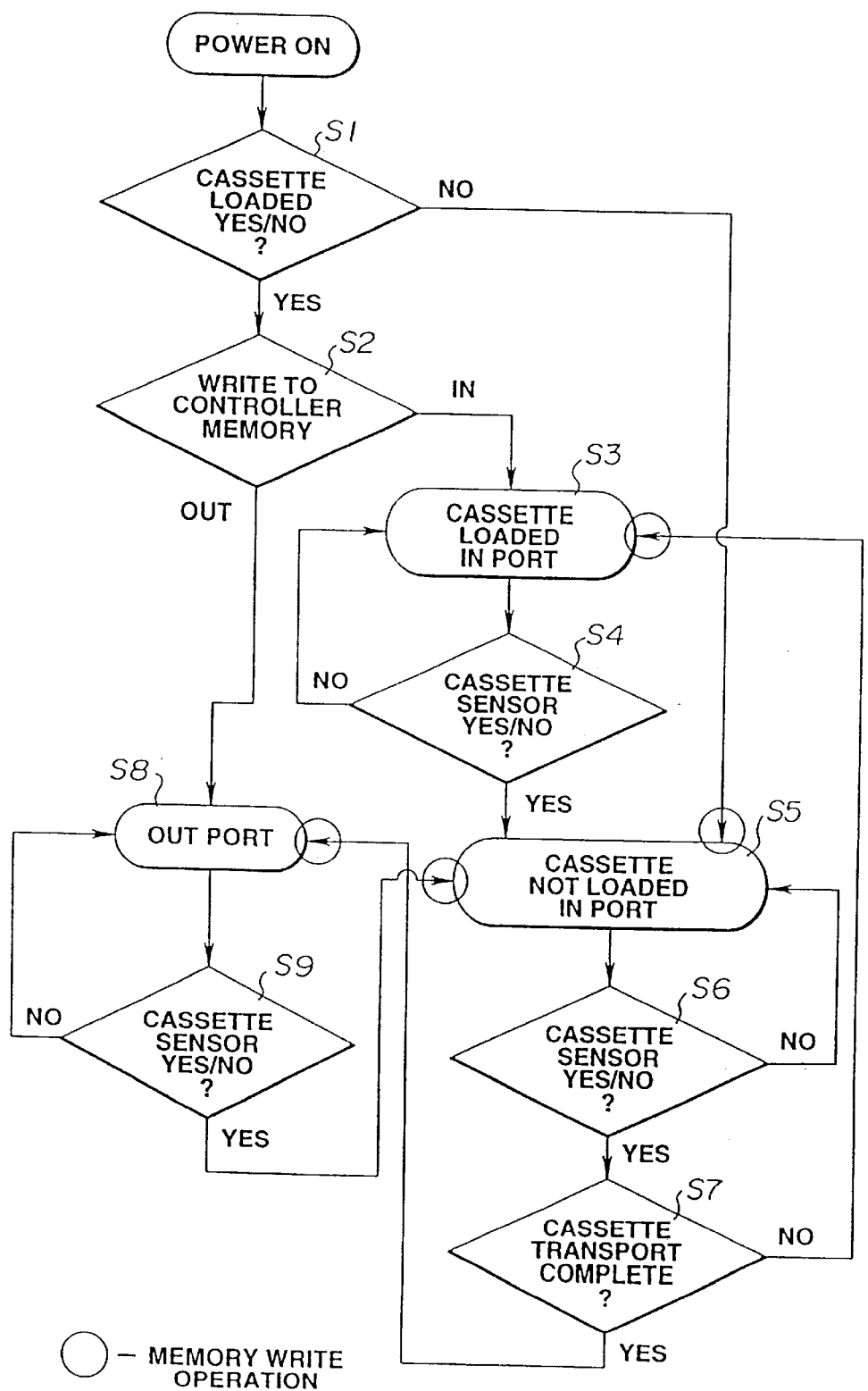
FIG. 69 is a flow chart for explaining an operational process of the cassette IN/OUT circuit of FIG. 68.

FIG. 63 is a perspective view of a cassette receiving rack of the auto changer unit. FIG. 64 is a perspective view of a hatch opening/closing mechanism. FIG. 65 shows a plan view of the cassette receiving rack of FIG. 63. FIG. 66 shows a front view of the cassette receiving rack. FIG. 67 shows a cross-sectional view of the cassette receiving rack. FIG. 68 is a block diagram of a cassette IN/OUT circuit according to the invention. FIG. 69 is a flow chart for explaining an operational process of the cassette IN/OUT circuit of FIG. 68.

Referring to the drawings, the cassette IN/OUT port structure Q includes a hatch 28a opening to an input/output cassette bay 5 having a plurality of cassette insert compartments 7 arranged therein. On a panel at the outer side of a housing of the auto changer system 1, two LEDs 222, 223 are provided beside each cassette insert compartment 7 and an open/close button 221 is provided on a control panel 220. Divider plates 209 are provided between each of the cassette insert compartments 7.

As may be seen, the hatch 208a is driven via a motor 211 and a torqure reduction portion 212 through a gear train 200 including a worm gear 212 and gears 213–218. The gear 218 engages a rack gear provided on a rear side of the hatch 28a to drive the hatch 28a in opening or closing directions along guide rods 220 according to actuation of the opening/closing button 221.

According to the present embodiment, four cassette insert compartments 7 are provided in the input/output cassette cassette bay 5 which is provided in the base console A of the auto changer system 1.

A YES/NO sensor is provided at the cassette port for determining whether a cassette is present in each of the cassette insert compartments 7 of the input/output cassette cassette bay 5. The sensor arrangement 201 provides optical sensors 201a-1, 201a-2, 201b-1, 201b-2, 201c-1, 2-01c-2, 201d-1, 201d-2, a pair of sensors being provided at each cassette insert compartment 7. Thus the LED 222 indicates the cassette insert compartment 7 may not be used and the LED 223 indicates that the cassette insert compartment 7 may be used. Determination being made by a controller 202.

Referring to FIG. 68 and steps S1 to S9 of FIG. 69, it may be seen that the controller 202 is active such that, when a YES indication determined by the YES/NO sensor changes to a NO determination, the control means sets the cassette port at an IN port empty condition and lights the LED indicator 223 and, when the IN port empty condition of the YES/NO sensor changes to a YES condition wherein a cassette is present in the cassette port, operation of the tape transfer mechanism to the cassette port is disabled and a IN port loaded condition is determined. Further, in an IN port empty condition of the cassette port, operation of the tape transfer means is detected by the YES/NO sensor, the control means determines an OUT port loaded condition of the cassette port and sets the LED 222. When such an OUT port loaded condition changes from YES to NO as determined by the YES/NO sensor arrangement 201, an IN port empty condition of the cassette port is determined by the control means. The controller 202 receives input from a lower hatch open deytector 240B and an upper hatch open detector 240a as well as cassette selection search units 201 whereat cassettes may be selected by an operator.

The contoller also includes a memory unit associated with the control means for memorizing a state of the cassette port.

According to operation of the controller 202 access to the 5b is disable during a switching state of the YES/NO sensor or of a port condition determination be the control means. However, cassette extraction from outside the input/output cassette cassette bay 5 of the auto changer during switching from an IN port to an OUT port determination of the control means is permitted.

Figure 70:
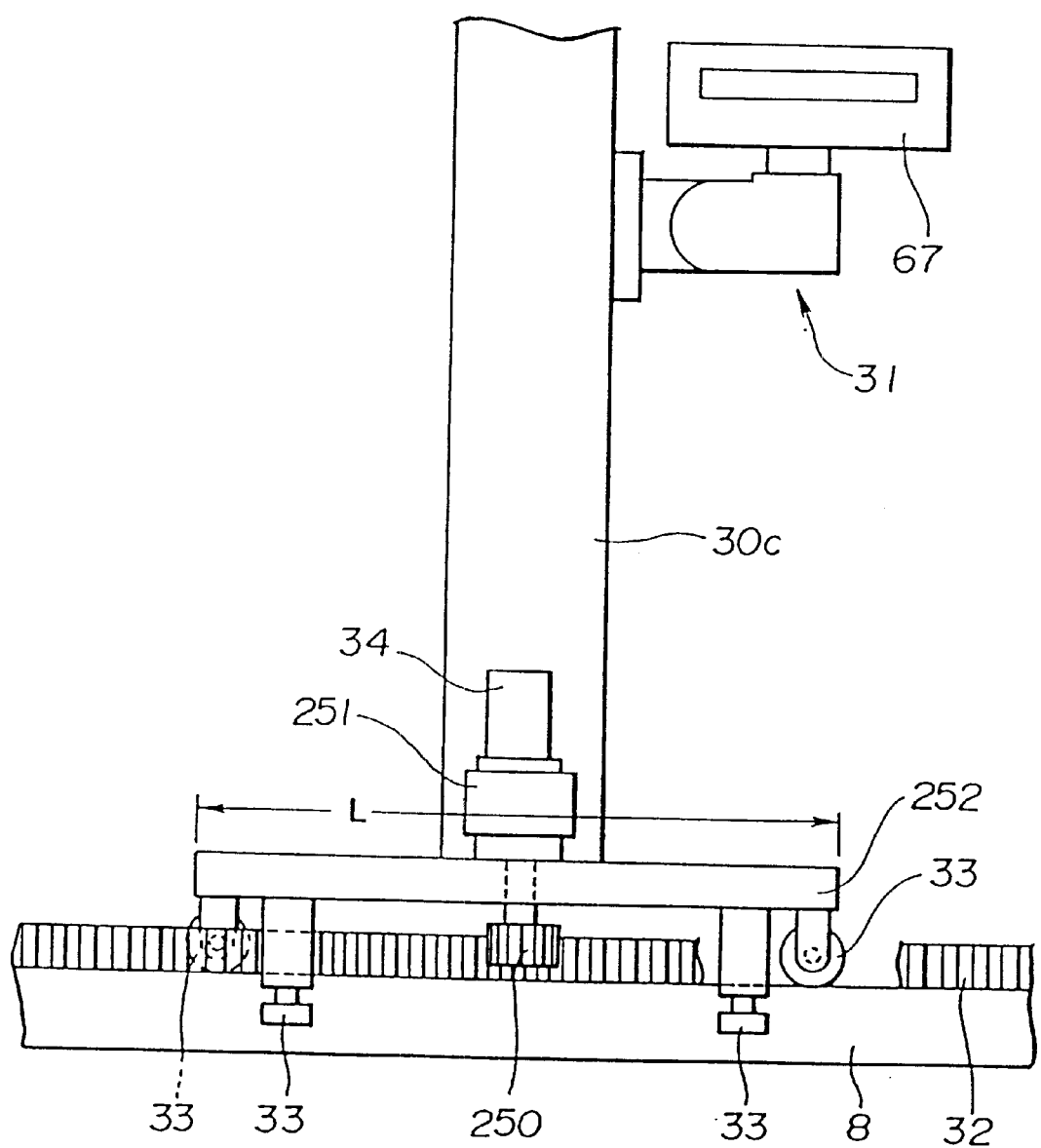
FIG. 70 is an enlarged front view of a main portion of a cassette transport arrangement according to an alternative embodiment of the invention.

FIG. 70 is an enlarged front view of a main portion of a cassette transport arrangement according to an alternative embodiment of the invention. As may be seen, the pillar 30 is supported on a base platform 252 having wheels 33 and a motor 34 connected to a gearing mechanism 251 to drive a pinion gear 250 at a lower side of the base platform to engage the rack gear 32. In other respects, the arrangement is the same as described above.

Figure 71:
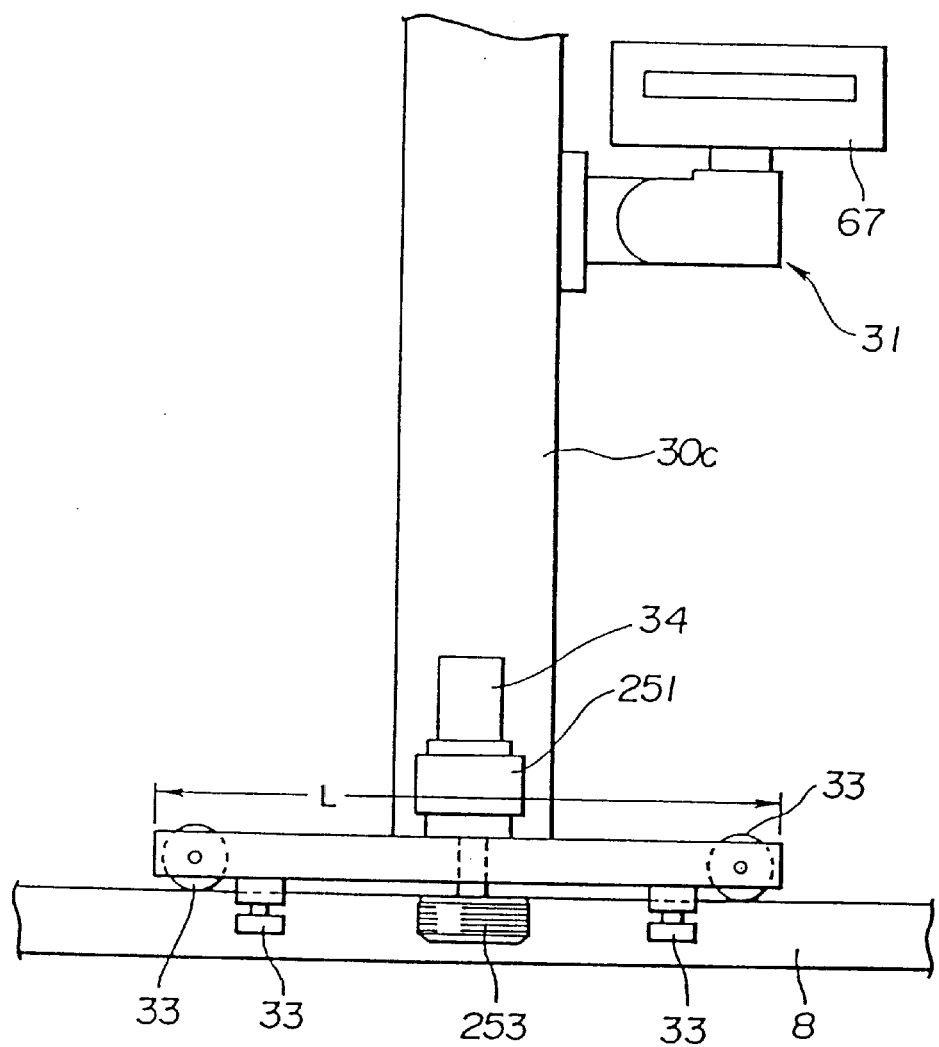
FIG. 71 is an enlarged front view of a main portion of a cassette transport arrangement according to another alternative embodiment of the invention.

FIG. 71 shows an enlarged front view of a main portion of a cassette transport arrangement according to another alternative embodiment of the invention. According to this modification, the motor 34 may power a drive tire 253 and the wheels 33 are vertically on top of the guide rail 8 as well as horizontally similarly to the drive tire to run the horizontal moving arrangement along the top side of the guide rail 8 according to frictional force.

Figure 72:
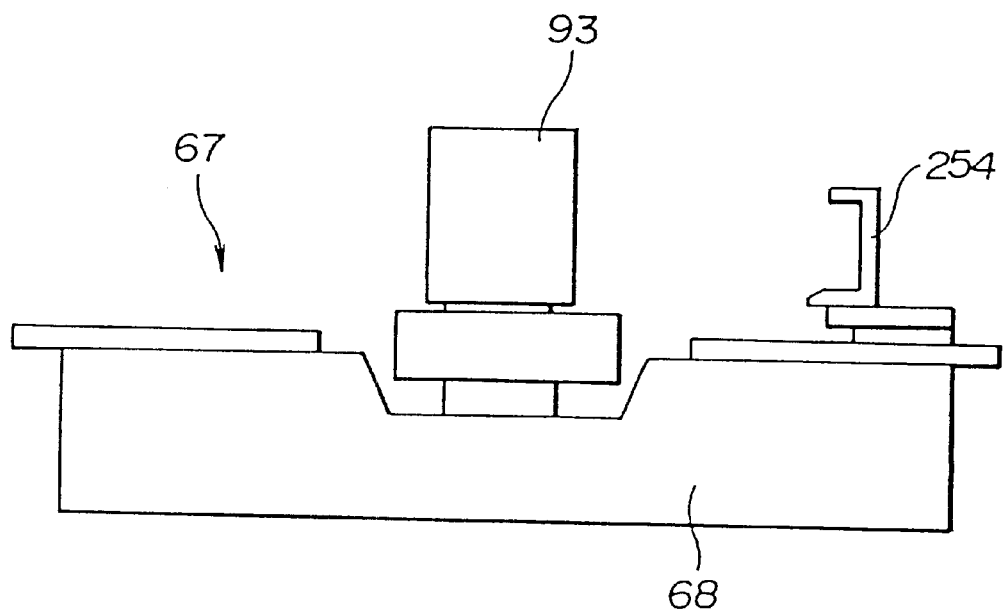
FIG. 72 is a diagram of a main portion of a cassette support arrangement according to an alternative embodiment of the invention.

FIG. 72 is a diagram of a main portion of a cassette support arrangement according to an alternative embodiment of the invention. According to this, only one cassette guide portion 254 is provided on the cassette support body 67.

Figure 73:
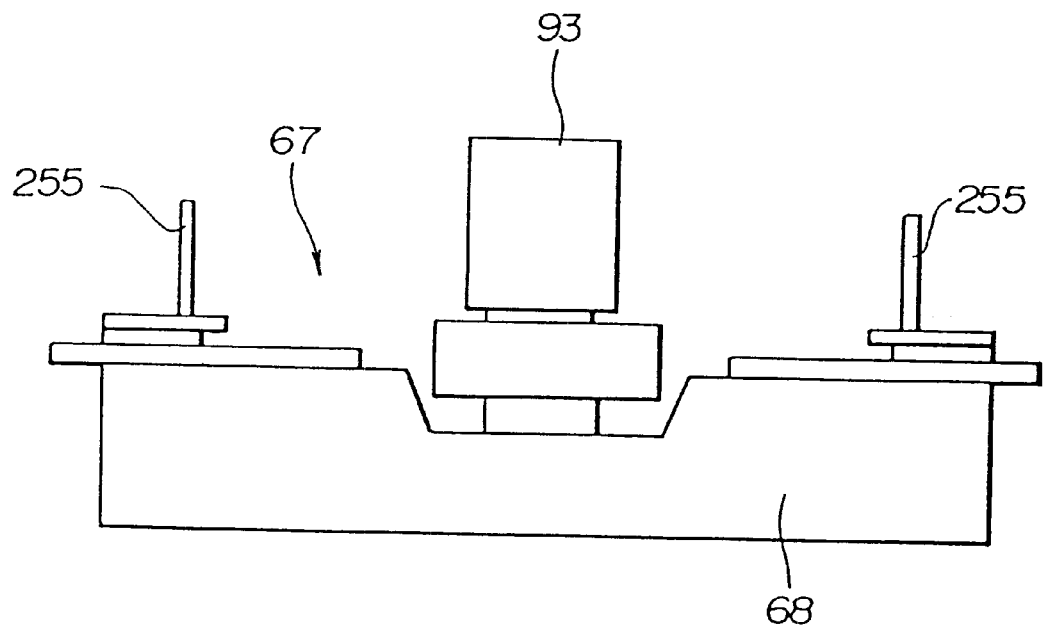
FIG. 73 is a diagram of a main portion of a cassette support arrangement according to another alternative embodiment of the invention.

FIG. 73 is a diagram of a main portion of a cassette support arrangement according to another alternative embodiment of the invention. According to this, two vertical guide members 255 are provided instead of the C-shaped members 111 of the first embodiment.

Figure 74:
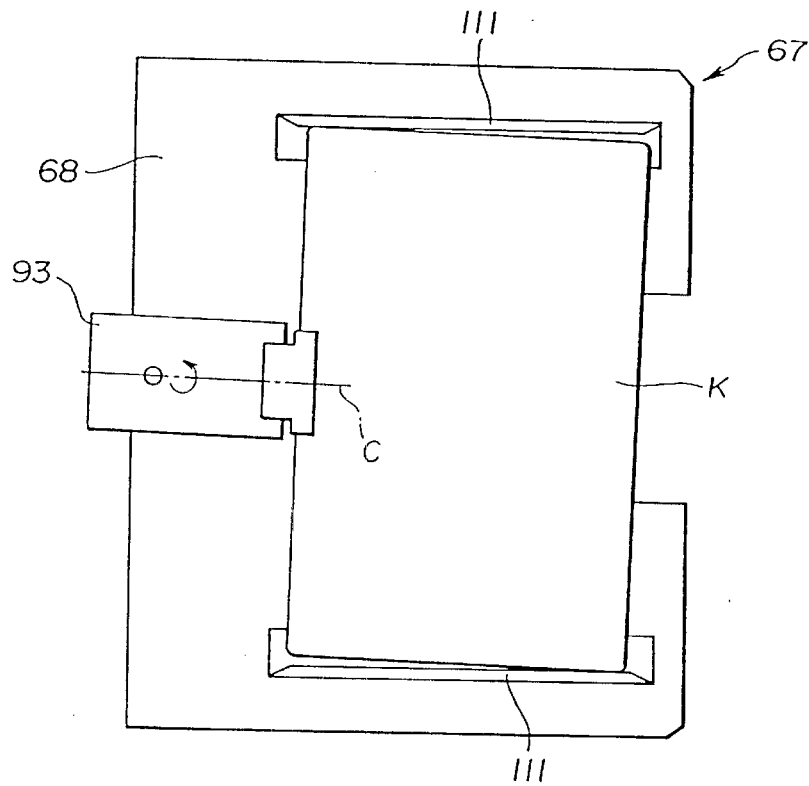
FIG. 74 is a diagram of a modification of the cassette support arrangement of the invention.

FIG. 74 is a diagram of a modification of the cassette support arrangement of the invention. According to this variation, the cassette guide members 111, 111 are formed to be L-shaped, having no upper support portion 111b.

Figure 75:
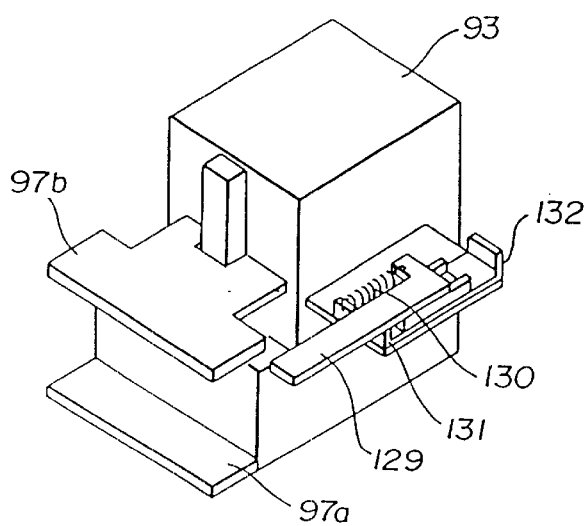
FIG. 75 is a perspective view of a lock disengaging mechanism for a cassette shuttle compartment.

FIG. 75 is a perspective view of a lock disengaging mechanism for a cassette shuttle compartment according to the alternative embodiment. This modification provides the lock release lever 129 (i.e. unlocking lever) on the side of the cassette hand 93.

Figures 76A, 76B:
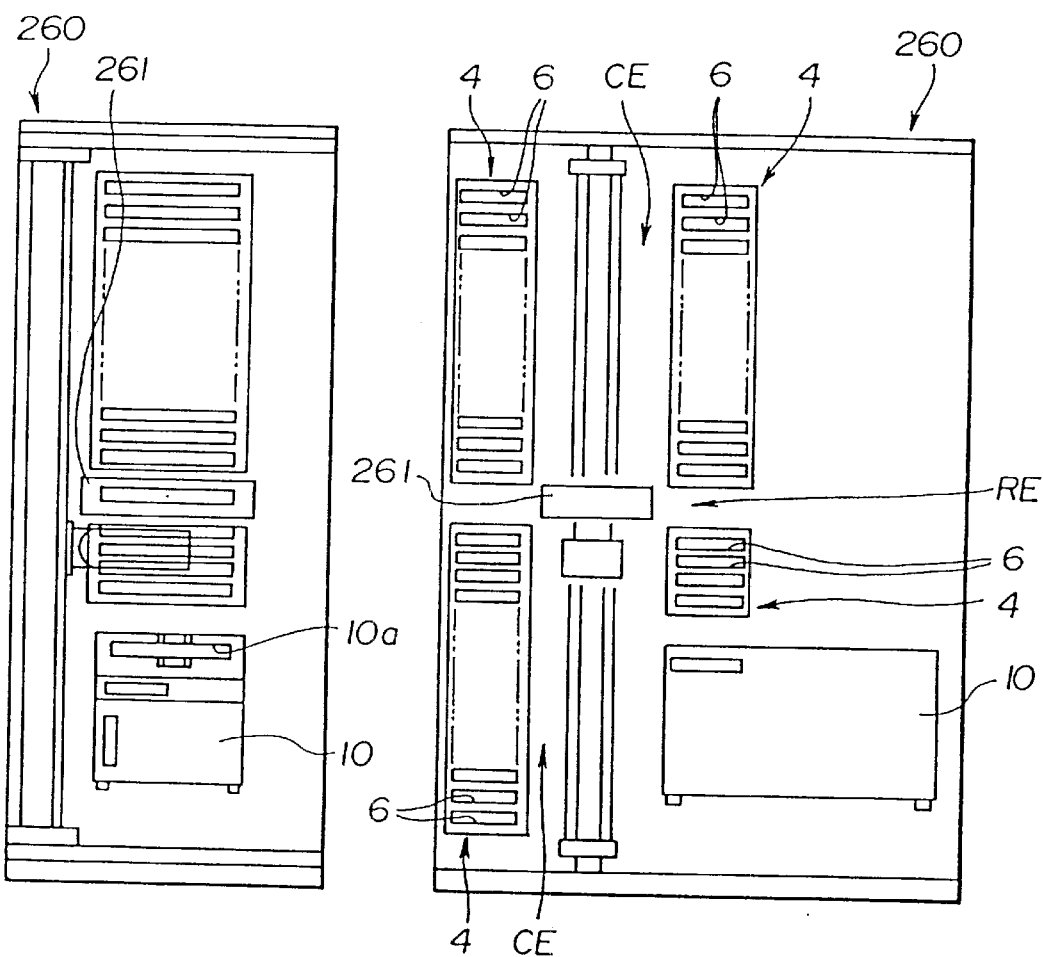
FIG. 76(a) is a side view of an interior of a cassette console and, FIG. 76(b) shows a front view of the console interior according to a first preferred embodiment thereof.
FIG. 77(a) is a plan view of an interior of a cassette console according to a second embodiment thereof and FIG. 76(b) shows a front view of the console interior according to the second preferred embodiment thereof.

FIG. 76(a) is a side view of an interior of a cassette console and, FIG. 76(b) shows a front view of the console interior according to a first preferred embodiment thereof. According to this, the longitudinal orientation of the cassette receiving compartments 6 as well as the playing device 10 is established to be horizontal. Thus, the tape transport mechanism only travels in the vertical direction, thus reducing costs while providing a more compact mechanism.

Figure 77A:
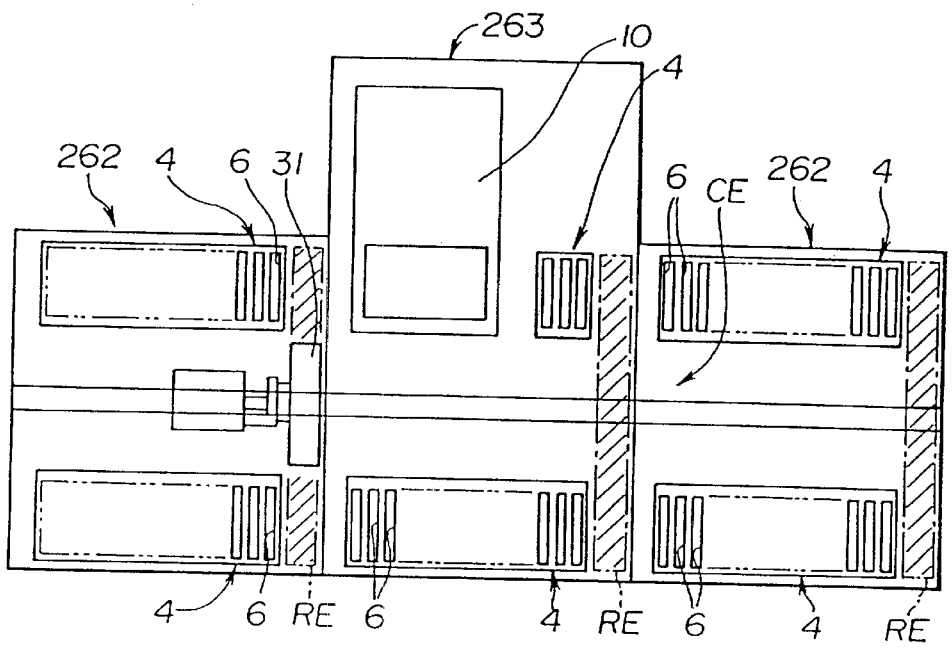
Figure 77B:
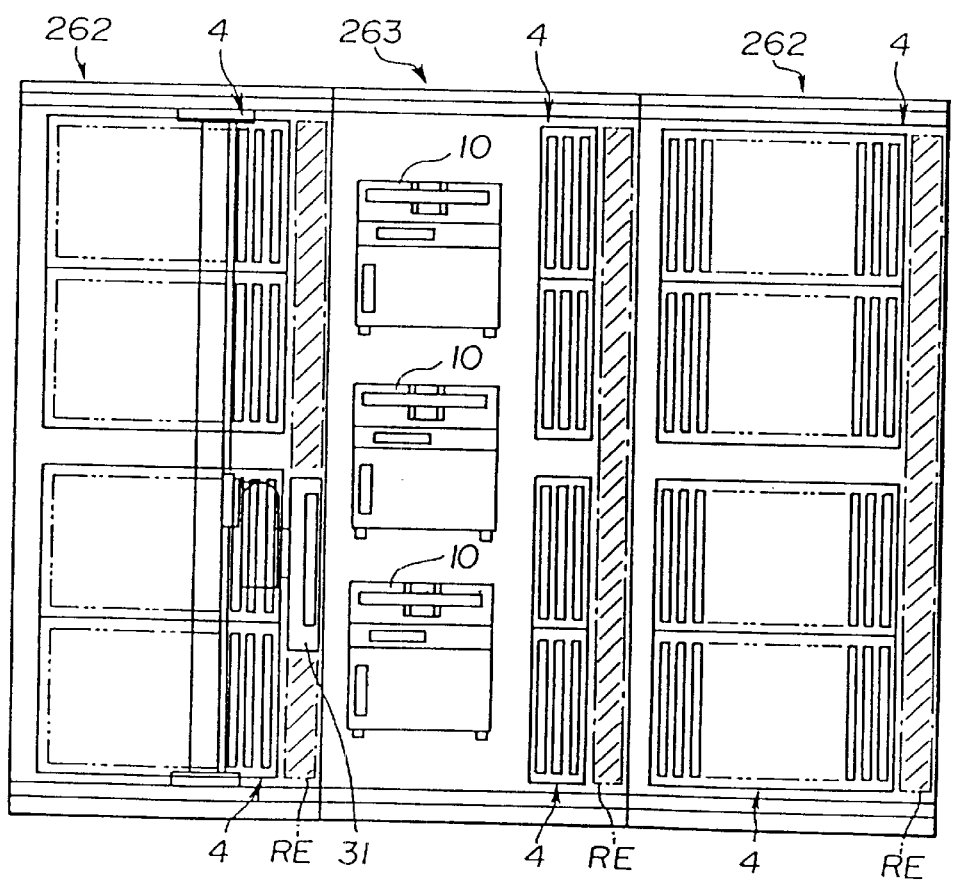

FIG. 77(a) is a plan view of an interior of a cassette console according to another modification, and FIG. 76(b) shows a front view of the console interior according thereto. According to this, the longitudinal orientation of the cassette receiving compartments 6 as well as the playing device 10 is established to be horizontal. Thus, the tape transport mechanism only travels in the vertical direction while being rotatable and including the rotation are RE between upper and lower cassette bays 4.

Figure 78:
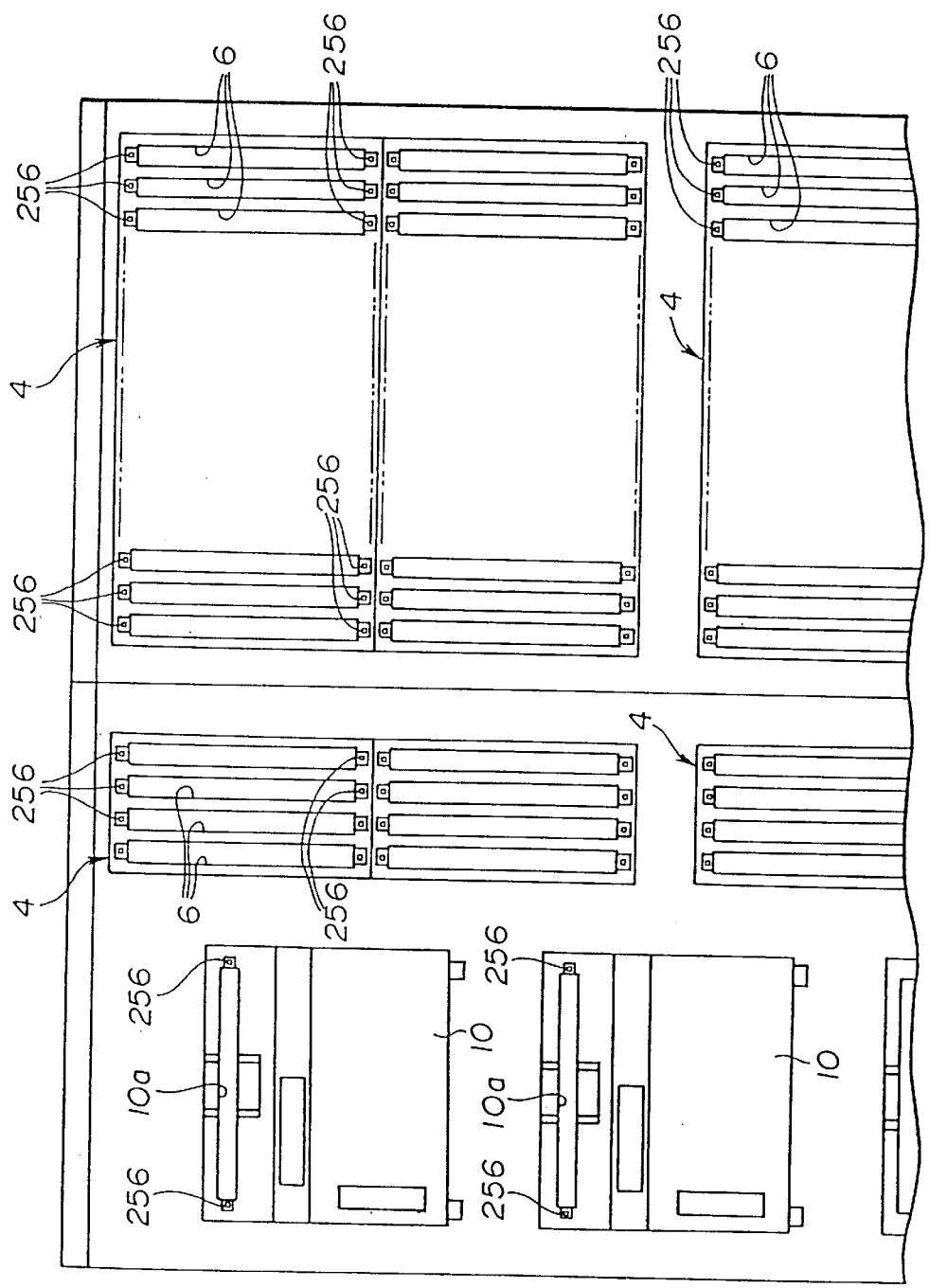
FIG. 78 is a partial front view of an interior of a fully assembled cassette auto changer unit according to the preferred embodiment.
Figure 79:
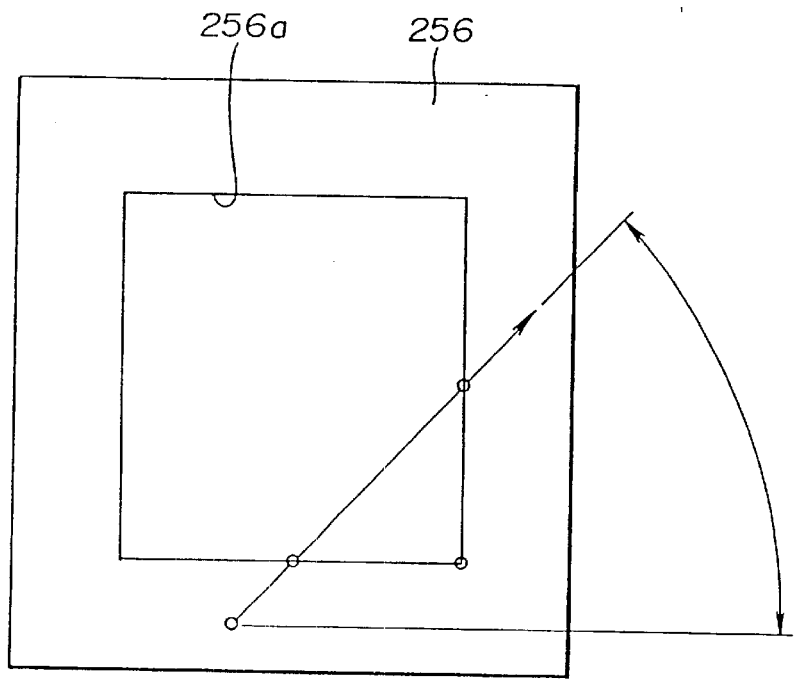
FIG. 79 is a front view of a positional adjustment means utilized in the auto changer unit of the preferred embodiment.

FIG. 78 is a partial front view of an interior of a fully assembled cassette auto changer unit according to the preferred embodiment. The positional detection arrangement N according to this modification is simplified and includes a plurality of positioning tabs 256 having a square opening defined therein. FIG. 79 is a front view of a positional adjustment means utilized in the auto changer unit. As may be seen, The same point may be established for positional determination.

Figure 80:
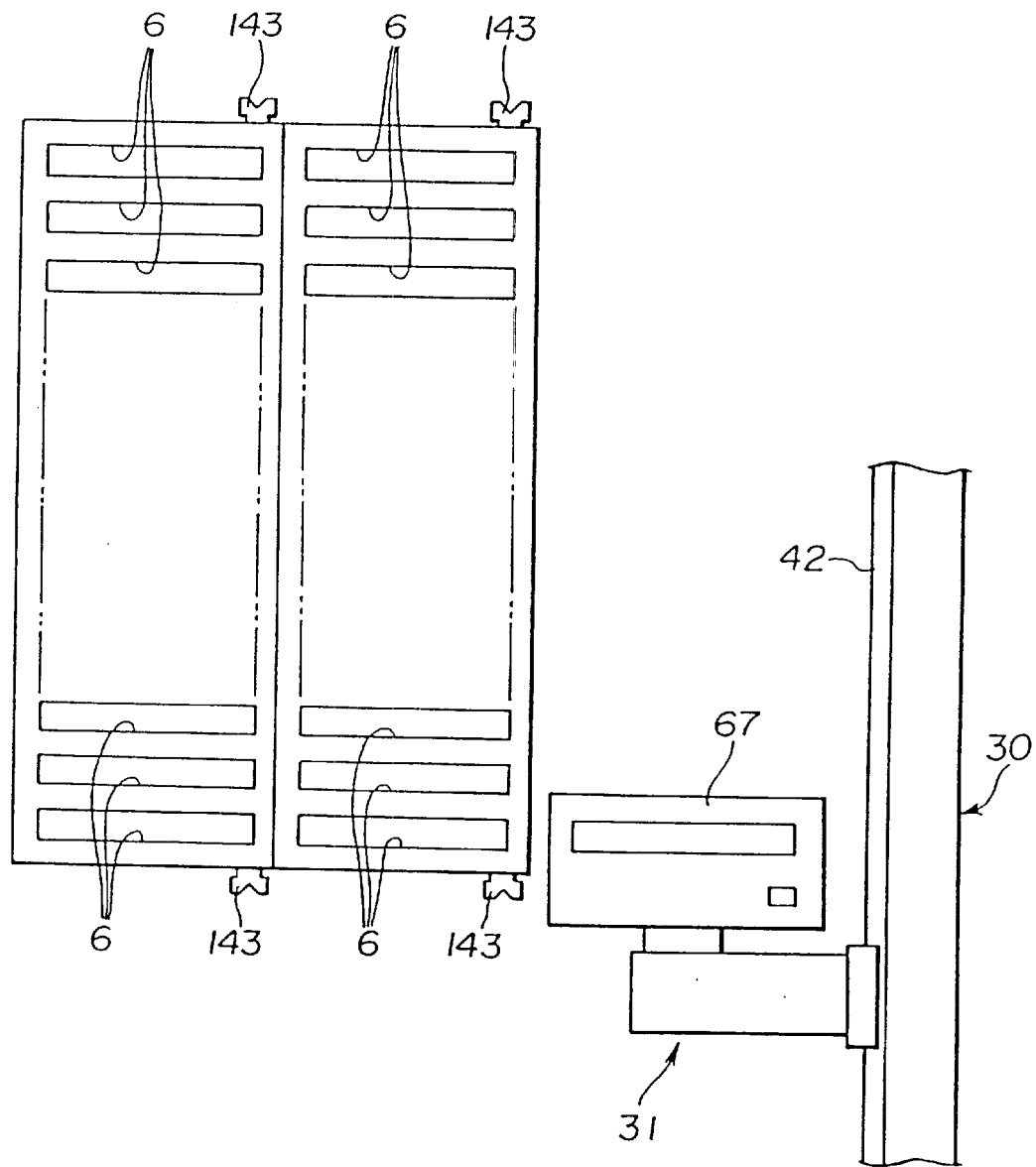
FIG. 80 is an explanatory diagram of a positional adjustment means according to a first modification according to the invention.
Figure 82:
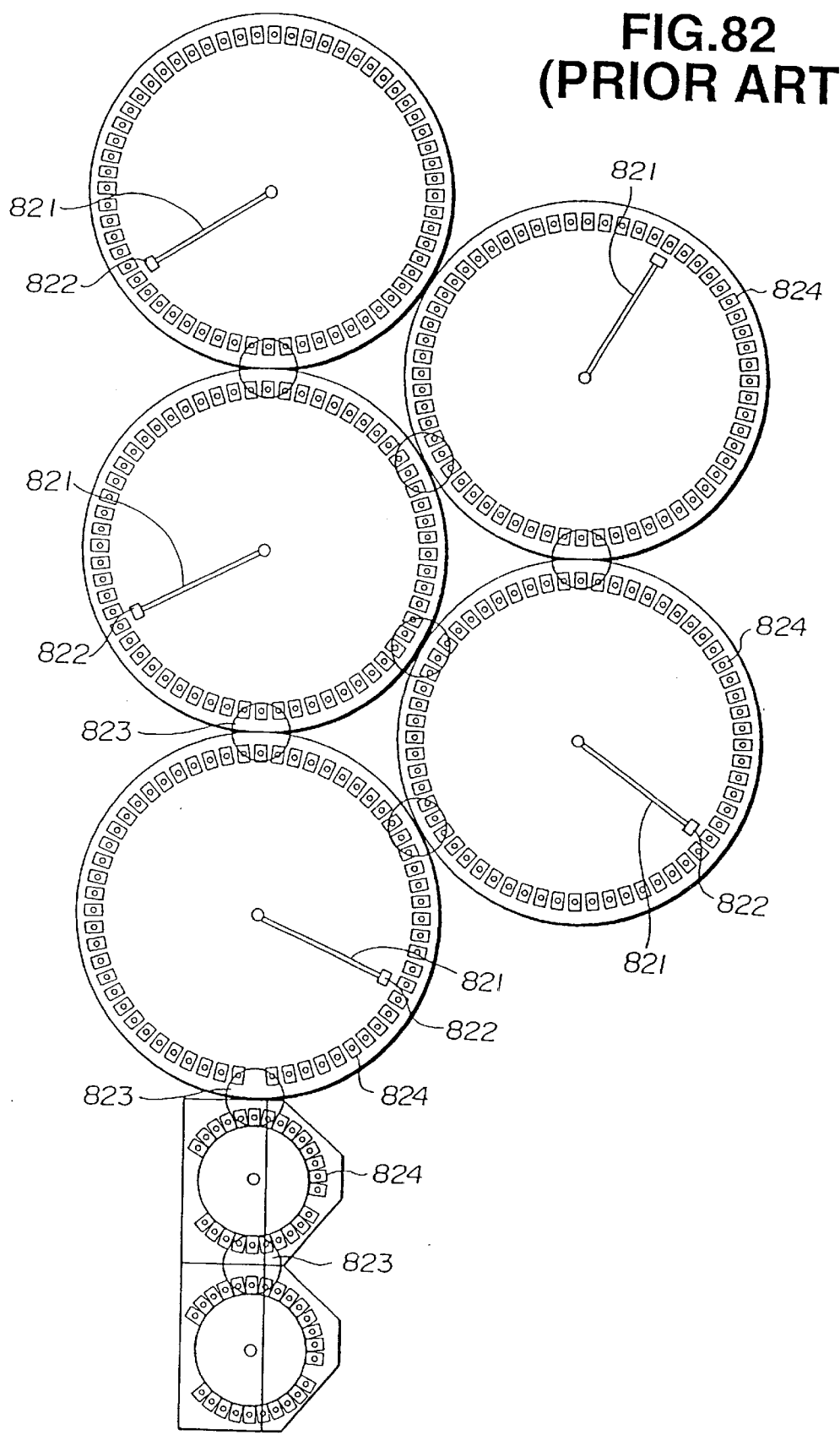
FIG. 82 is a plan view of a cassette console arrangement utilized in a conventional auto changer device as known from the related art.
Figure 83:
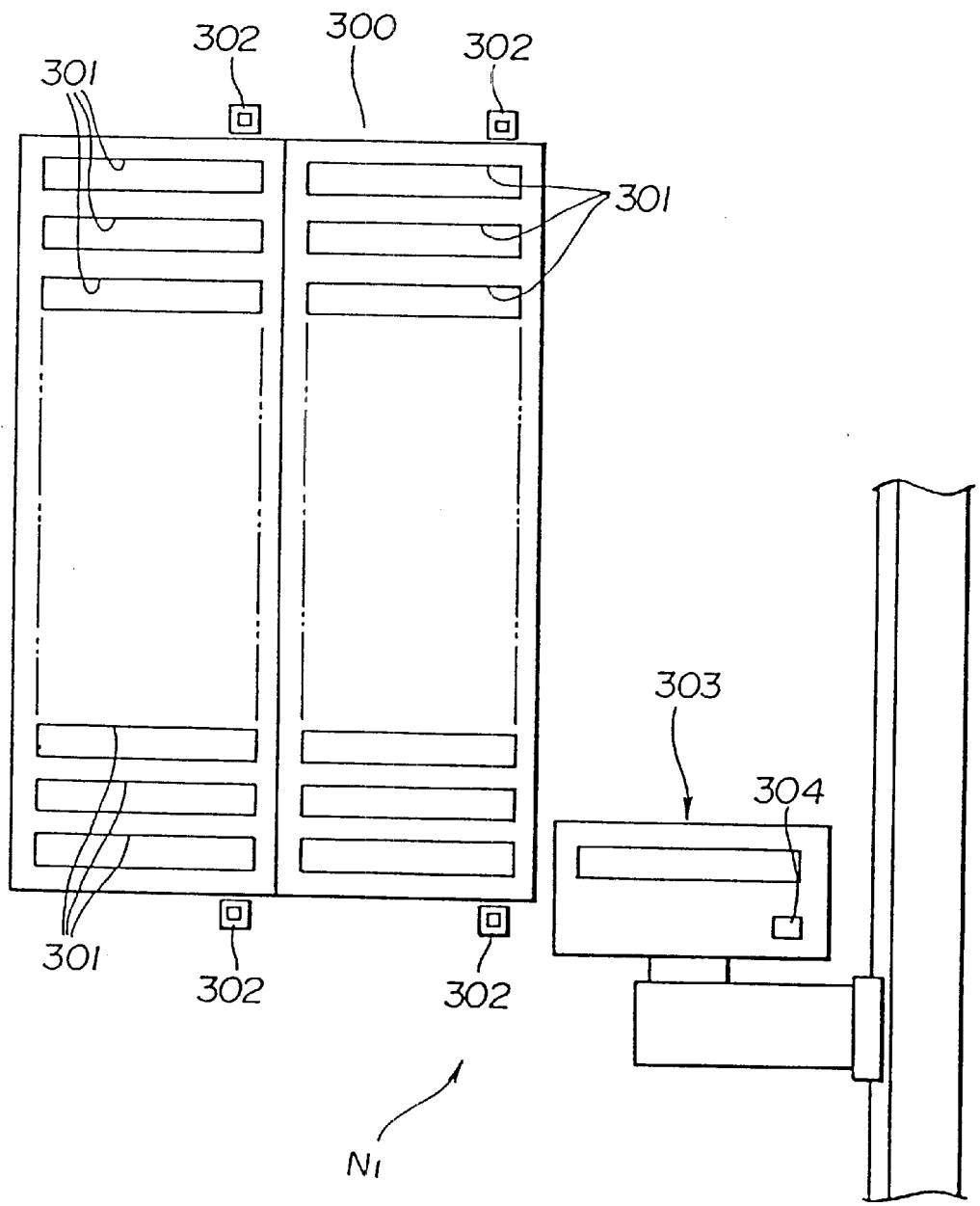
FIG. 83 is a schematic diagram showing a conventional arrangement of positional detection components for a cassette auto changer device.
Figure 84:
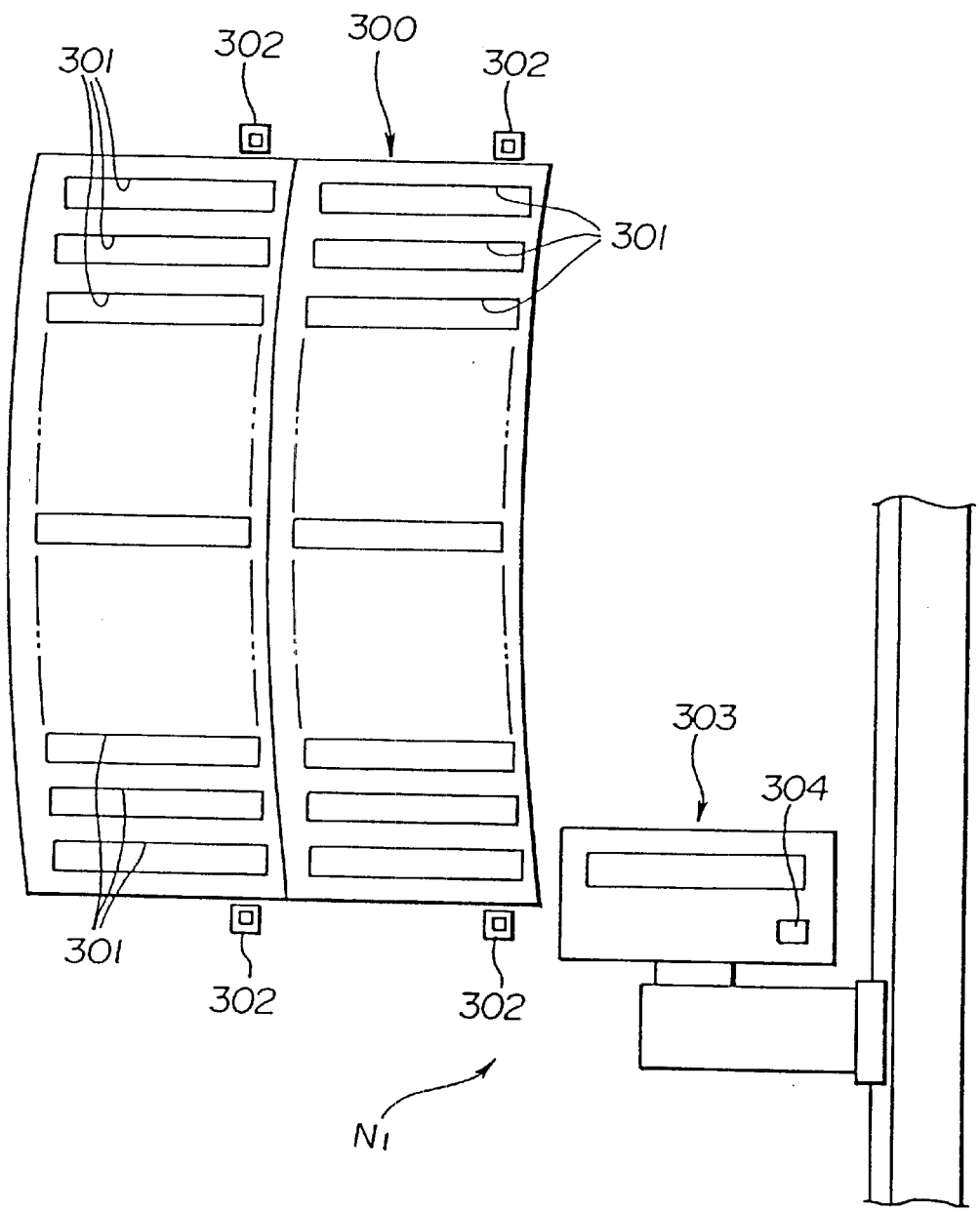
FIG. 84 is a schematic diagram showing another conventional position detecting arrangement for a cassette auto changer.
Figure 85:
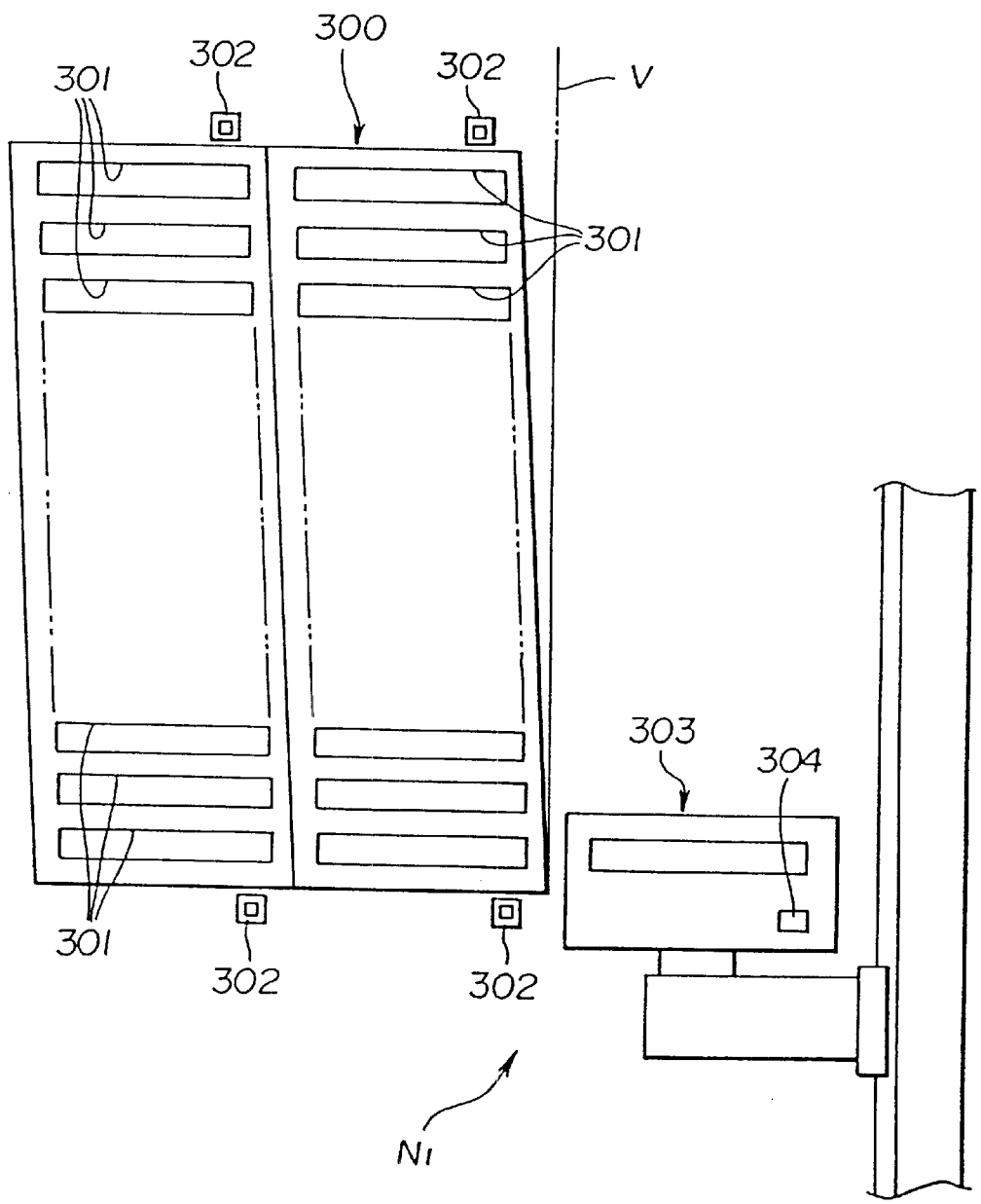
FIG. 85 is another schematic diagram of positional detection components of a conventional auto changer.

FIG. 80 is an explanatory diagram of a positional adjustment means according to another modification according to the invention. According to this, the positioning tabs 143 are provided only at upper and lower sides of the cassette bays 4 to guide the vertical position for the cassette shuttle body 31. According to this, sufficiently accurate determination may be accomplished.

Figure 81:
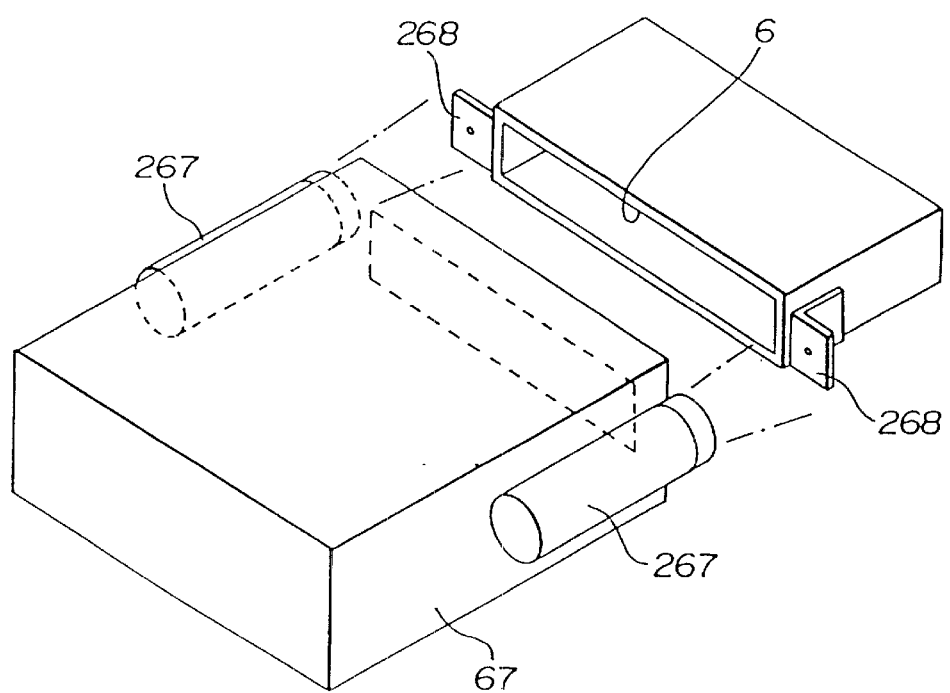
FIG. 81 is an explanatory diagram of a positional adjustment means according to a second modification according to the invention.

FIG. 81 is an explanatory diagram of a positional adjustment means according to another modification according to the invention. In this modification, the positioning tabs 268 provide only a small opening for indication of a correct position. The sensors 267 are supported at each side of the cassette support body 67 for effecting positional detection.

According to these modifications, the auto changer system 1 according to the invention may be provided at reasonable cost without extreme complexity of manufacture. In addition, the auto changer system 1 may be maintained in a very compact and flexible condition such that it may be adaptably installed in various locations with highly different space requirements.

Of course, the cassette transport mechanism 2 of the auto changer system 1 is operable to and from the input/output cassette cassette bay 5 whereby cassettes may be, inserted into and removed from the housing console. The controller 202 allows the single input/output cassette cassette bay 5 to function as both an IN or an OUT port.

Thus, according to the present invention as described herein above, there is provided a compact, reliable cassette auto changer apparatus having a relatively uncomplicated structure.

According the Invention, a cassette auto changer system is provided wherein manufacturing expense and complexity are minimized while assuring a highly functional unit which may be installed in a comparatively small area space.

Also, according the invention, a cassette auto changer system is provided which is simplified and has a reduced number of components.

In addition, a cassette auto changer system is provided wherein reliable determination of positioning between components is assured.

In addition, a cassette auto changer system is provided in which reduced electrical requirements and simplified wiring, are provided as well as smaller capacity cable and cassette locking and release mechanisms which are simplified.

The cassette auto changer system of the invention as disclosed above may execute cassette transfer operations in a reduced space is necessary for providing a compact apparatus.

The cassette auto changer system of the invention also provides flexible use of port openings according to an operation desired by the user.

It will be noted that, although the preferred embodiment is set forth in terms of an auto changer system for tape cassettes, the present invention maybe embodied in various different ways without departing from the principle of the invention as herein set forth.

The present invention in not limited only to the description as herein disclosed but may be modified and embodied in other ways without departing from the scope or inventive concept of the invention as set forth above.

What is claimed is:

1. A cassette auto changer system including means for selectably providing a plurality of cassettes to be loaded into one or more tape signal reading mechanisms, comprising:

a cassette rack including a plurality of cassettes receiving compartments;

a tape transfer mechanism operable to selectably transport cassettes between said cassette rack and said tape signal reading mechanisms;

a pair of position detection portions in the form of positioning tabs extending in a longitudinal direction from either side of each of said cassette receiving compartments; and a pair of position detection sensors provided on said tape transfer mechanism at a position so as to scan said positioning tabs of said cassette receiving compartments when said tape transfer mechanism is in a loading position relative to one of said cassette receiving compartments so as to determine the position of said tape transfer mechanism relative to said tape receiving compartments.

2. A cassette auto changer system including means for selectably providing a plurality of cassettes to be loaded into one or more tape signal reading mechanisms, comprising:

a cassette rack including a plurality of cassette receiving compartments;

a tape transfer mechanism operable to selectably transport cassettes between said cassette rack and said tape signal reading mechanisms; wherein a pair of position detection portions are provided in a longitudinal direction of an opening of each of said cassette receiving compartments at either side of said opening;

a pair of position detection sensors provided on said tape transfer mechanism at a position substantially corresponding to a location of said position detection portions when said tape transfer mechanism is in a loading position relative to one of said cassette receiving compartments;

a pair of opposed slanted reference lines provided above each of said position detection portions and a reference position indicator being established at a point of intersection of said opposed slanted references lines; wherein a positional reference line is established which is a line extending in a perpendicular direction and passes through said reference position indicator so as to establish a light reflective portion wherein light detection can be sensed by said detection sensors and a non-reflection portion which defines a zone wherein the detection sensors cannot sense light.

* * * * *